US010393011B1

(12) United States Patent
Rowland

(10) Patent No.: US 10,393,011 B1
(45) Date of Patent: Aug. 27, 2019

(54) METHOD OF OPERATING AN INTERNAL COMBUSTION ENGINE UTILIZING HEAT IN ENGINE CYCLES

(71) Applicant: Nickolas Adam Rowland, New Washington, OH (US)

(72) Inventor: Nickolas Adam Rowland, New Washington, OH (US)

( * ) Notice: Subject to any disclaimer, the term of this patent is extended or adjusted under 35 U.S.C. 154(b) by 46 days.

(21) Appl. No.: 15/852,546

(22) Filed: Dec. 22, 2017

Related U.S. Application Data

(60) Provisional application No. 62/498,312, filed on Dec. 22, 2016.

(51) Int. Cl.
*F02B 75/02* (2006.01)
*F02D 41/30* (2006.01)
*F02B 29/02* (2006.01)
*F02B 25/02* (2006.01)
*F02B 47/02* (2006.01)
*F02M 25/022* (2006.01)
*F02D 41/00* (2006.01)

(52) U.S. Cl.
CPC .............. *F02B 75/02* (2013.01); *F02B 25/02* (2013.01); *F02B 29/02* (2013.01); *F02B 47/02* (2013.01); *F02D 41/0002* (2013.01); *F02D 41/30* (2013.01); *F02M 25/0221* (2013.01); *F02M 25/0227* (2013.01); *F02D 2041/001* (2013.01)

(58) Field of Classification Search
CPC .......... F02B 75/02; F02B 29/02; F02B 47/02; F02B 25/02; F02D 41/30; F02D 41/0002; F02D 2041/001; F02M 25/0227; F02M 25/0221
See application file for complete search history.

(56) References Cited

U.S. PATENT DOCUMENTS

| 12,715 | A | 4/1855 | Drake |
| 1,407,586 | A | 2/1922 | Selz |
| 7,415,947 | B2 * | 8/2008 | Zajac ...................... F01B 31/14 |
| | | | 123/70 R |
| 8,291,872 | B2 | 10/2012 | Szybist et al. |

(Continued)

FOREIGN PATENT DOCUMENTS

GB    183306525 A    12/1833

*Primary Examiner* — Grant Moubry
(74) *Attorney, Agent, or Firm* — The Law Office of Patrick F. O'Reilly III, LLC

(57) ABSTRACT

Provided are novel methods of phases that utilize heat to produce new efficient engine cycles. Some phases in these methods do not rely upon mechanical displacement (such as from the piston of a conventional engine) to carry out the phases. Some phases utilize heat from hot expanded combustion gases and efficiently utilize gas contractions. Some phases rely upon directing heat, and creating gas changes from preheated substance injection, and efficiently utilize gas changes. Gas changes utilized in these methods are timed with the mechanical cycle of the engine and utilized, for example, to reduce or reverse pumping loss, reduce mechanical friction, and decrease the idle (non-power-producing i.e. power-taking) strokes and phases usually found in an engine's cycle, and to increase the engines performance, which gives the invention the ability to increase an engine's thermal efficiencies for wider ranges of operating conditions from what it would be otherwise.

20 Claims, 82 Drawing Sheets

(56) References Cited

U.S. PATENT DOCUMENTS

| | | |
|---|---|---|
| 9,556,818 B2 | 1/2017 | Yamada et al. |
| 10,036,336 B2 * | 7/2018 | Atalla ................. F02D 41/0002 |
| 2006/0054136 A1 * | 3/2006 | Fuwa ..................... F01L 1/022 |
| | | 123/406.45 |
| 2007/0022977 A1 | 2/2007 | Crower |
| 2011/0137504 A1 * | 6/2011 | Nakamura ............ F01L 1/3442 |
| | | 701/22 |
| 2013/0291826 A1 * | 11/2013 | McAlister ............... F02B 19/00 |
| | | 123/254 |

* cited by examiner

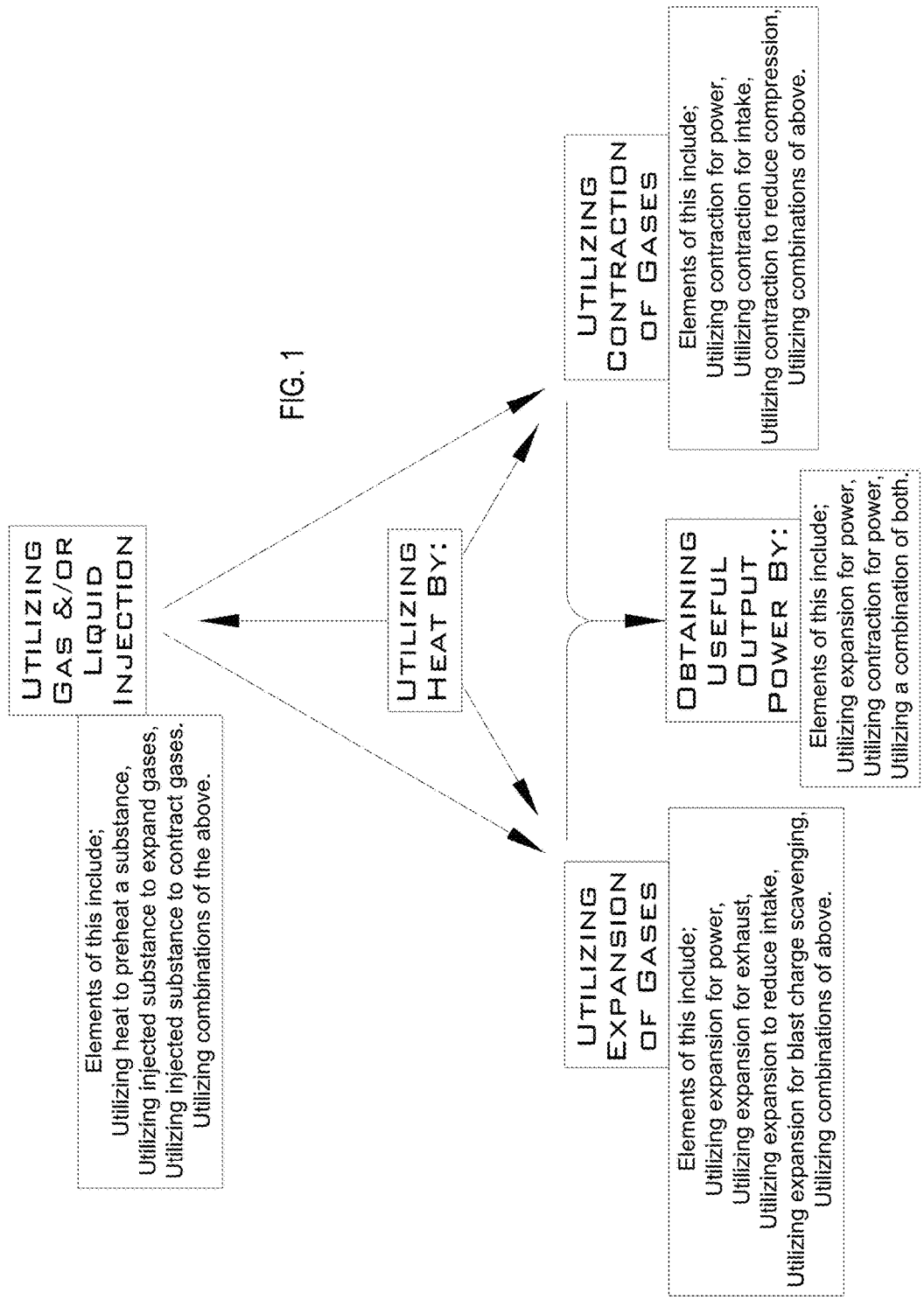

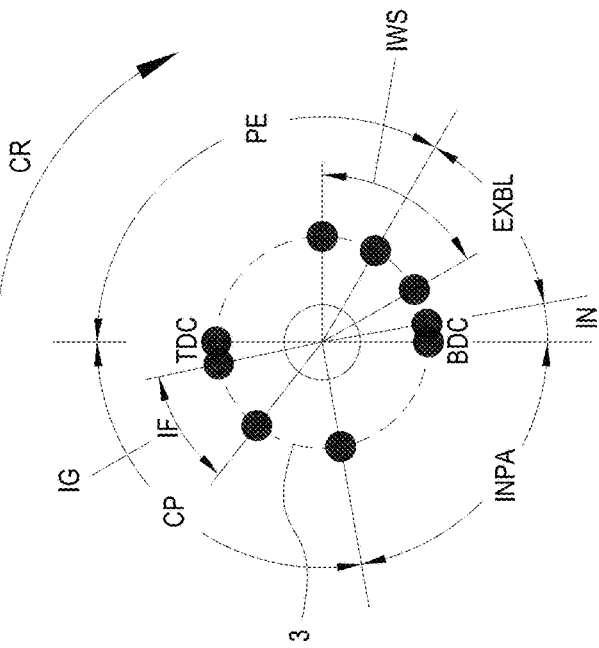
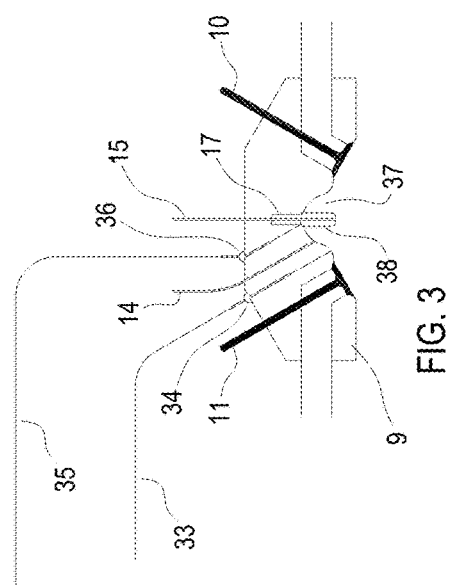
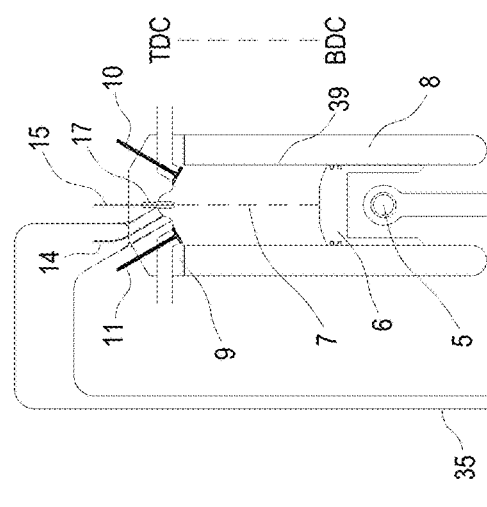

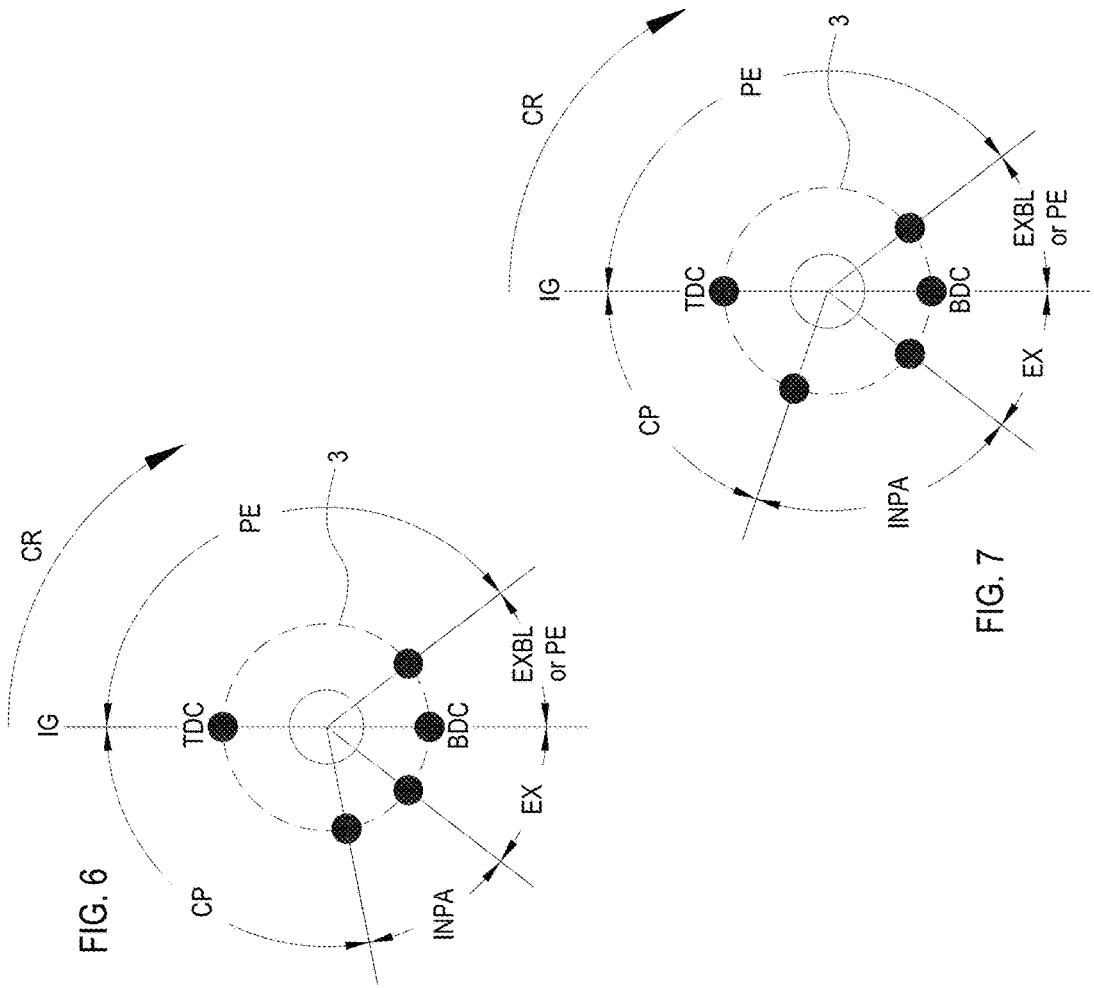
FIG. 6
FIG. 7
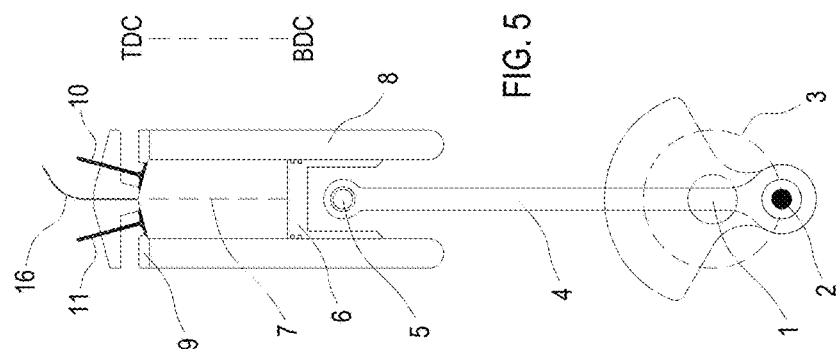
FIG. 5

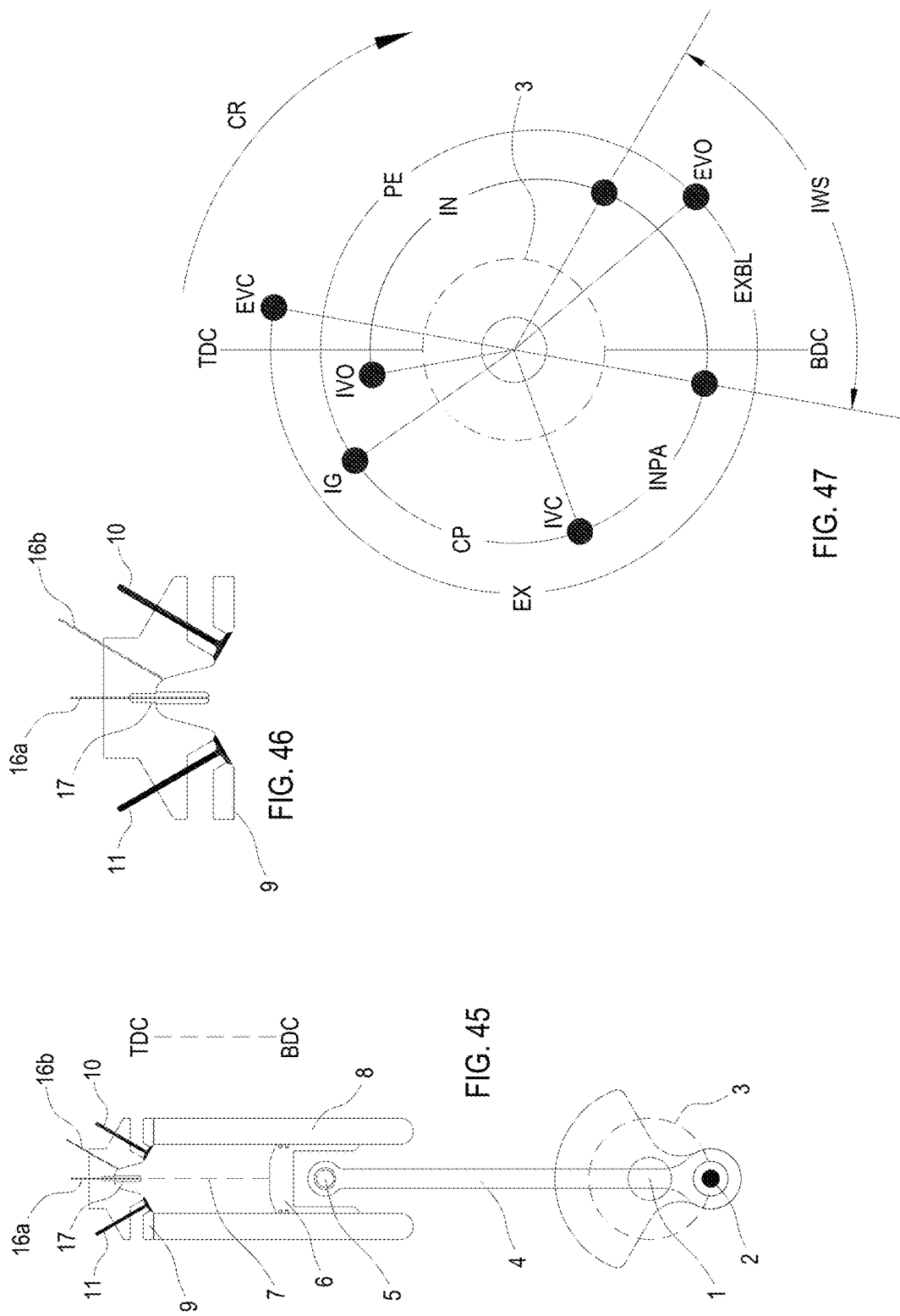

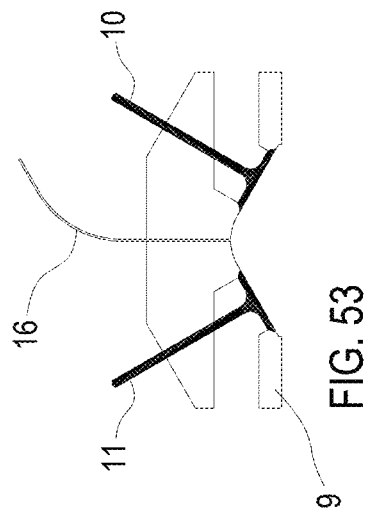
FIG. 53
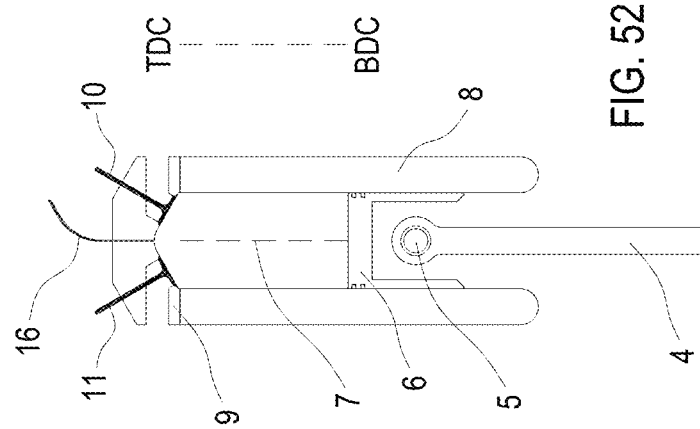
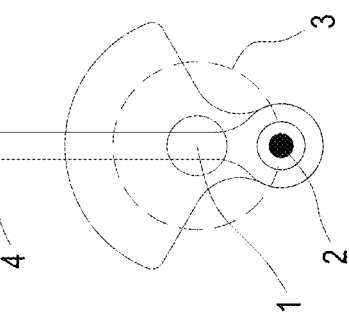
FIG. 52

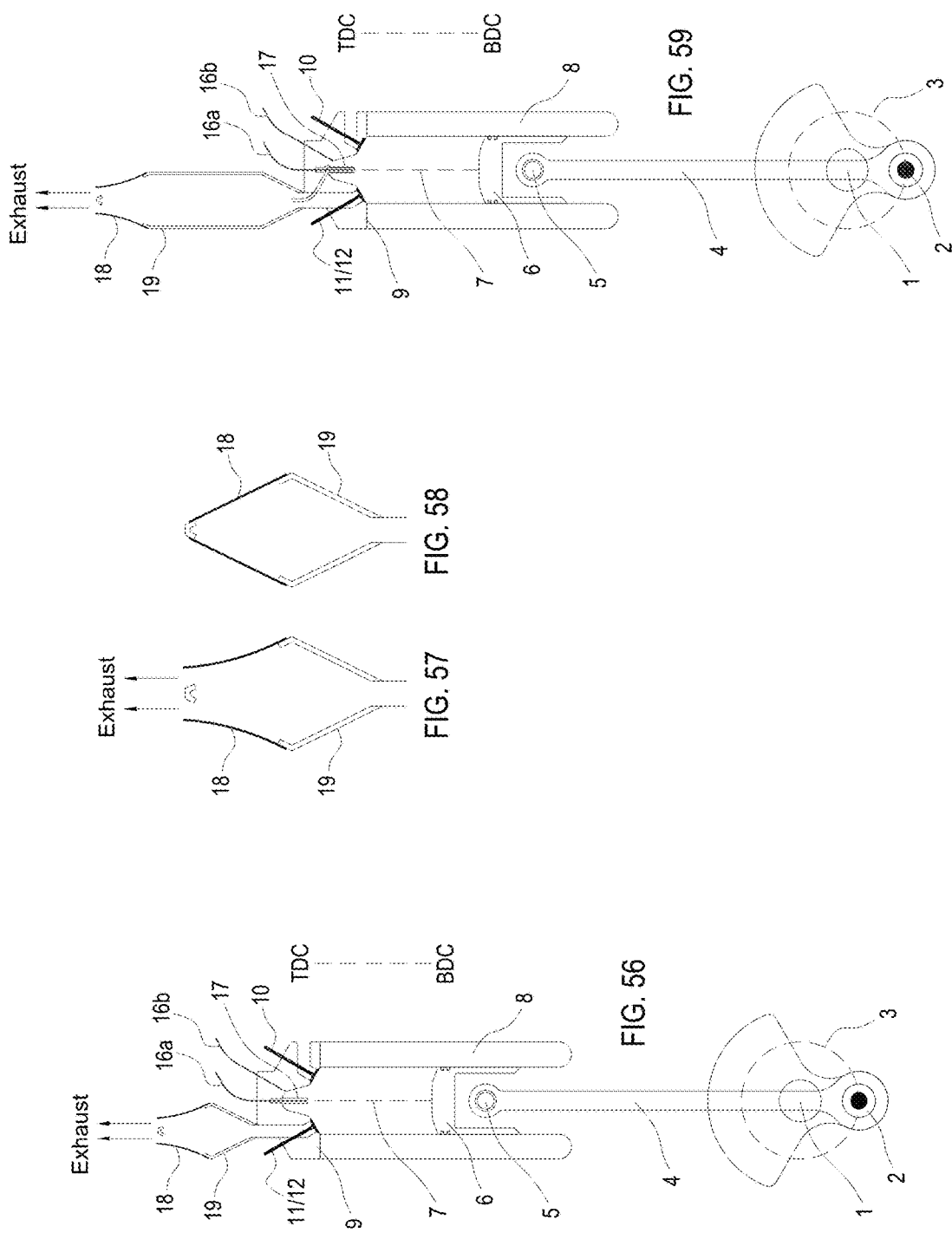

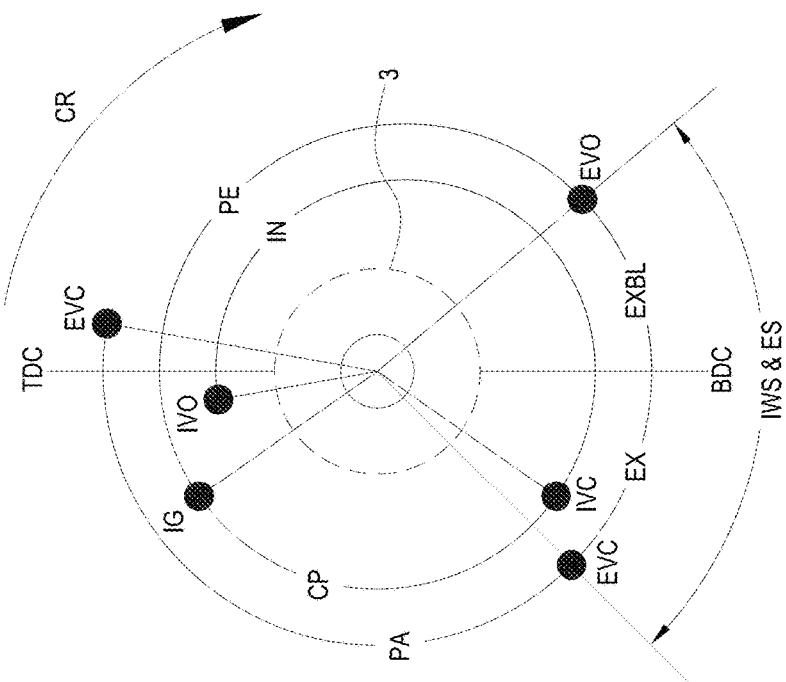
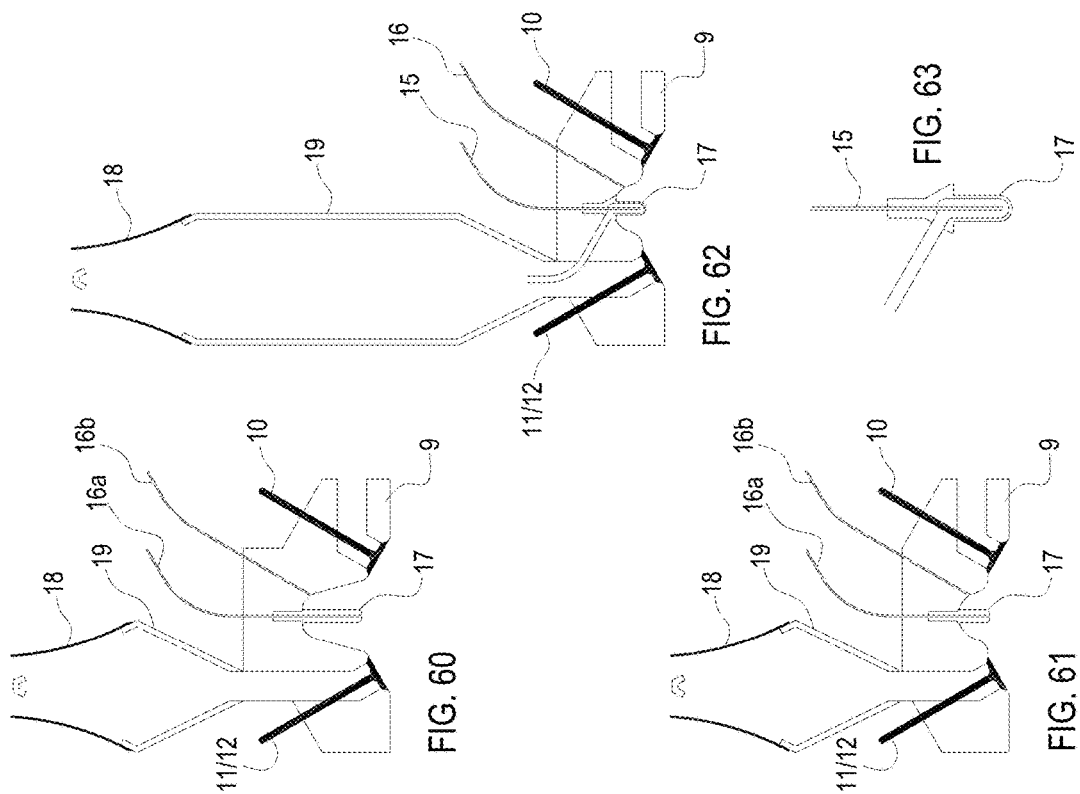

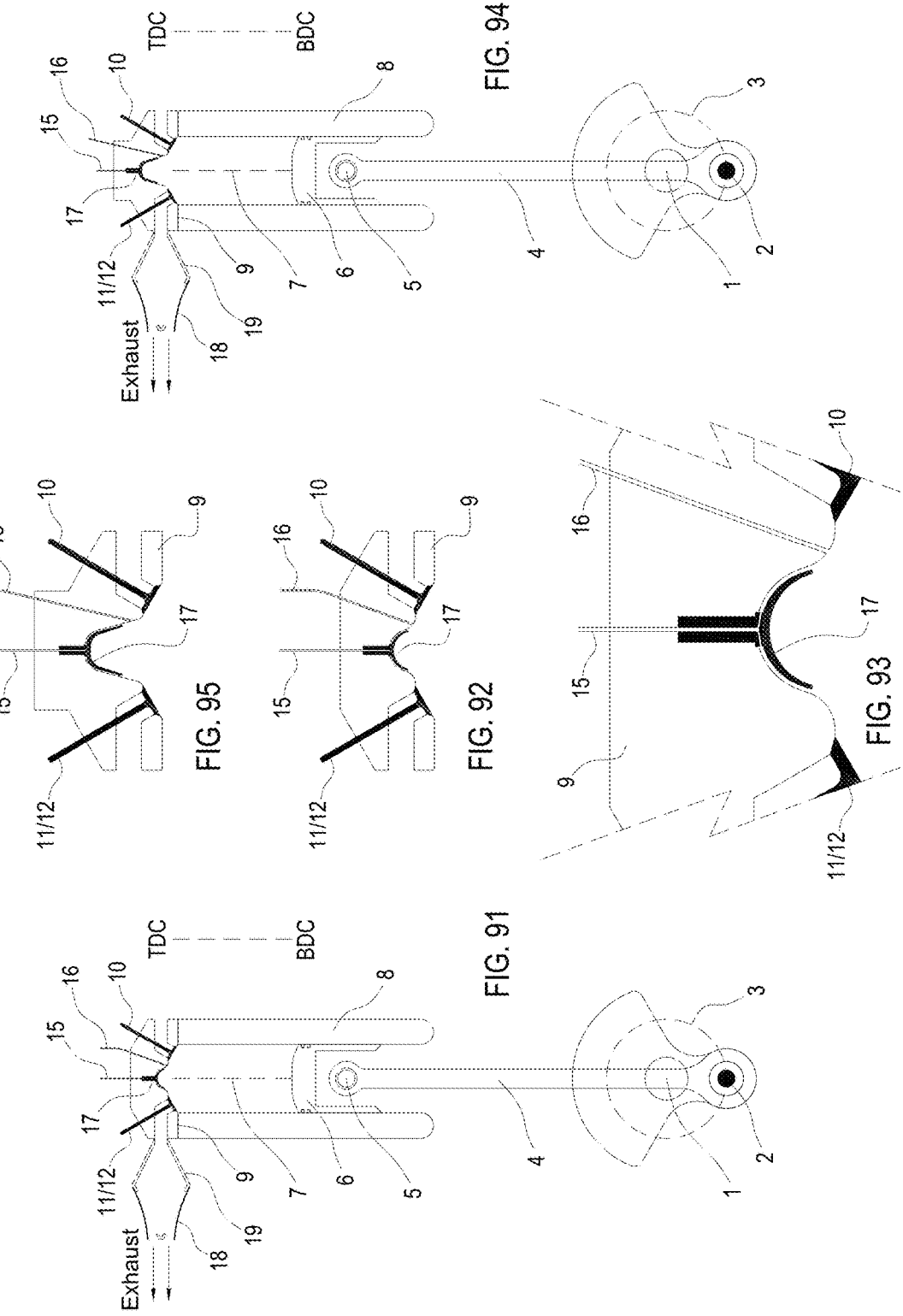

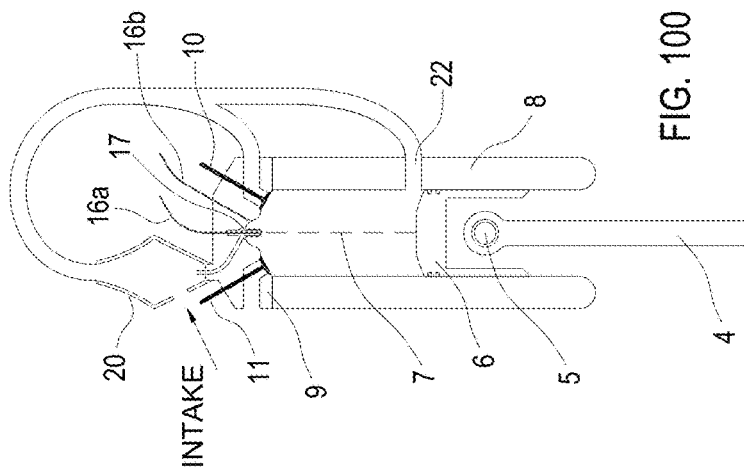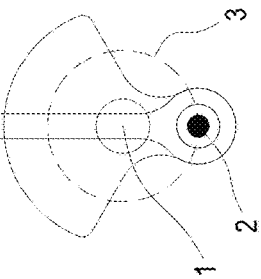
FIG. 100
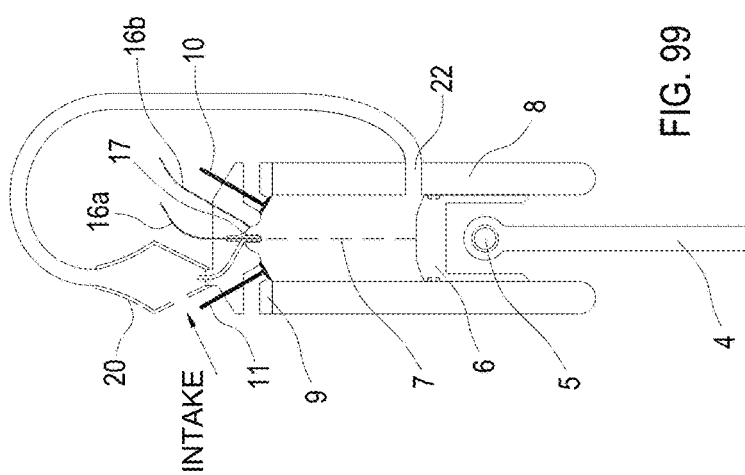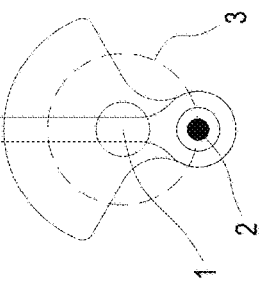
FIG. 99
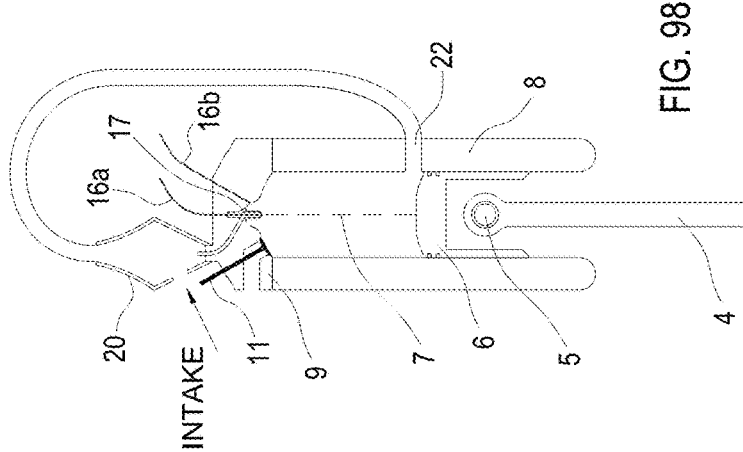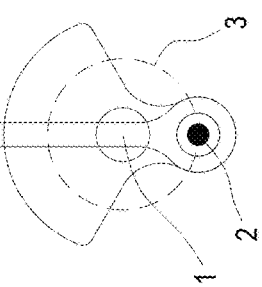
FIG. 98

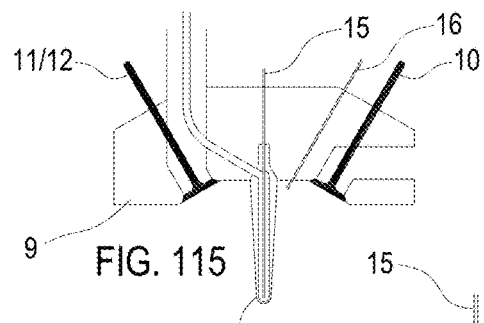
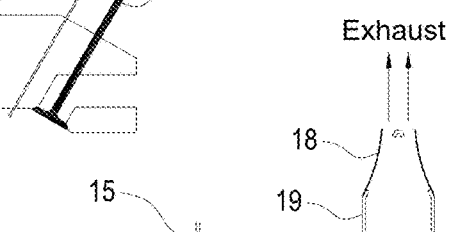
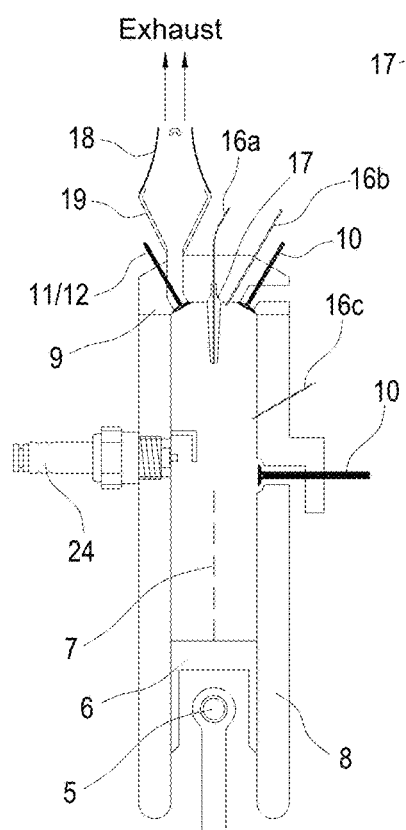
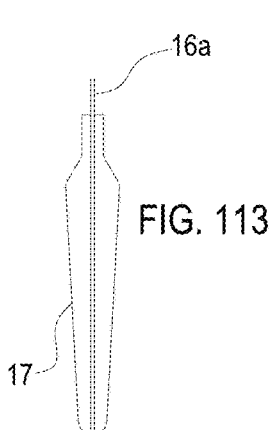
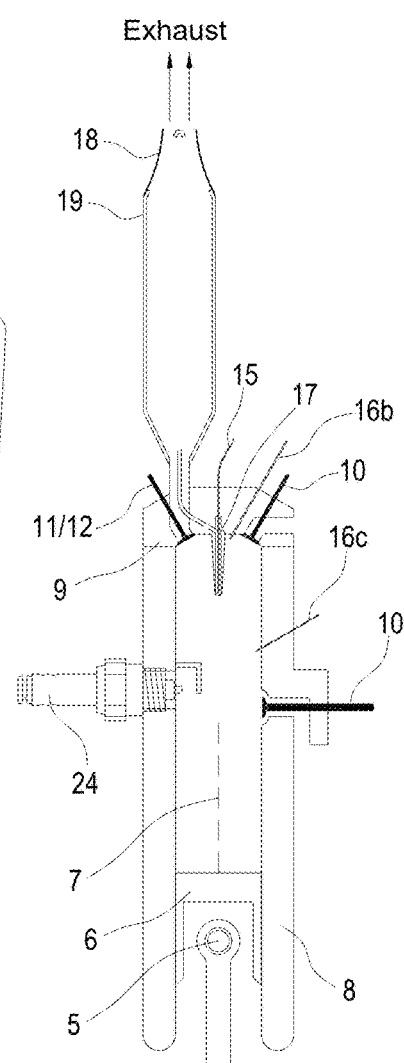
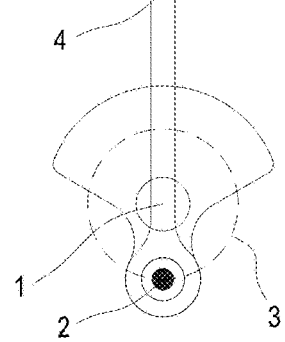
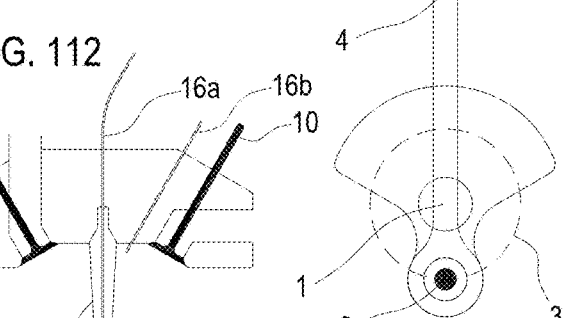

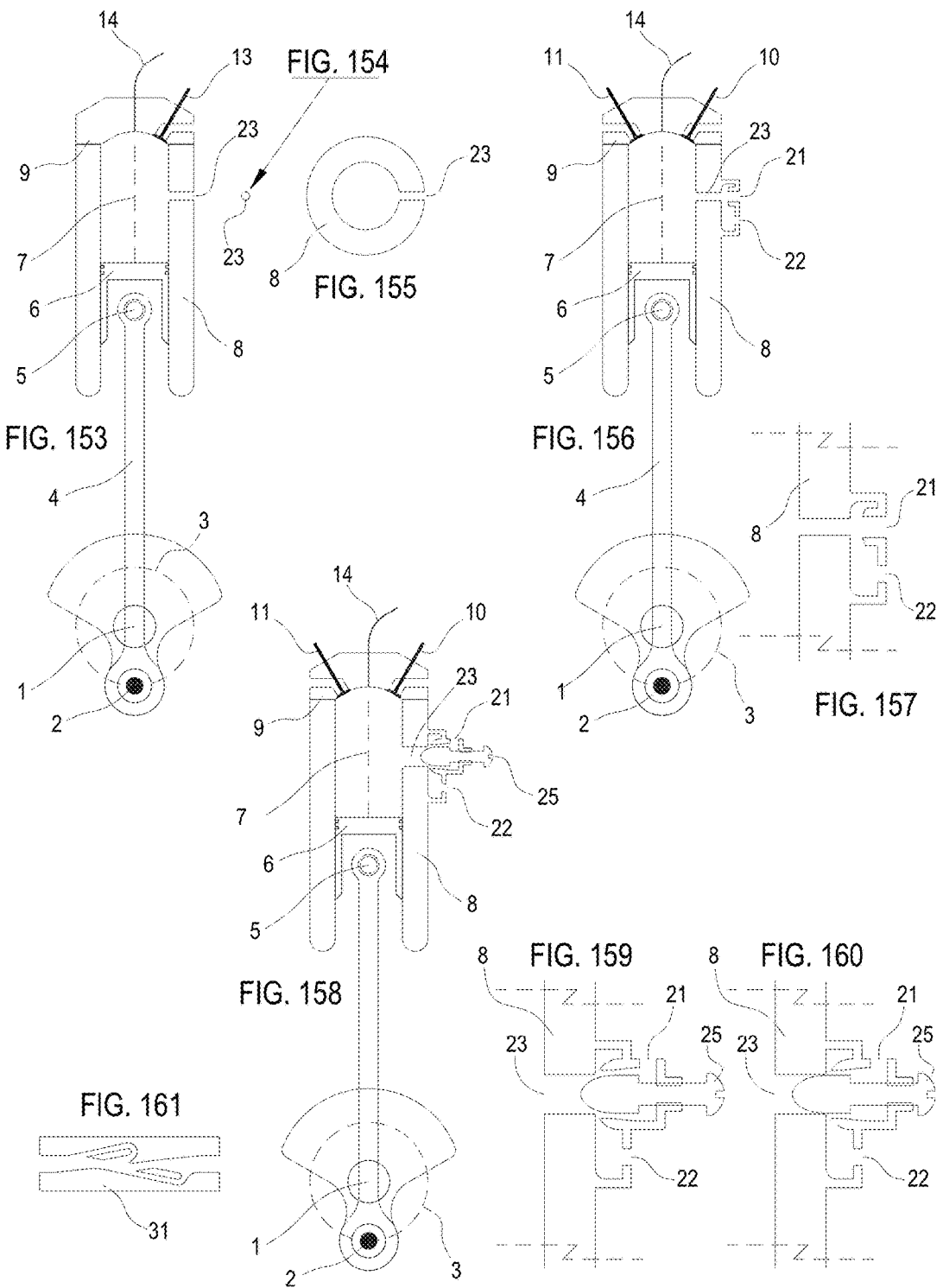

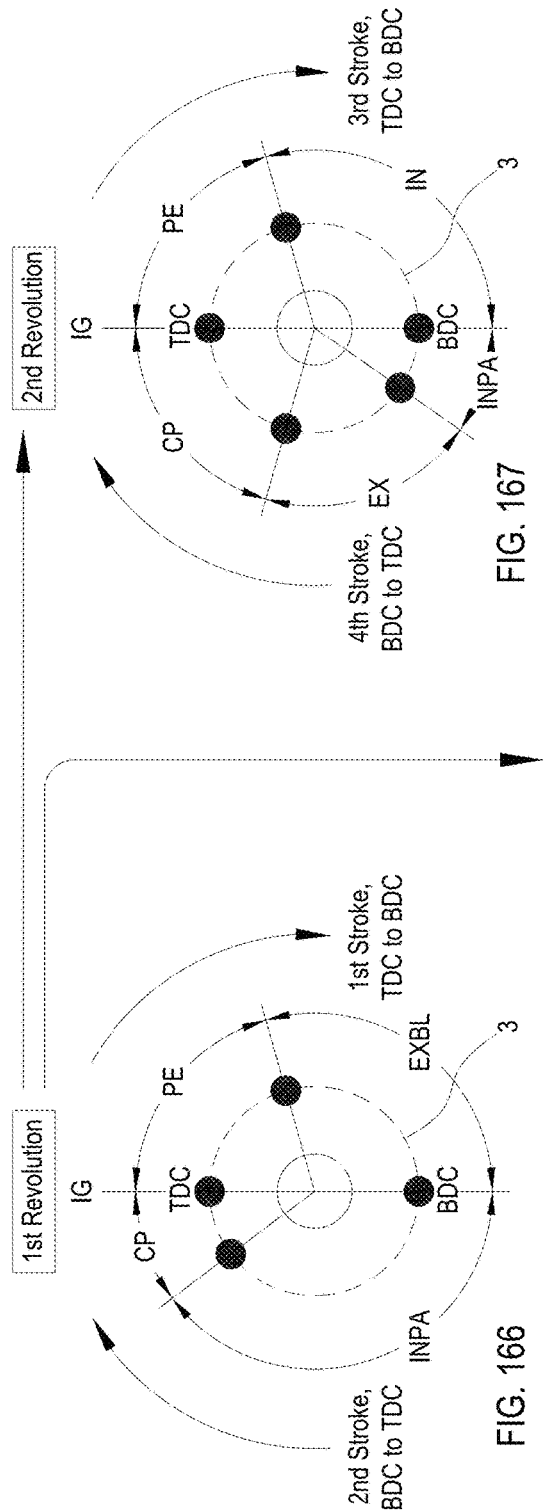
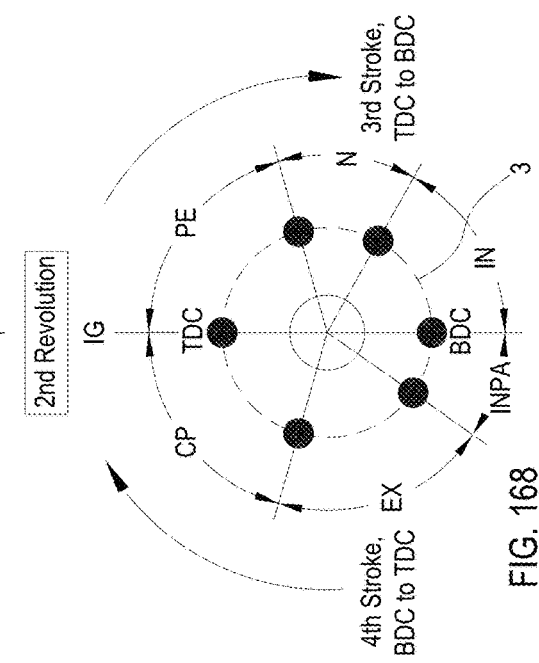
FIG. 166
FIG. 167
FIG. 168

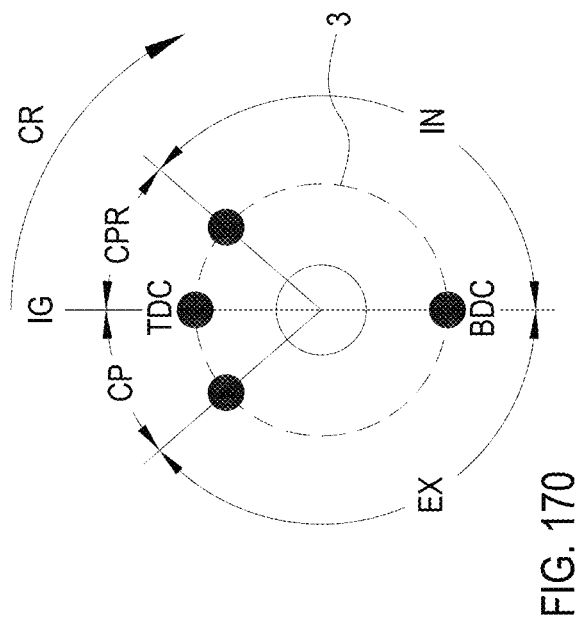
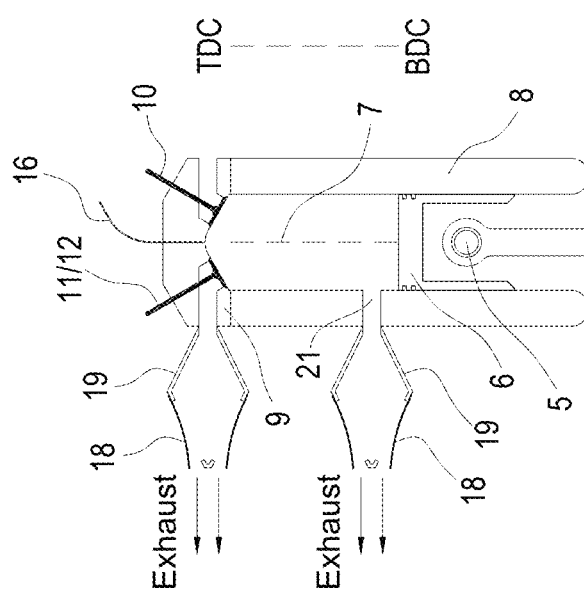
FIG. 169
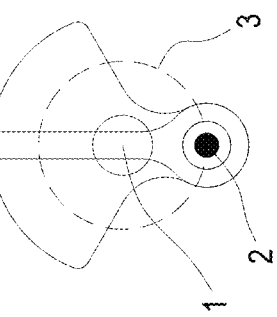
FIG. 170

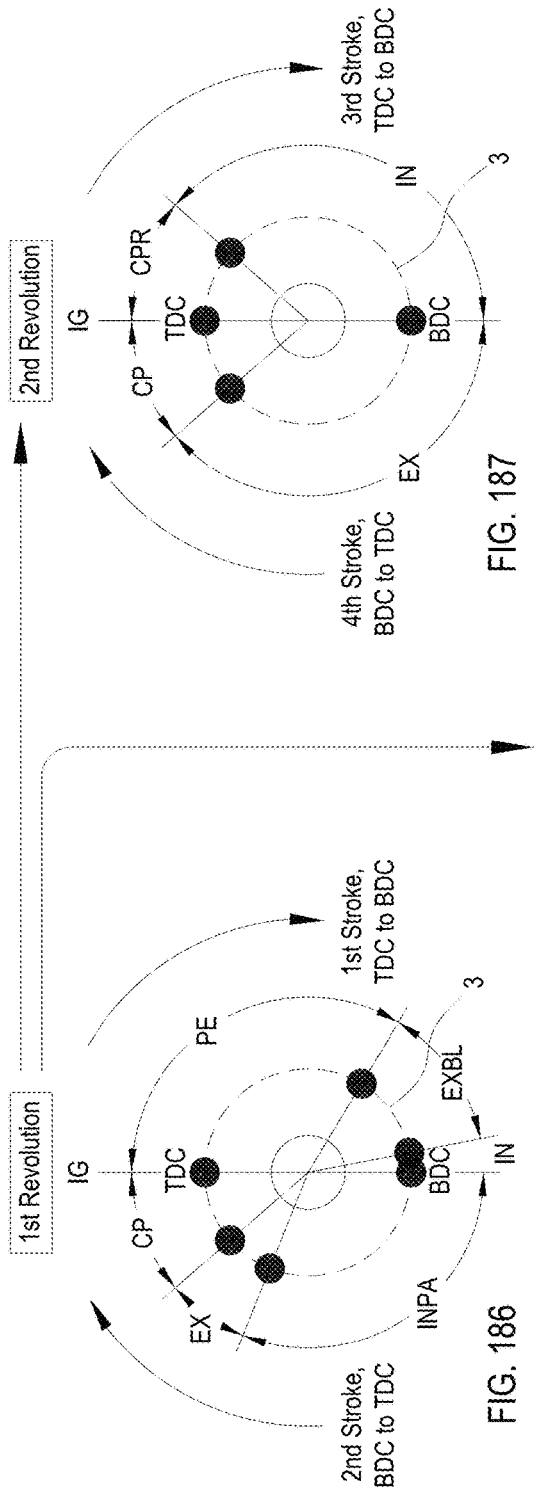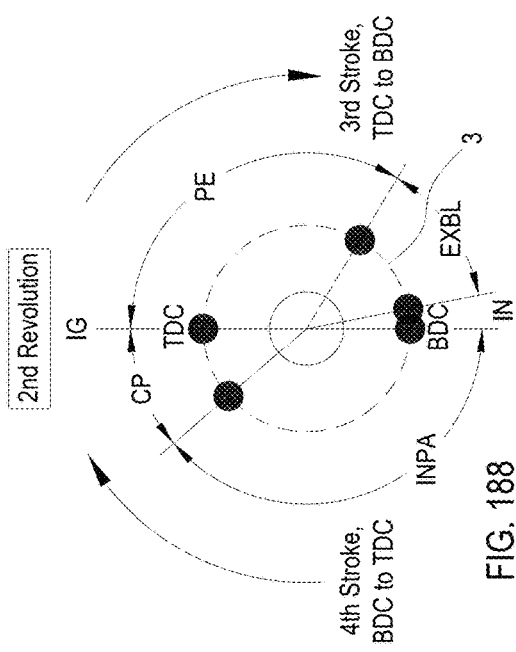
FIG. 186
FIG. 187
FIG. 188

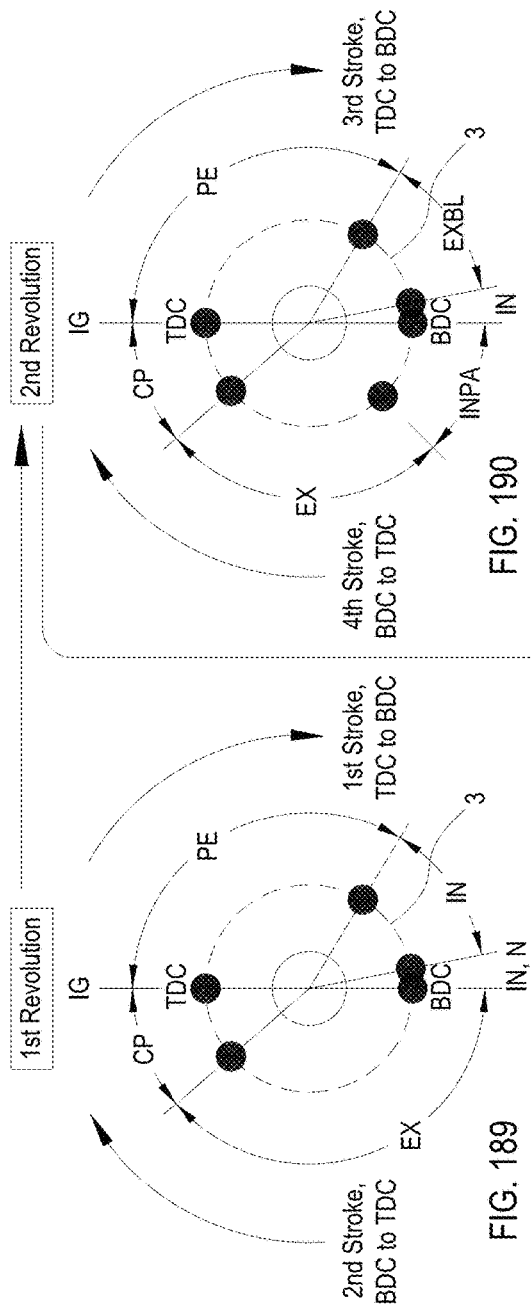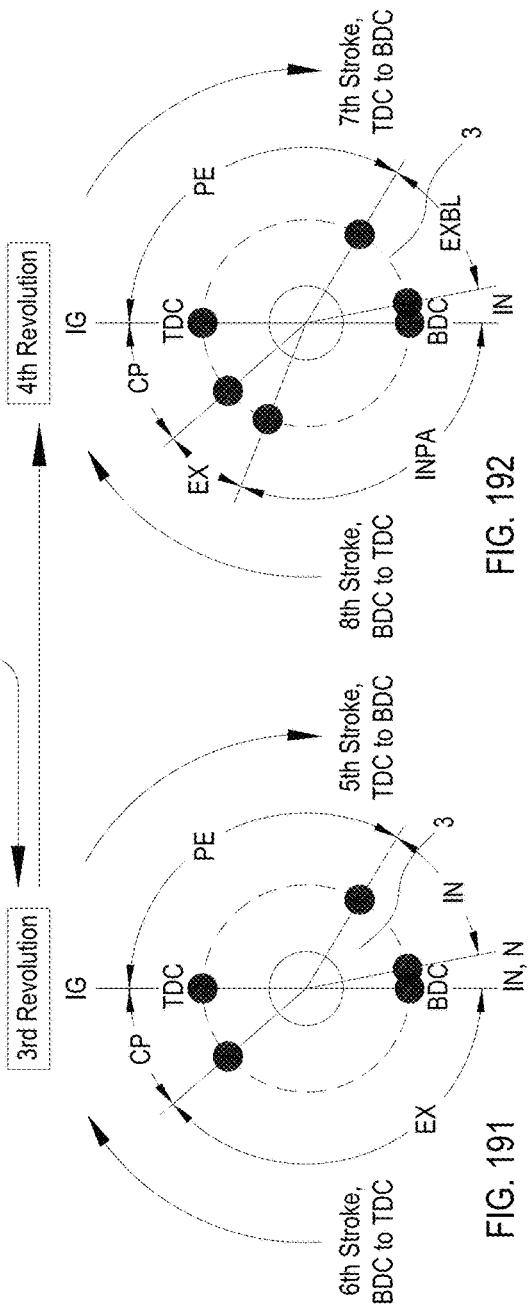

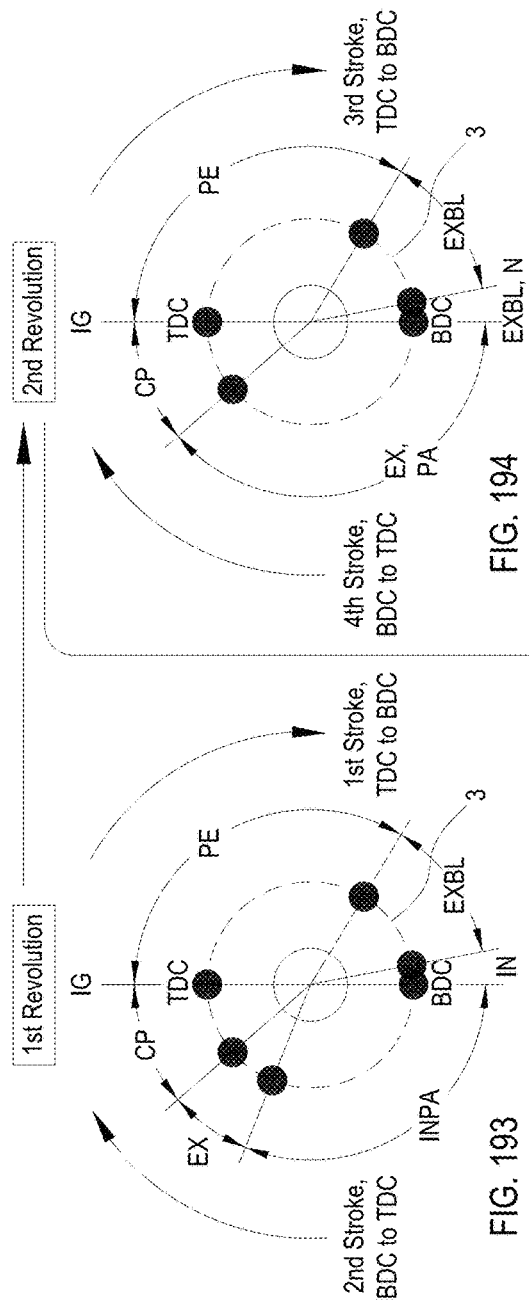
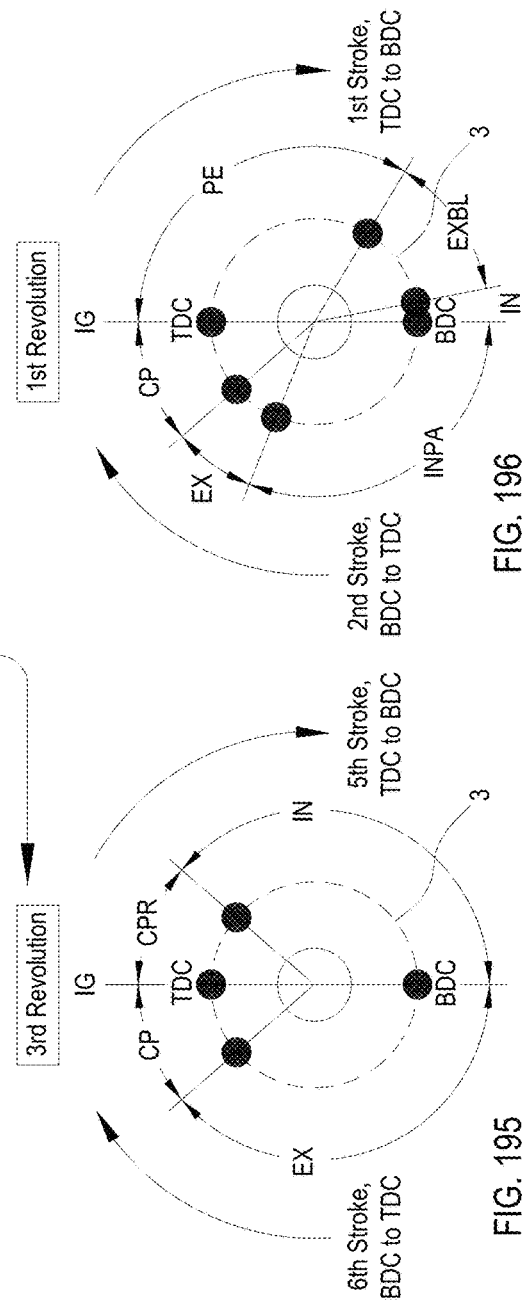
FIG. 193
FIG. 194
FIG. 195
FIG. 196

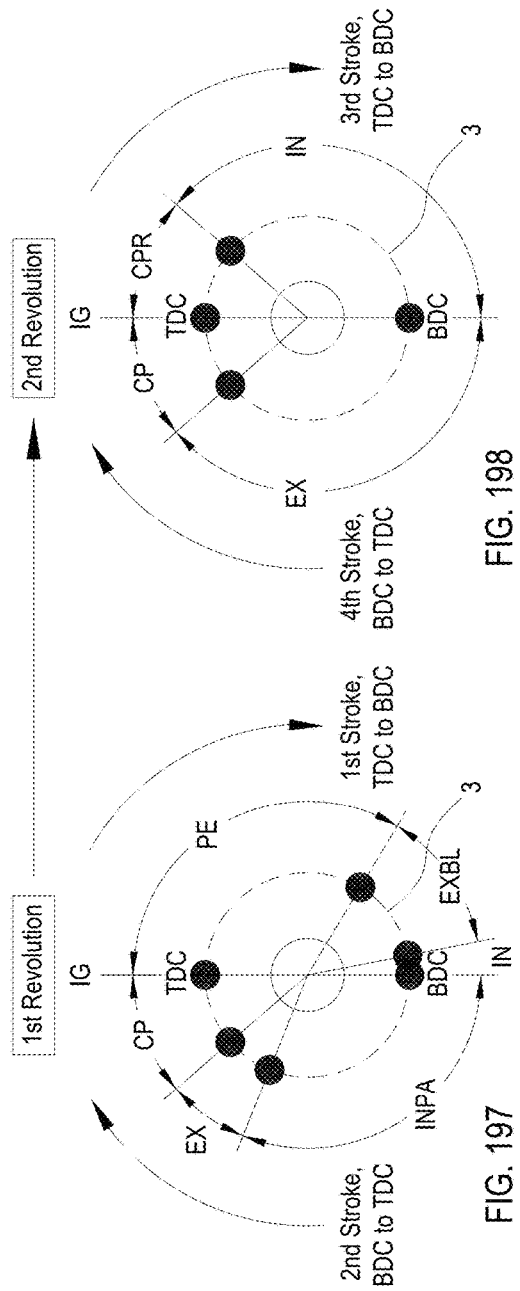
FIG. 197
FIG. 198
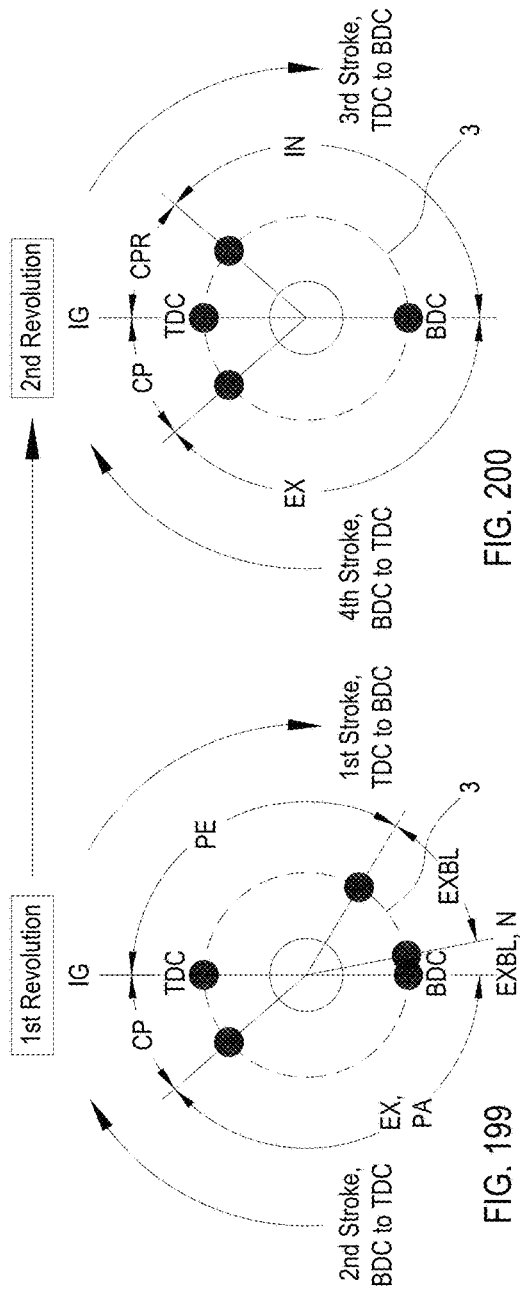
FIG. 199
FIG. 200

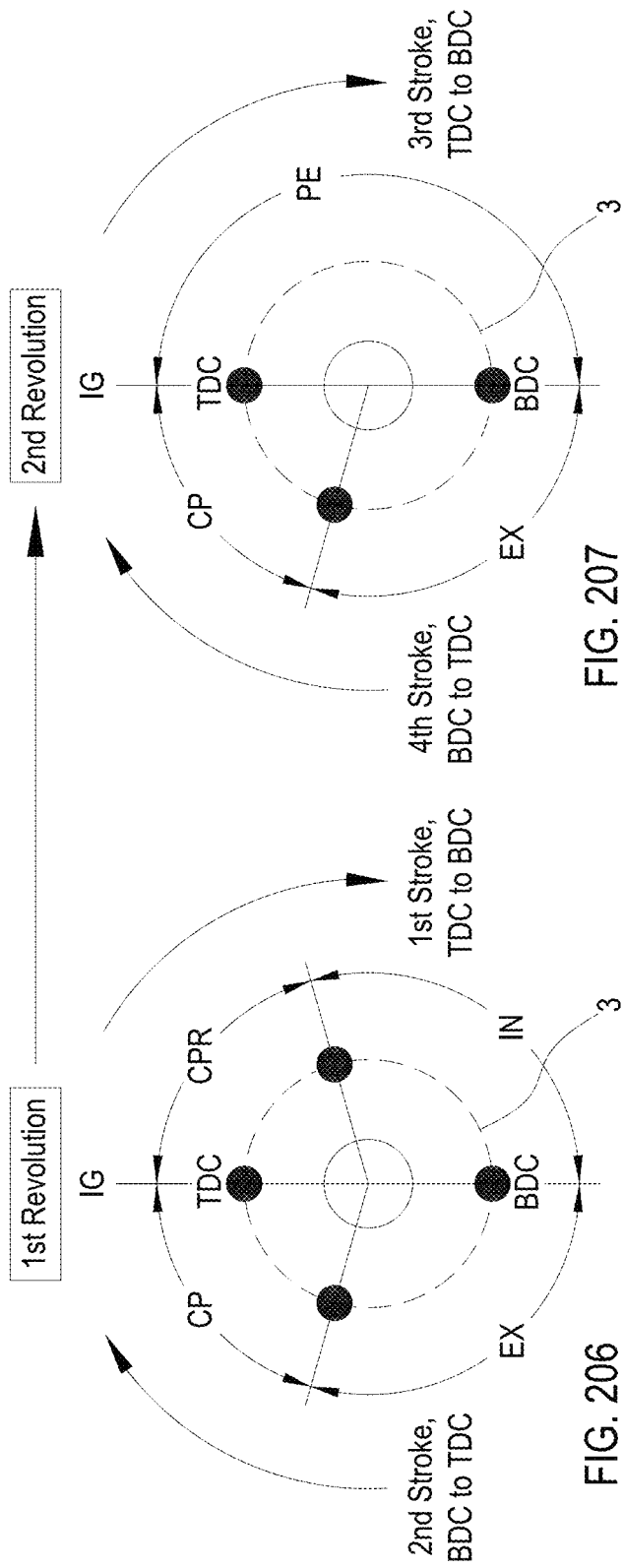

METHOD OF OPERATING AN INTERNAL COMBUSTION ENGINE UTILIZING HEAT IN ENGINE CYCLES

CROSS-REFERENCE TO RELATED APPLICATIONS

This patent application claims priority to, and incorporates by reference in its entirety, U.S. Provisional Patent Application No. 62/498,312, entitled "Method of Utilizing Heat in Engine Cycles", filed on Dec. 22, 2016.

TECHNICAL FIELD

The present invention relates to combustion engines. More specifically, the present invention relates to internal combustion engine cycles.

BACKGROUND

Internal combustion engines play a dominant role in our life; we rely on these fuel-burning machines as a way to provide energy for our everyday needs. Whether recognized or not for our dependence upon them, they're literally one of the most relied upon inventions in the world.

The art and theory behind conventional engines is well-known. Because engines are designed to work in a wide variety of conditions their construction, fuel arrangements, means of ignition, etc., vary. Standard mechanical construction of engines tends to utilize a cylinder with a fit piston which is connected to a crankshaft. Unconventional construction of engines varies greatly; anything from opposed piston designs, to free piston designs, etc., to all kinds of rotary designs which usually have some type of rotor or vane, rather than a conventional piston, to displace a volume. Since an engine's cycle is usually independent of its construction, different construction techniques can be applied to work with a variety of engine cycles (such as 2-stroke cycles, 4-stroke cycles, etc.).

The main goal of an internal combustion engine is to produce useable power efficiently; i.e. to provide the most power while using the least amount of fuel. Special cases exist where other factors such as power to weight, power to displacement or size, or even low manufacturing cost are more sought after than fuel economy (thermal efficiency), but the overall objective is to provide power with fuel efficiency, with other factors considered. That said, the useable energy produced from the best engines running at optimal conditions is only around 25% to 50% of the fuel energy put into the engines. Because of this and because of increasingly tighter regulations on engines, there is an ongoing incentive and effort to raise these numbers and for a wider range past optimal conditions.

SUMMARY

The following is intended to be a brief summary of the invention and is not intended to limit the scope of the invention.

The present invention provides novel methods of phases, (phases such as intake, exhaust, etc. or combinations of phases), and/or change in existing phases that would occur in a conventional engine, some without relying on mechanical displacement of the piston (mechanical breathing) like in a conventional engine, to produce new engine cycles by utilizing heat transfer. Using these methods in new engine cycles produces an engine that can achieve higher thermal efficiencies for wider ranges of operating conditions.

The present invention provides novel methods of directly and/or indirectly creating and/or efficiently utilizing gas change(s) created by directly and/or indirectly utilizing an engine's heat to use in new efficient engine cycles.

In an aspect of the present invention, heat is utilized in an engine from hot expanded combustion gases to produce contraction(s) created from the cooling of the combustion gases.

In an aspect of the present invention, heat is utilized by directing it to preheat substance(s) to be and/or being injected which affects the way the substance(s) interacts in the engine and resulting gas change(s) in phases of the engine cycle.

In an aspect of the present invention, timed gas change(s) can be utilized to contract independently of a changing volume produced by the displacement of the engines piston or other mechanical means. The gas contraction(s) can be manipulated to produce different effects for different phases during a cycle of the engine.

In an aspect of the present invention, timed gas change(s) can be utilized to expand independently of a changing volume of gases produced by the displacement of the engines piston or other mechanical means or the combustion pressure from the fuel-air mixture in the engine itself. The gas expansion(s) can be manipulated to produce different effects for different phases during a cycle of the engine.

BRIEF DESCRIPTION OF THE DRAWINGS

A clear understanding of the key features of the invention summarized above may be had by reference to the appended drawings which illustrate method and system of the present invention, although it will be understood that such drawings depict embodiments of the invention and, therefore, are not to be considered as limiting its scope with regard to other embodiments which the invention is capable of contemplating. Preferred embodiments and best mode features depend on mechanical features and construction of the engine along with how the engine is intended to be used. Details of engine construction are well known and the accompanying drawings are merely intended to easily and clearly demonstrate examples of methods of the present invention and show how these methods can interact with an engine and in its cycles. Please note the stroke numbers below refer to the thermodynamic cycles.

Accordingly:

FIG. 1 illustrates a simple flow chart of main factors applying to methods of the present invention.

FIG. 2 is a sectional cut drawing showing an illustrative embodiment that methods of the present invention can be carried out in.

FIG. 3 is a sectional cut drawing illustrating scaled up pieces of FIG. 2.

FIG. 4 is a diagrammatic drawing illustrating a 2-stroke cycle that could be carried out in an embodiment similar to FIG. 2.

FIG. 5 is a sectional cut drawing illustrating an embodiment that methods of the present invention can be carried out in.

FIG. 6 to FIG. 41 are diagrammatic drawings illustrating 2-stroke cycles that could be carried out in an embodiment similar to FIG. 5.

FIG. 42 is a sectional cut drawing illustrating an embodiment that methods of the present invention can be carried out in.

FIG. 45 is a sectional cut drawing illustrating an embodiment that methods of the present invention can be carried out in.

FIG. 46 is a sectional cut drawing illustrating scaled up pieces of FIG. 45.

FIG. 47 to FIG. 51 are diagrammatic drawings illustrating 4-stroke cycles that could be carried out in an embodiment similar to FIG. 45.

FIG. 52 is a sectional cut drawing illustrating an embodiment that methods of the present invention can be carried out in.

FIG. 53 is a sectional cut drawing illustrating scaled up pieces of FIG. 52.

FIG. 56 and FIG. 59 are sectional cut drawings illustrating embodiments that methods of the present invention can be carried out in.

FIG. 57 is a sectional cut drawing illustrating a scaled up BOS chamber with open reed valves like shown in FIG. 56.

FIG. 58 is a sectional cut drawing illustrating a scaled up BOS chamber similar to that shown in FIG. 57 but with closed reed valves.

FIG. 60 is a sectional cut drawing illustrating scaled up pieces of FIG. 56.

FIG. 61 is a sectional cut drawing illustrating pieces of an open-sided dome-shaped dead volume cavity head with a lower dead volume which is similar to the higher dead volume head of a similar design of FIG. 60.

FIG. 62 is a sectional cut drawing illustrating scaled up pieces of an open-sided dome-shaped dead volume cavity head with a lower dead volume which is similar to the higher dead volume head like shown in FIG. 59.

FIG. 63 is a sectional cut drawing illustrating scaled up pieces of FIG. 62.

FIG. 64 to FIG. 66 are diagrammatic drawings illustrating 4-stroke cycles that could be carried out in an embodiment similar to FIG. 56 or FIG. 59.

FIG. 79 is a sectional cut drawing illustrating an embodiment of a three valve engine (the intake and exhaust valves are shown drawn over top one another) that methods of the present invention can be carried out in.

FIG. 86 and FIG. 88 are sectional cut drawings illustrating embodiments that methods of the present invention can be carried out in.

FIG. 91 and FIG. 94 are sectional cut drawings illustrating embodiments that methods of the present invention can be carried out in.

FIG. 92 is a sectional cut drawing illustrating scaled up pieces of FIG. 91.

FIG. 93 is a sectional cut drawing illustrating scaled up section of FIG. 92.

FIG. 95 is a sectional cut drawing illustrating scaled up pieces of FIG. 94.

FIG. 96 to FIG. 100 are sectional cut drawings illustrating embodiments that methods of the present invention can be carried out in.

FIG. 111 and FIG. 114 are sectional cut drawings illustrating embodiments that methods of the present invention can be carried out in.

FIG. 112 is a sectional cut drawing illustrating scaled up pieces of FIG. 111.

FIG. 113 is a sectional cut drawing illustrating scaled up pieces of FIG. 112.

FIG. 115 is a sectional cut drawing illustrating scaled up pieces of FIG. 114.

FIG. 116 is a sectional cut drawing illustrating scaled up pieces of FIG. 115.

FIG. 153 is a sectional cut drawing illustrating an embodiment that methods of the present invention can be carried out in.

FIG. 154 is a straight on view illustrating port 23 of FIG. 153.

FIG. 155 is a sliced cylinder view of FIG. 153 taken at the center of port 23 of FIG. 153.

FIG. 156 is a sectional cut drawing illustrating an embodiment that methods of the present invention can be carried out in.

FIG. 157 is a sectional cut drawing illustrating scaled up pieces of a section of the cylinder 8 of FIG. 156.

FIG. 158 is a sectional cut drawing illustrating an embodiment that methods of the present invention can be carried out in.

FIG. 159 is a sectional cut drawing illustrating scaled up pieces of a section of the cylinder 8 of FIG. 158.

FIG. 160 is a sectional cut drawing illustrating scaled up pieces of a section of the cylinder 8 of FIG. 158.

FIG. 161 is a sectional cut drawing illustrating a scaled up piece of a device that can be used in various embodiments of FIG. 153 or FIG. 156.

FIG. 166 to FIG. 168 are diagrammatic drawings illustrating a flow chart of 2-stroke cycles that could be carried out in an embodiment similar to FIG. 153, FIG. 156 or FIG. 158.

FIG. 169 is a sectional cut drawing showing an illustrative embodiment that methods of the present invention can be carried out in.

FIG. 170 to FIG. 185 are diagrammatic drawings illustrating 2-stroke cycles that could be carried out in an embodiment similar to FIG. 169.

FIG. 186 to FIG. 188 are diagrammatic drawings illustrating a flow chart of 2-stroke and 4-stroke cycles that could be carried out in an embodiment similar to FIG. 169.

FIG. 189 to FIG. 192 are diagrammatic drawings illustrating a flow chart of 2-stroke cycles that could be carried out in an embodiment similar to FIG. 169.

FIG. 193 to FIG. 195 are diagrammatic drawings illustrating a flow chart of 2-stroke and 4-stroke cycles that could be carried out in an embodiment similar to FIG. 169.

FIG. 196 is a diagrammatic drawing illustrating a 2-stroke cycle that could be carried out in an embodiment similar to FIG. 169.

FIG. 197 and FIG. 198 are diagrammatic drawings illustrating a flow chart of 4-stroke cycles that could be carried out in an embodiment similar to FIG. 169.

FIG. 199 and FIG. 200 are diagrammatic drawings illustrating a flow chart of 4-stroke cycles that could be carried out in an embodiment similar to FIG. 169.

FIG. 206 to FIG. 207 are diagrammatic drawings illustrating 4-stroke cycles.

DETAILED DESCRIPTION OF THE INVENTION

Figure 9:
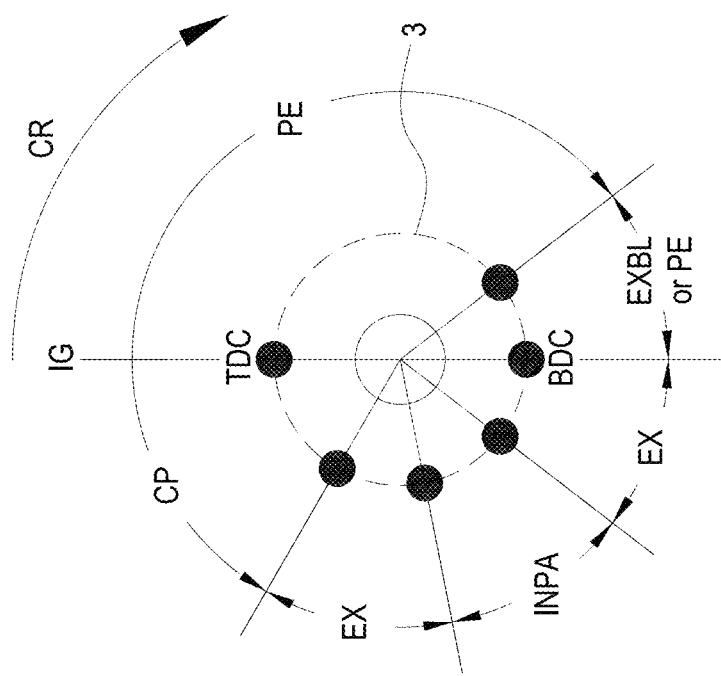
Figure 8:
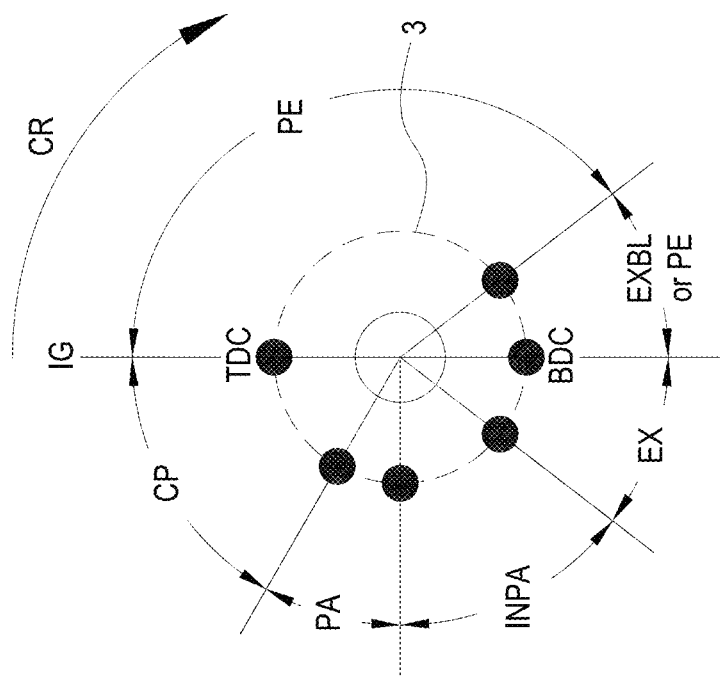
Figure 11:
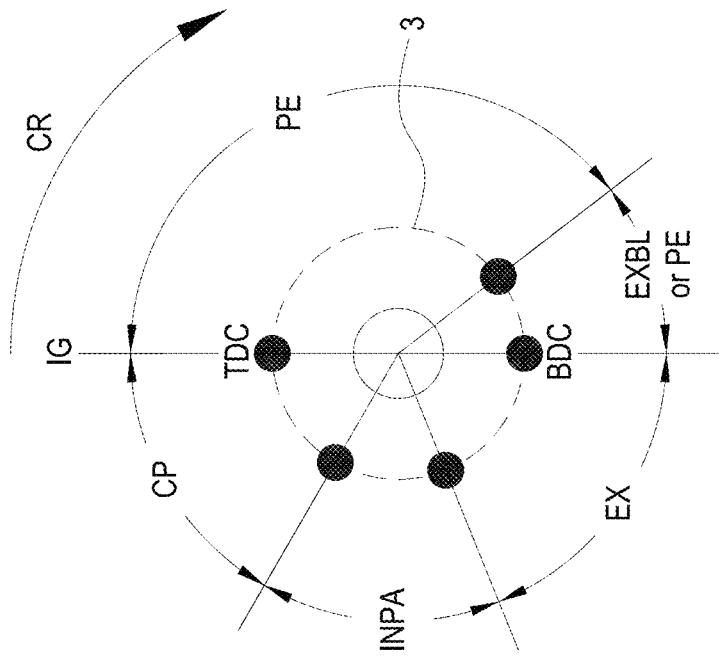
Figure 10:
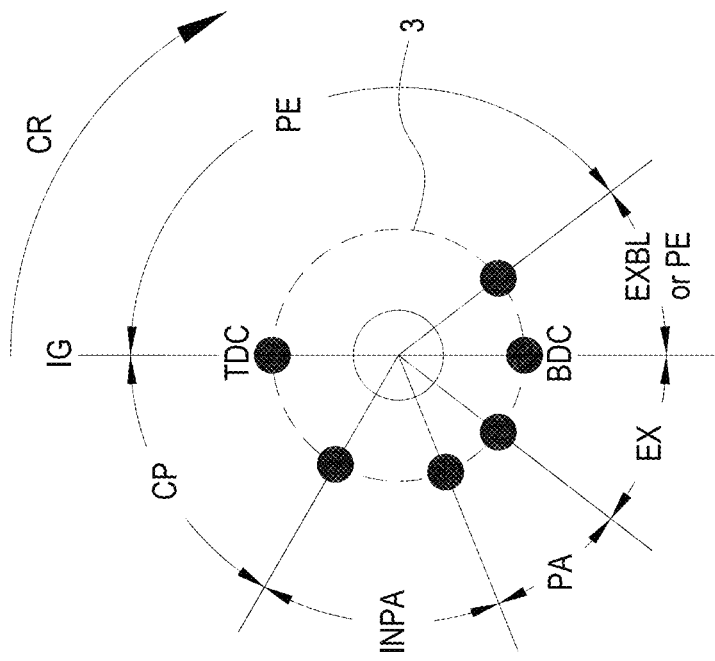

The terminology used herein is for the purpose of describing particular characteristics of the present invention and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, specify the presence of features, steps, operations, elements, and/or components, but do not preclude addition of one or more other features, steps, operations, elements, components, and/or groups thereof.

In describing the present invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Novel methods of phases that utilize heat to produce new efficient engine cycles are discussed herein. In the following description, for the purposes of explanation, numerous specific details in text and simple and clearly defined drawings are set forth in order to provide a thorough understanding of the present invention. The present disclosure is to be considered as an explication of the invention, and is not intended to limit the invention to the specific embodiments illustrated to the figures or description below.

It must be noted that because of decades of mistakes in engine history, some on purpose and some not, true history varies widely from todays accepted history and terminology. Because of this, engine terms and jargon have been and is constantly changing and evolving as society sees fit. To help add clarity to terms and meanings used herein, some words and phrases have been described below. It is to be understood that this list is to help add clarity to some terms used herein and it is not meant to limit these terms in an idealized or overly formal sense to the specific wording in the brief meanings given.

As used herein, unless otherwise noted; "Heat" means energy that is in transition; energy that is being transferred, flowing, etc.

"Efficient" means trying to achieve maximum productivity with minimum wasted effort, consumption, and sometimes expense.

"Utilize" (utilizing) means taking advantage of; not wasting something; to make practical and effective use of.

"Phase" means a stage, event, area or portion in a process of change or forming part of something's development; to carry out something in gradual stages or areas sometimes without definite boundaries. (examples include, intake phase, exhaust phase, injection phase, mixing phase, ignition phase, combustion phase, expansion phase, etc.).

"Stroke" means the mechanical movement of the piston (like in a conventional engine) in which the piston travels completely from top dead center (TDC) to bottom dead center (BDC), or vice-versa which defines a mechanical phase of the engine in its mechanical cycle.

"Cycle" means a complete set of series, phases, events and/or operations etc. that can recur regularly and in some cases may not always repeat in the same order, and that usually lead back to some starting point.

"Heat engine cycle" means the operations of thermodynamic phases that form a cycle for the conversion of heat into work in which all the phases of the cycle take place in the engine(s) (including rigidly linked parts and/or parts powered directly or indirectly by the engine(s), and the phases themselves or the changes in them are powered either directly or indirectly by (heat) energy taken from an outside source (fuels, steam, etc.) that is used by the engine(s). A heat engine cycle is independent of the mechanical construction of the engine(s), turbine(s), etc. that the phases of heat engine cycle are carried out in. A heat engine cycle can also be referred to as a thermodynamic (engine) cycle.

"New efficient complete thermodynamic engine cycle" means novel methods of phases and operations involved in a fuel utilizing heat engine cycle at its microscopic level which did not exist under certain circumstances or in a certain place before.

"Mechanical cycle of engine" means the sequence of motion or mechanism of an engine's parts, pieces and related systems (mechanical, electrical, etc.) that are in action during its mechanized cycle. Mechanical cycle(s) of engine(s) are independent of the phases of the heat engine cycle(s) that are carried out in the engine(s).

"2-stroke", "4-stroke", etc., means common phrases that come from shortening the name of the other common phrases 2-stroke cycle, 4-stroke cycle, etc., in which the corresponding number defines an engine's stroke number of its mechanical cycle. The number value relates to the number of strokes it takes the piston (like in a conventional engine) in the working part of the engine to complete a mechanical cycle of the engine. An engine's stroke number is determined by its piston strokes per mechanical cycle and cannot always be determined universally by its crankshaft revolutions per mechanical cycle. In engines with charging cylinders or with more than one cylinder and/or piston area separate, sharing or joined to a combustion space, etc., the stroke number only pertains to the stroke count on one of the pistons or piston areas, (usually the main one and/or main side if there is one), and the stroke numbers of each piston, piston face, etc. do not add together. The stroke number describes the engine mechanically and is independent (not related to) the thermodynamic cycle of the engine (i.e. it's possible for two different engines to run on the same thermodynamic cycle but have different stroke numbers mechanically, for example, it is possible for a mechanical 4-stroke cycle engine to run on a 2-stroke cycle thermodynamically). Also note that the common phrases "2-stroke cycle", "4-stroke cycle" etc., are each a shortened version of an uncommon longer phrase describing an engine. If the engine has a piston movement in one direction (such as a piston moving in the path of a circle such as in a dounut-shaped cylinder) its piston would have one stroke, and if it's mechanical cycle took place each stroke of the piston the engine would be a 1-stroke, 1-stroke cycle engine. If that same engine had a mechanical cycle that took place every two strokes of the piston, the engine would be a 1-stroke, 2-stroke cycle engine. A conventional 2-stroke cycle engine is actually a 2-stroke, 2-stroke cycle engine (i.e. its piston movement has two strokes and its mechanical cycle repeats every two strokes of the piston). A conventional 4-stroke cycle engine is actually a 2-stroke, 4-stroke cycle engine using the full name of the phrase describing the engine mechanically.

"Directly" means in a direct manner; without delay; shortly; as soon as possible.

"Indirectly" means not in a direct course or path; in a roundabout way; not preceding straight to the point or object.

"Independent" means not requiring or relying upon something else.

"Manipulated" means to control, influence, steer or direct something.

"Bottom Dead Center" (BDC) means the point when the piston (like in a conventional engine) is instantaneously stopped when reversing at its outer position when containing a larger volume in the engines cylinder.

"Top Dead Center" (TDC) means the point when the piston (like in a conventional engine) is instantaneously stopped when reversing at its inner position when containing a smaller volume in the engines cylinder.

"Full dedicated stroke" means an engine's stroke in which the stroke is devoted to only one phase that utilizes pressure (such as an intake phase, an exhaust phase, a compression phase, a power phase, etc.) inside said engine's working cylinder, but which other phases can occur with.

"Thermal efficiency" means the amount of useful work a heat engine can do based on the amount of energy supplied to it. (Related terms are fuel efficiency, fuel economy, etc.).

"In an engine" means in the engine and its intake and/or exhaust tracts etc., that are part of the engines heat engine cycle.

"Contract" (contraction) means a reduction or decrease of size or amount, number, range, etc.

"Substance" means a certain type or mix of matter which may exist as a solid, powder, liquid or gas and that usually has an overall constant composition with certain properties.

"Conventional" means conforming or adhering to accepted standards; pertaining to convention or general agreement or practice.

"Novel"=means new and not resembling something formerly known, made or used; unusual and unique.

"i.e." means "in other words".

"Blast charge scavenge" (BCS) means a gust or burst of gases and/or vapor in a release/transfer of energy that is directed in a way to achieve movement or flow of other gases in order to help introduce fresh gases into an engine's cylinder, and it can also be used to help expel burnt gases from the cylinder either along with or without introducing an intake.

"Produce"=means to carry out, accomplish, execute, perform or accomplish something; as an assigned task or in accordance with a plan or design; cause, create, bring forth.

REFERENCES TO THE DRAWINGS—PART KEY

1=Center of crankshaft,
2=Crank throw,
3=Direction of crank throw travel,
4=Connecting rod,
5=Center of wrist pin,
6=Piston,
7=Direction of piston travel,
8=Cylinder,
9=Head,
10=Intake valve,
11=Exhaust valve,
12=Blow-out scavenging chamber (BOS chamber) valve,
13=Exhaust/intake valve,
14=Fuel injection line,
15=Water/steam injection line,
16=Fuel or water/steam injection line,
16a=Water/steam injection line,
16b=Fuel injection line,
17=Injector nozzle with surface area protruding into cylinder gases,
18=Reed valves,
19=Blow-out scavenging chamber (BOS chamber) and/or valves or lines,
20=Blast charge scavenging chamber (BCS chamber) and/or lines,
21=Exhaust port,
22=Intake port,
23=Exhaust/intake port,
24=Spark plug,
25=Adjustable restrictor,
26=Intake stream,
27=Exhaust stream,
28=Fuel Stream,
29=Water/steam stream,
30=Fuel or water/steam stream,
31=Rigid flow-controlling device,
32=Engine timing device & associated components,
33=Circuit wire for cylinder pressure sensor,
34=Pressure sensor for cylinder, 35=Circuit wire for injector nozzle pressure/temperature sensor,
36=Pressure Sensor for Injector Nozzle,
37=Open-sided dome-shaped dead volume cavity,
38=Surface area of injector nozzle protruding into combustion gases,
39=Surface area of the cylinder.

REFERENCES TO THE DRAWINGS—MECHANICAL KEY

CR=Crank rotation, (the direction the drawings should be read, i.e. clockwise),
TDC=Top dead center,
BDC=Bottom dead center,
INV=Intake valve,
INVO=Intake valve open,
INVC=Intake valve closed,
INPO=Intake port open,
INPC=Intake port closed,
TPO=Transfer port open,
TPC=Transfer port closed,
EXV=Exhaust valve,
EXVO=Exhaust valve open,
EXVC=Exhaust valve closed,
EXPO=Exhaust port open,
EXPC=Exhaust port closed.

REFERENCES TO THE DRAWINGS—OPERATIONAL/PHASE KEY

IG=Ignition,
CP=Compression,
CPR=Compression rebound,
PE=Power (from expansion),
PA=Power (from contraction),
N=Neutral pressure (approximate),
IN=Intake (together with positive displacement),
INPA=Intake and partial power (from contraction),
INBCS=Intake with the blast charge scavenging chamber (BCS chamber),
IND=Intake displacement (with valves, ports, etc. closed),
EX=Exhaust (together with positive displacement),
EXBL=Exhaust blow-out and partial power (from pressure),
EXPO=Calibrated exhaust pop-off pressure relief,
EXD=Exhaust displacement (with valves, ports, etc. closed),
ES=External suction (from BOS and/or BCS Chamber),
IWS=Water/steam injection,
IF=Fuel injection.

Figure 33:
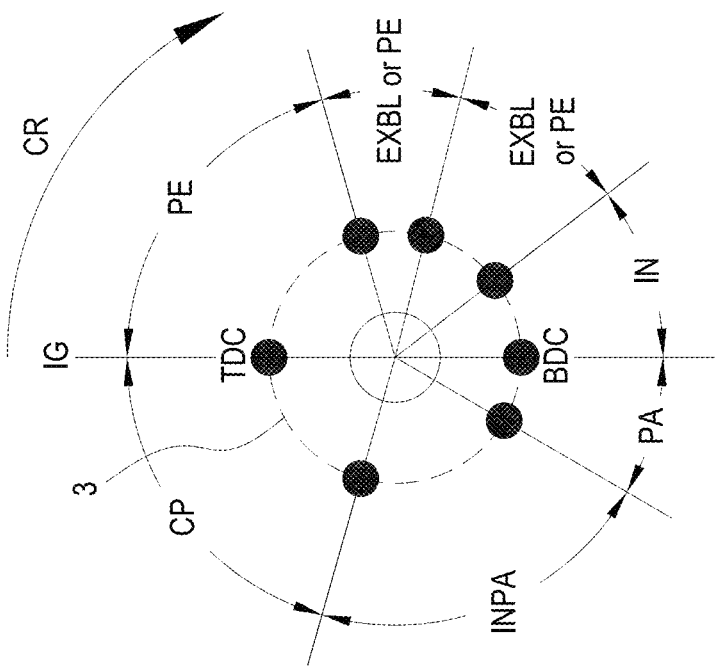
Figure 32:
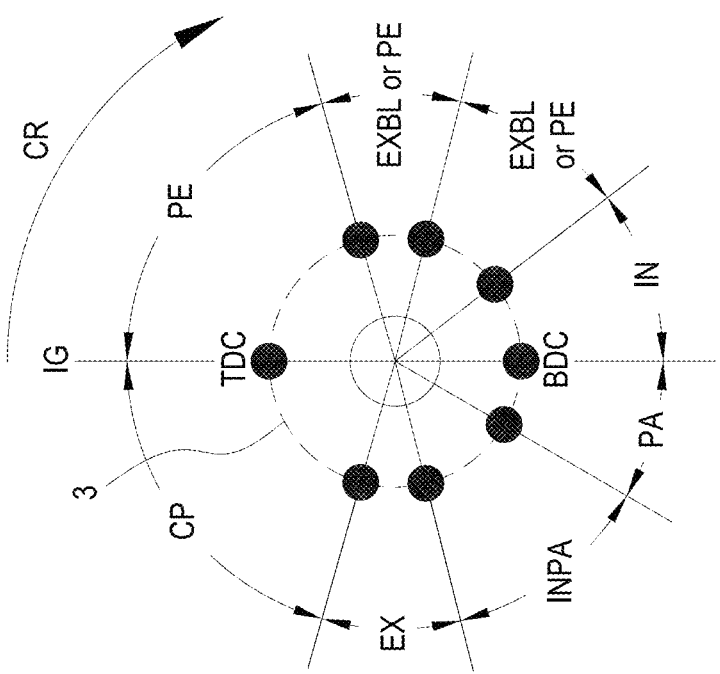
Figure 35:
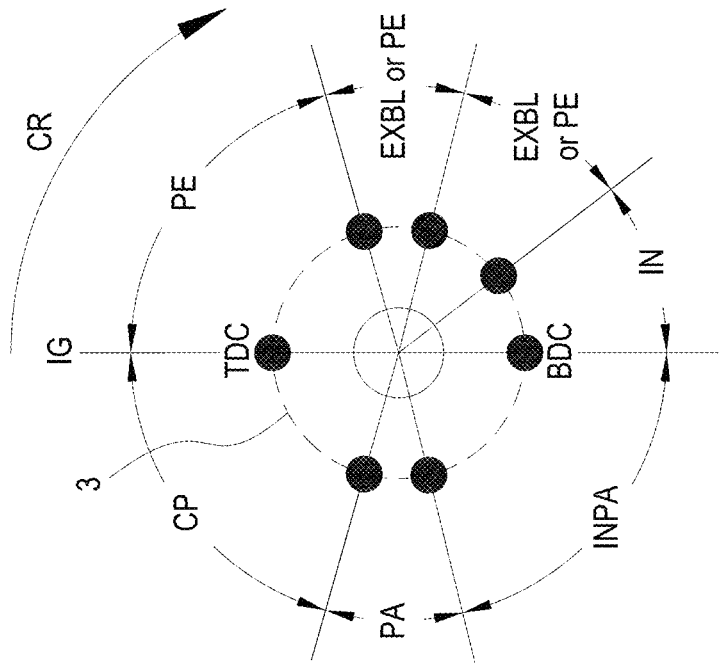
Figure 34:
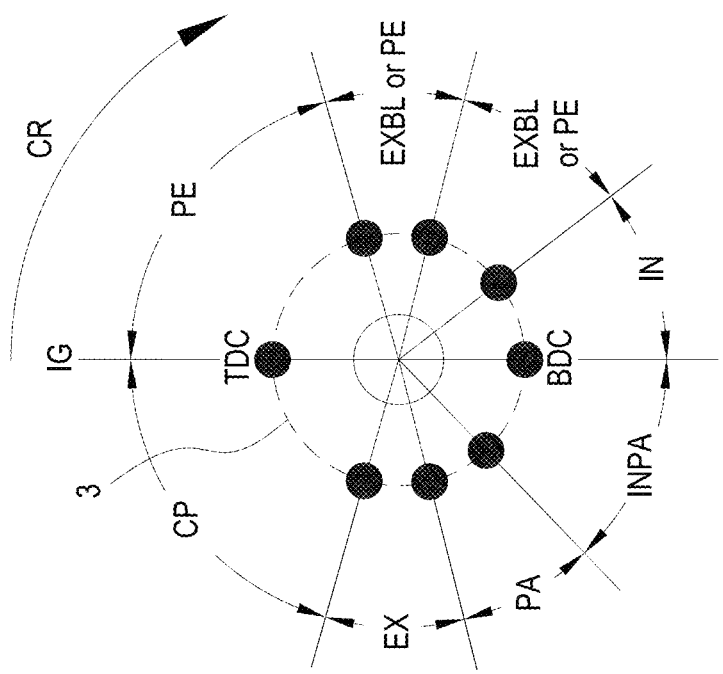
Figure 37:
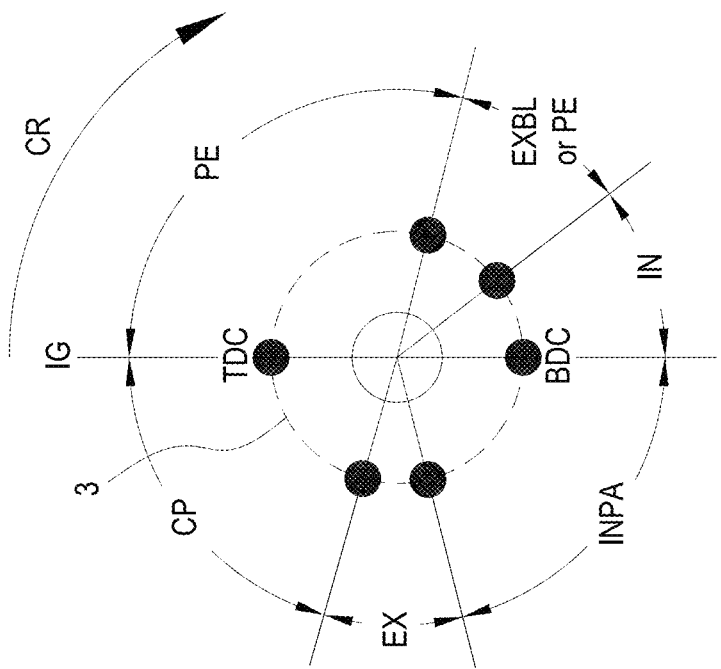
Figure 36:
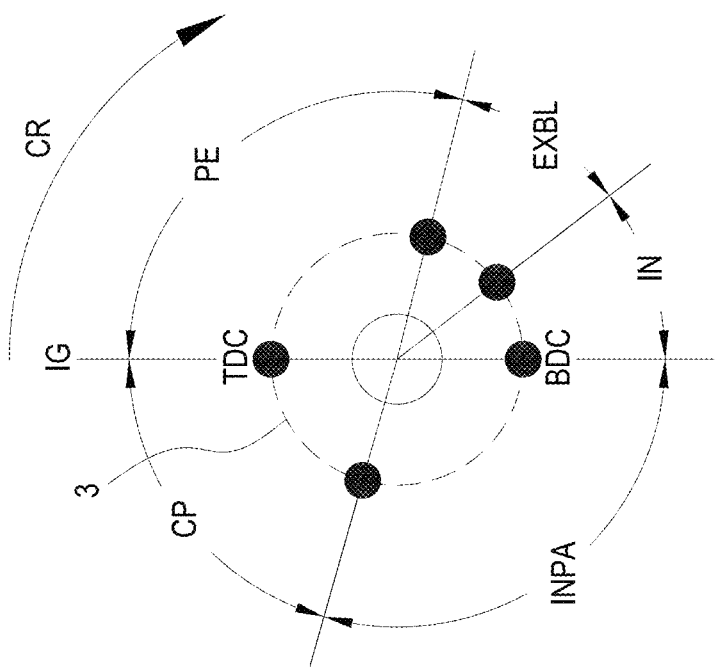
Figure 39:
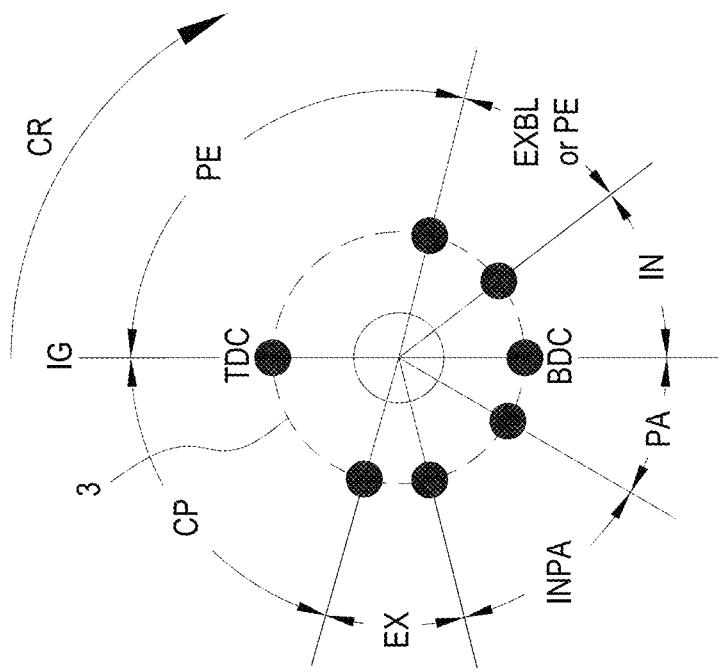
Figure 38:
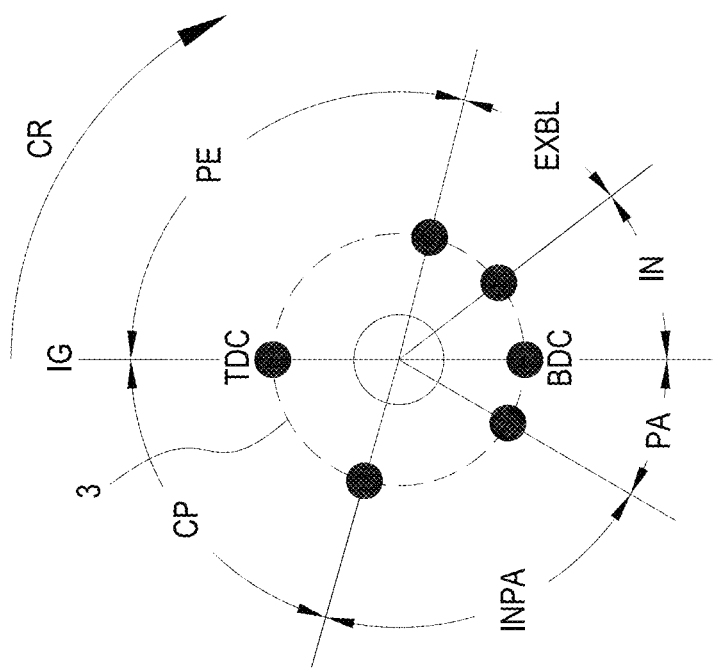
Figure 41:
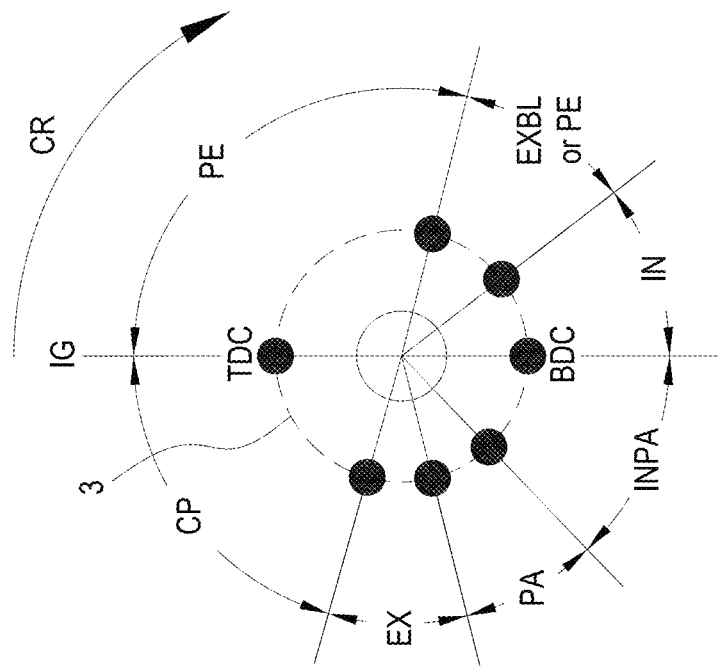
Figure 40:
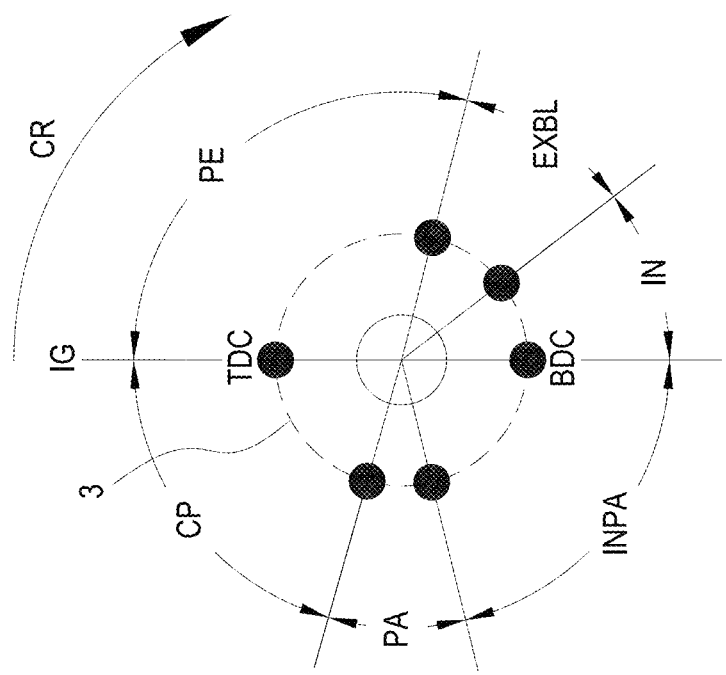
Figure 44:
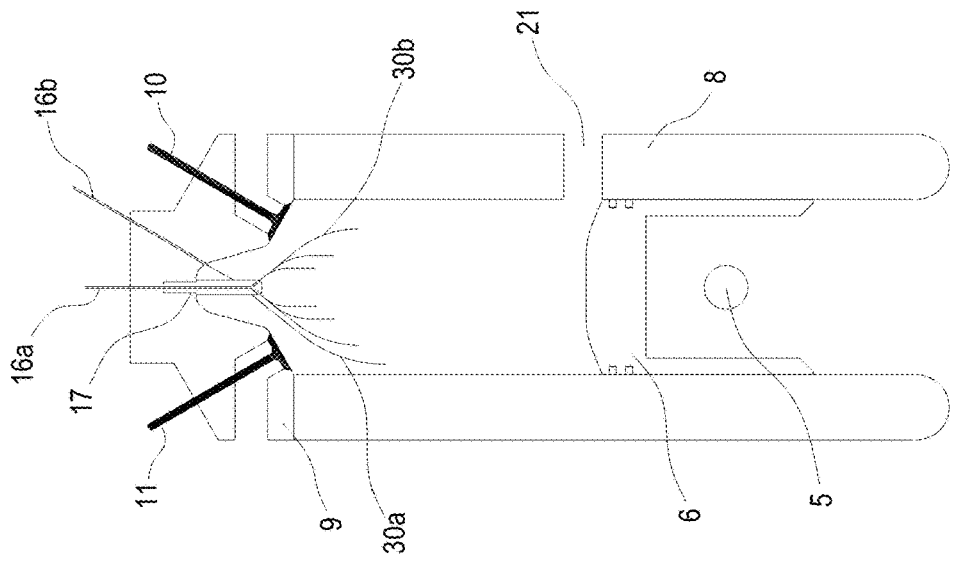
FIG. 44 is a sectional cut drawing illustrating scaled up pieces of FIG. 42.
Figure 43:
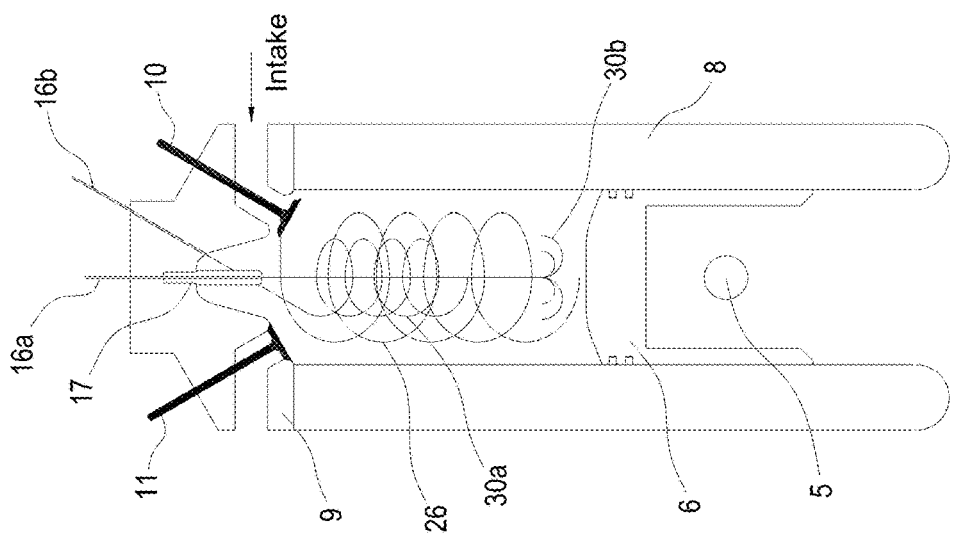
FIG. 43 is a sectional cut drawing illustrating scaled up pieces of FIG. 42.
Figure 42:
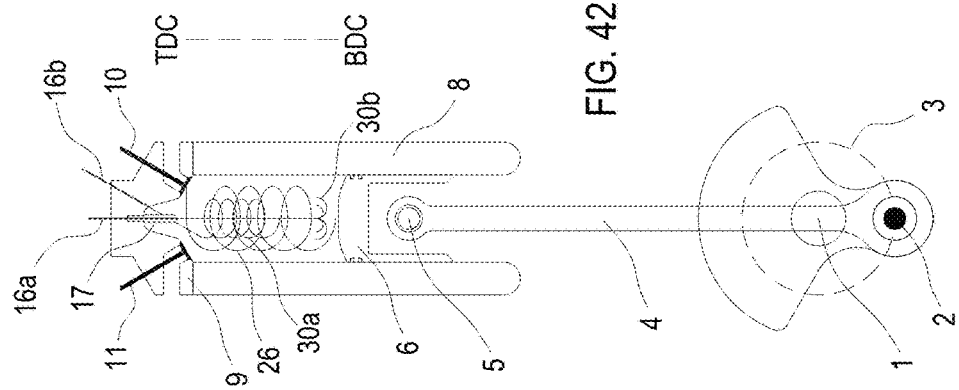
Figure 48:
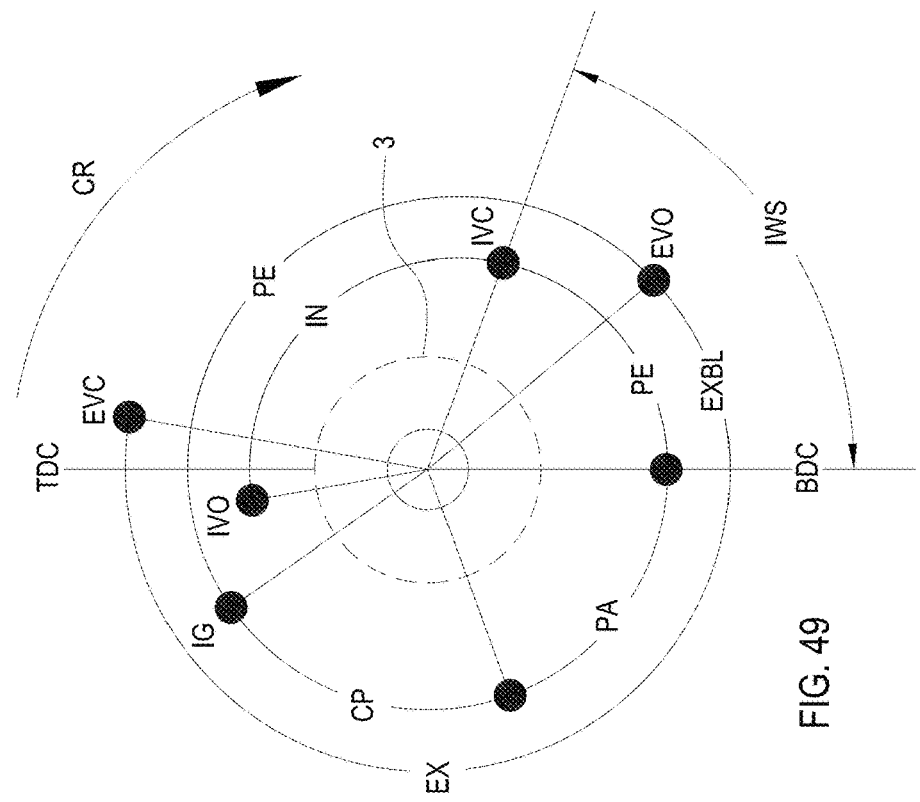
Figure 49:
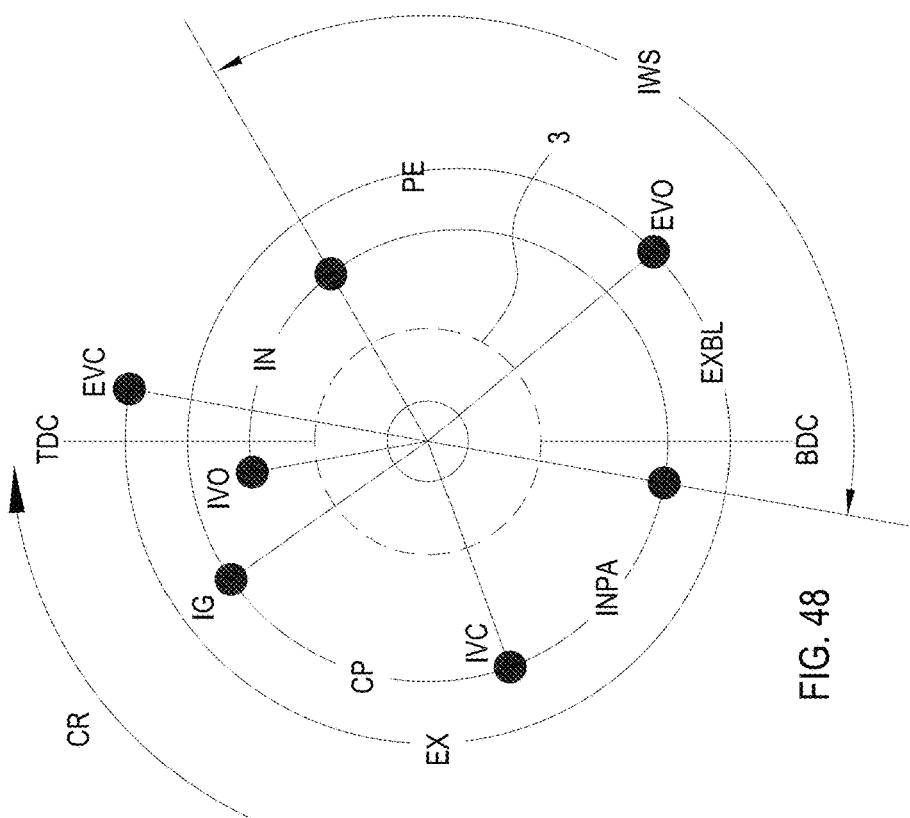
Figure 51:
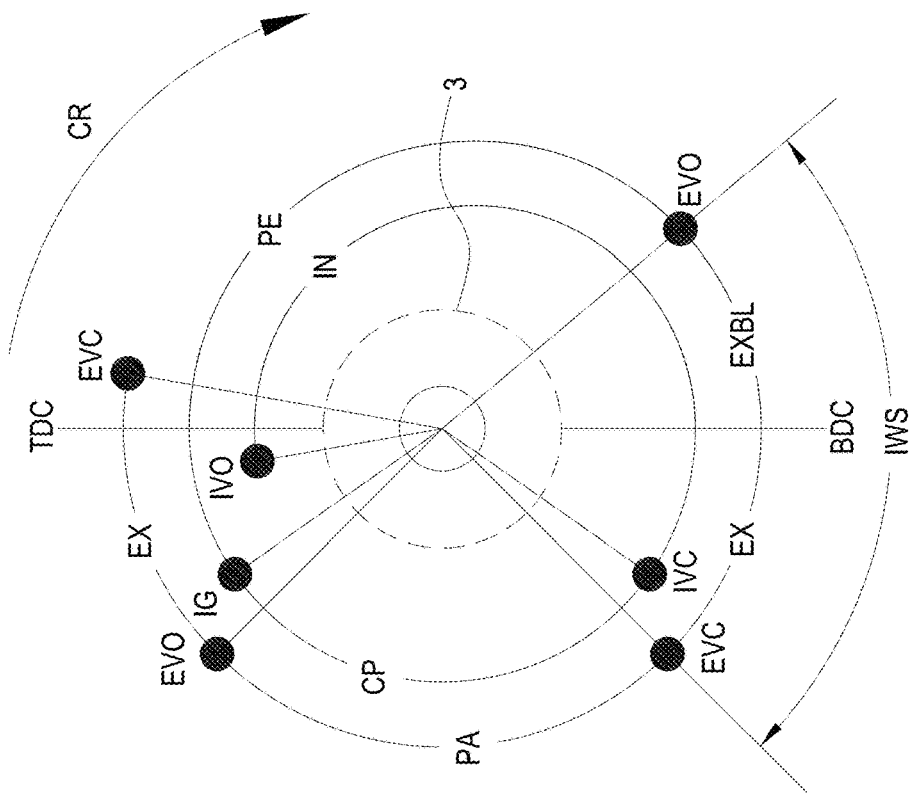
Figure 50:
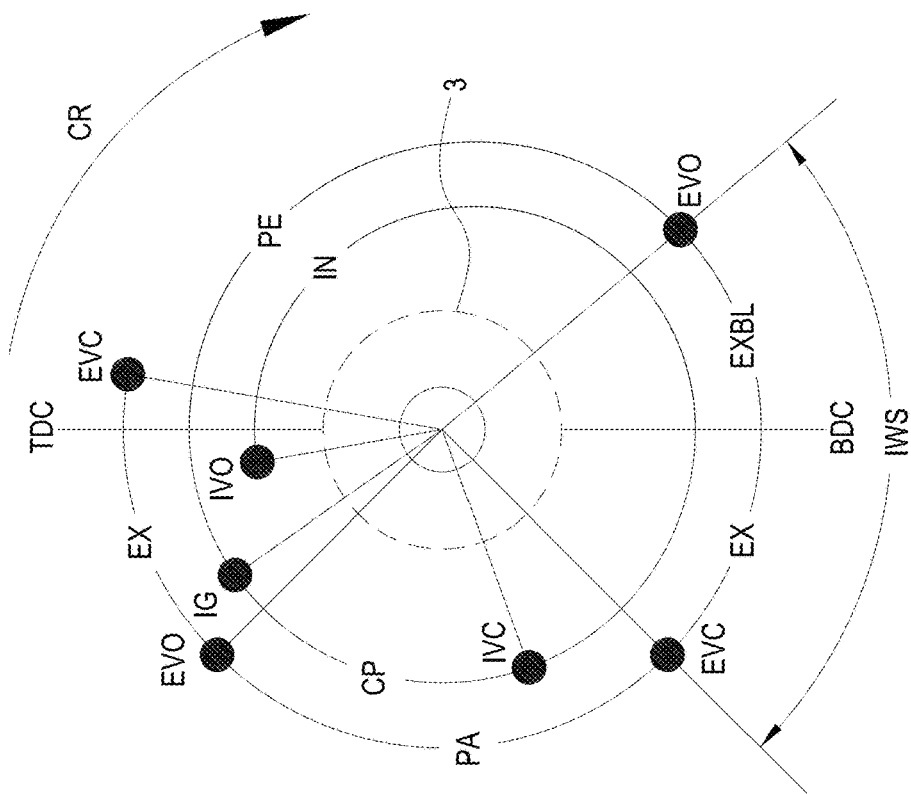
Figure 55:
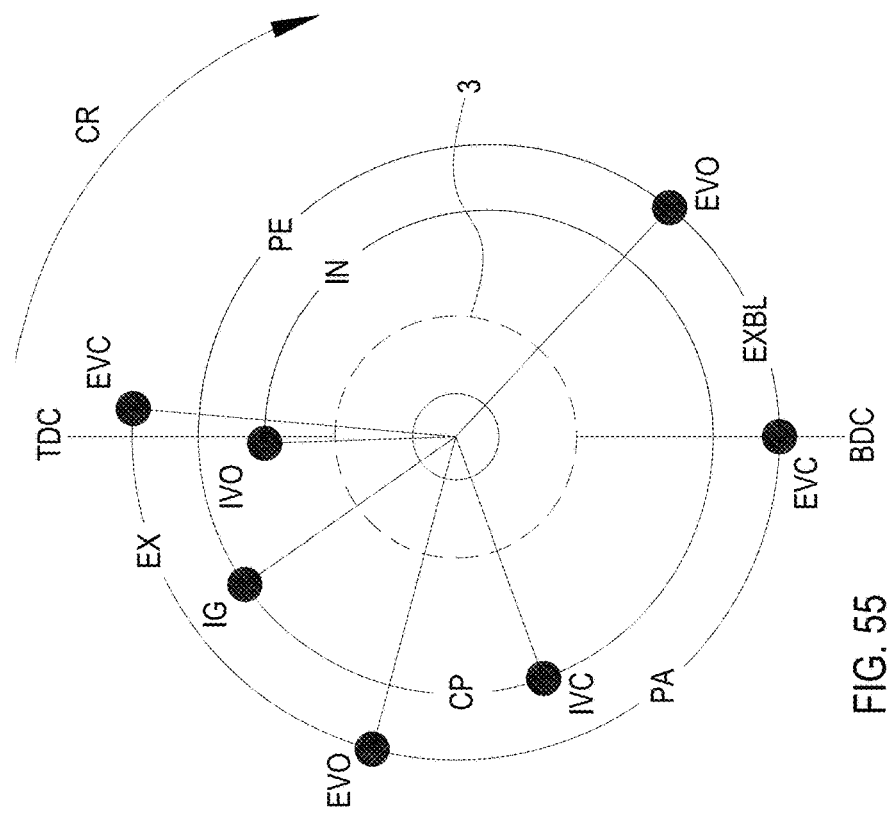
FIG. 54 and FIG. 55 are diagrammatic drawings illustrating 4-stroke cycles that could be carried out in an embodiment similar to FIG. 52.
Figure 54:
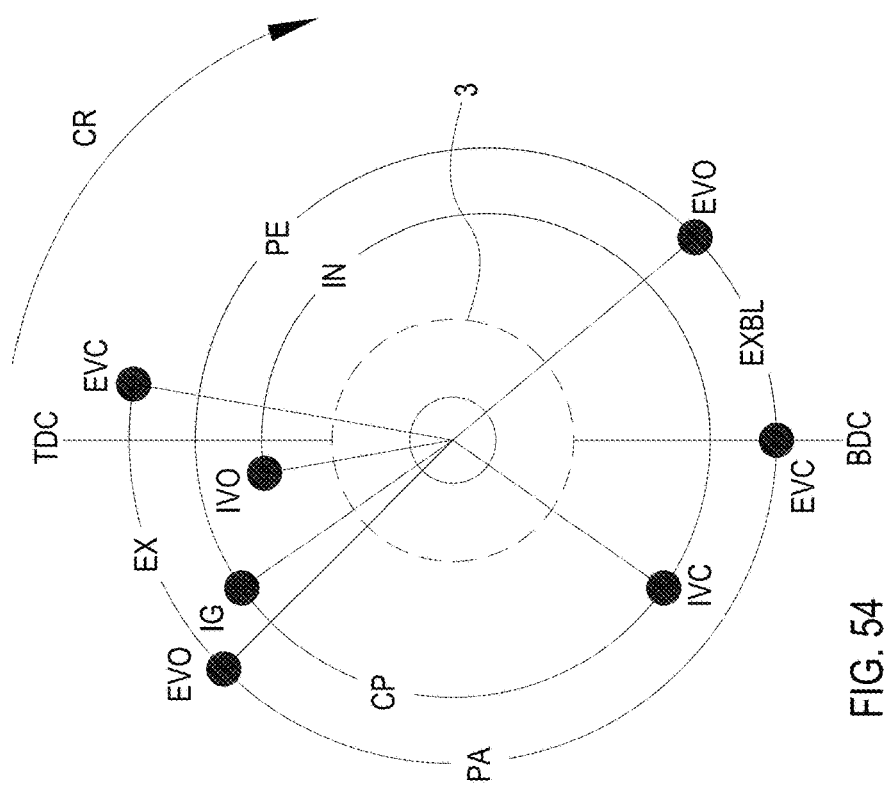
Figure 66:
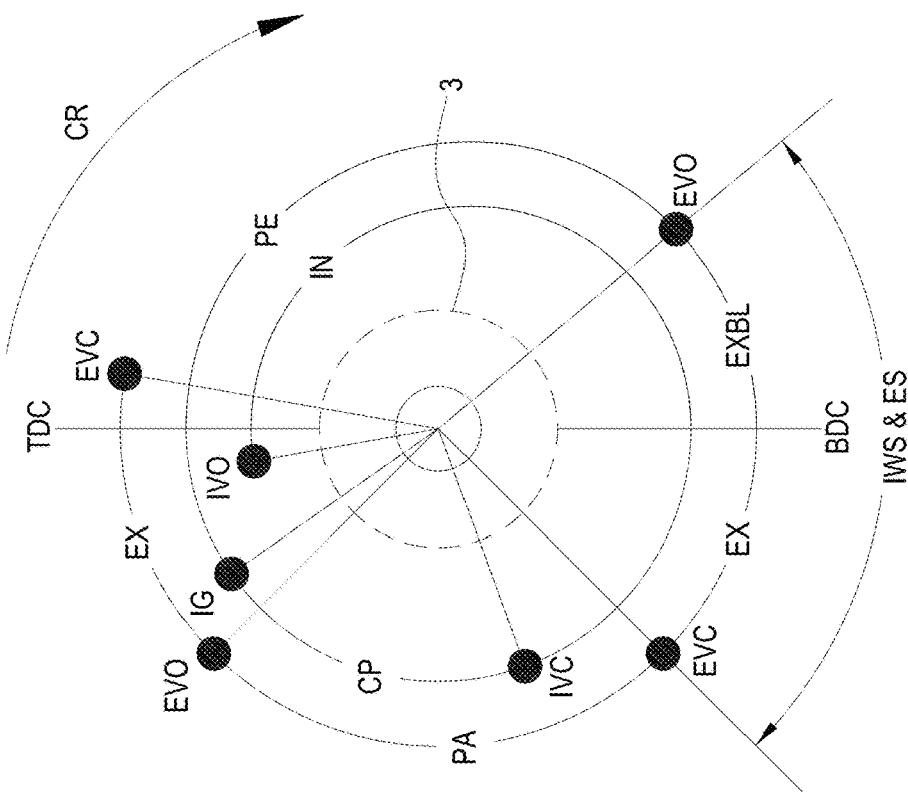
Figure 65:
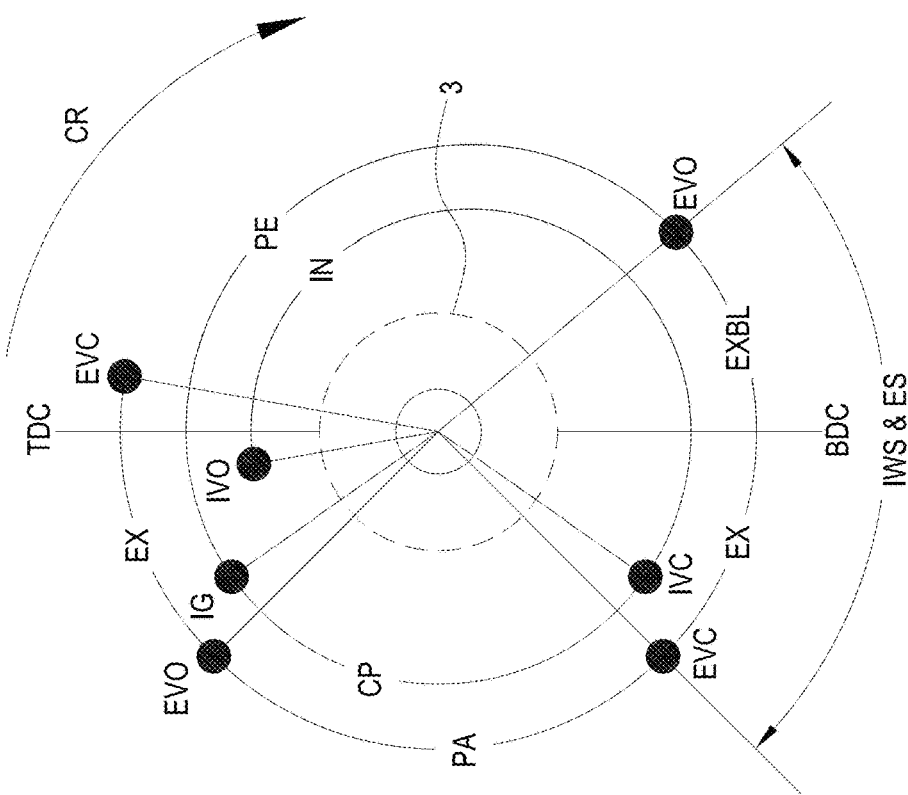
Figure 68:
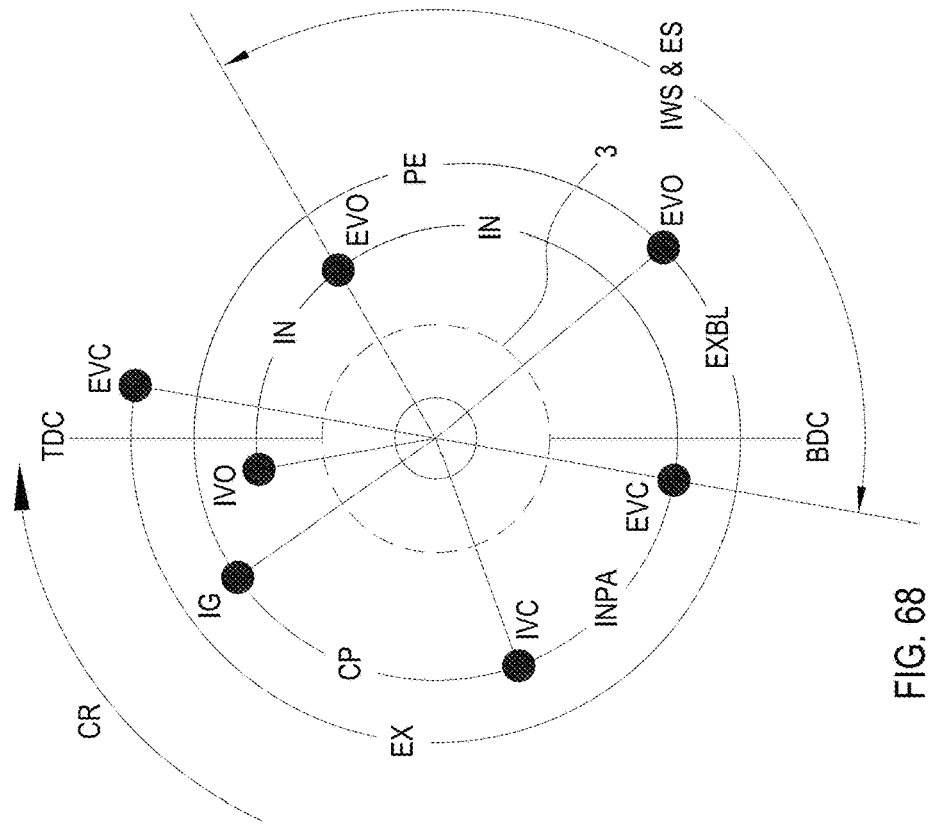
FIG. 67 to FIG. 78 are diagrammatic drawings illustrating 4-stroke cycles that could be carried out in an embodiment similar to FIG. 59.
Figure 67:
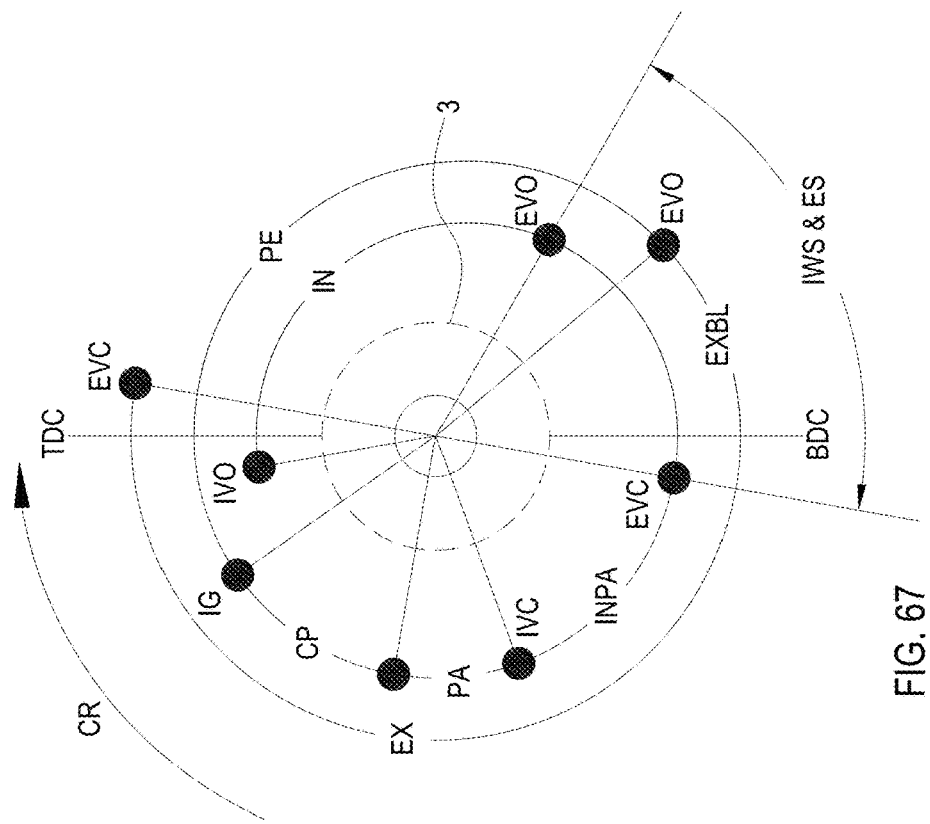
Figure 70:
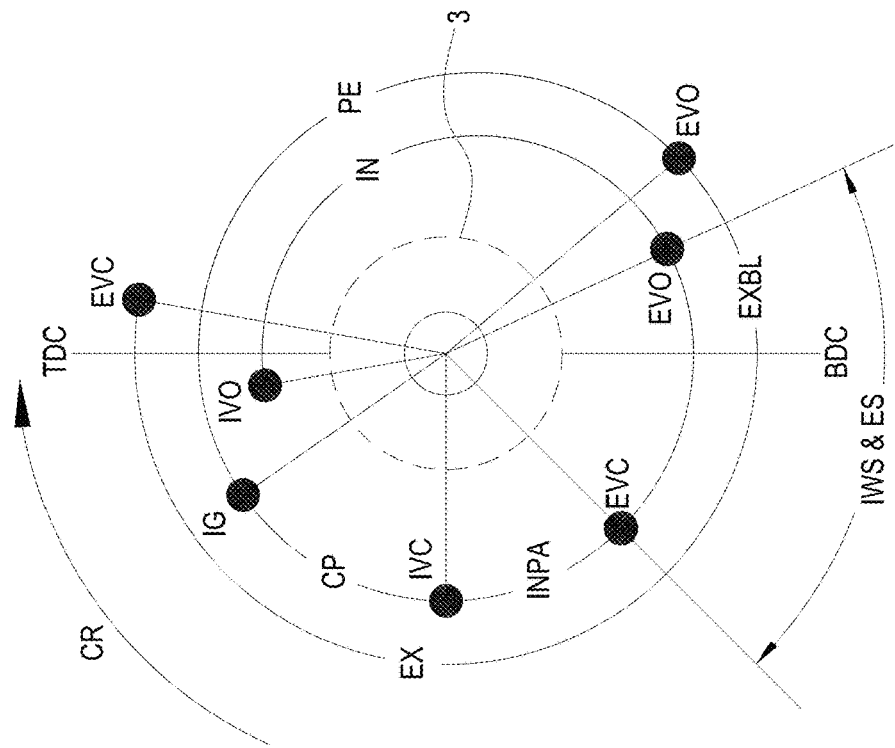
Figure 69:
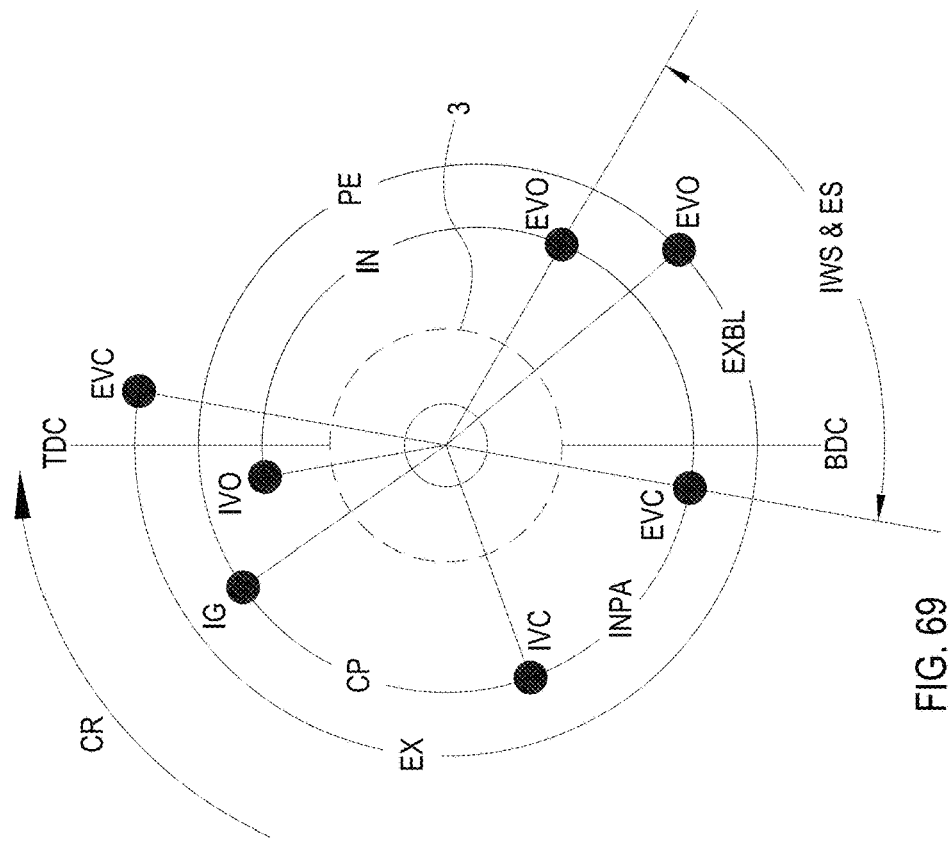
Figure 72:
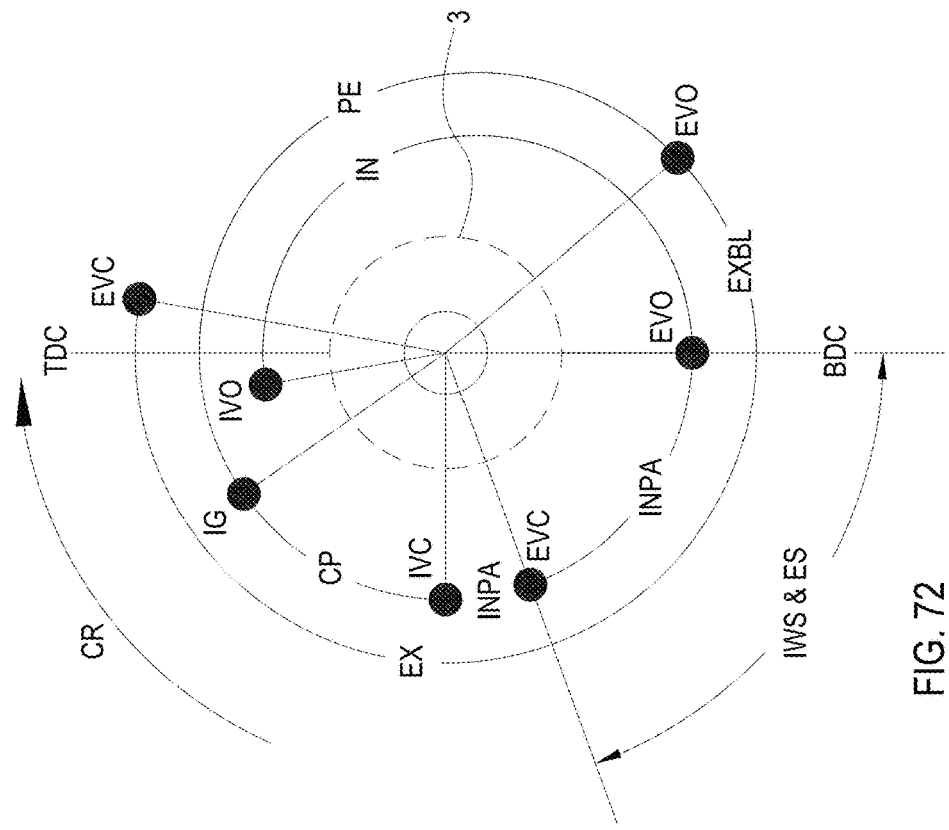
Figure 71:
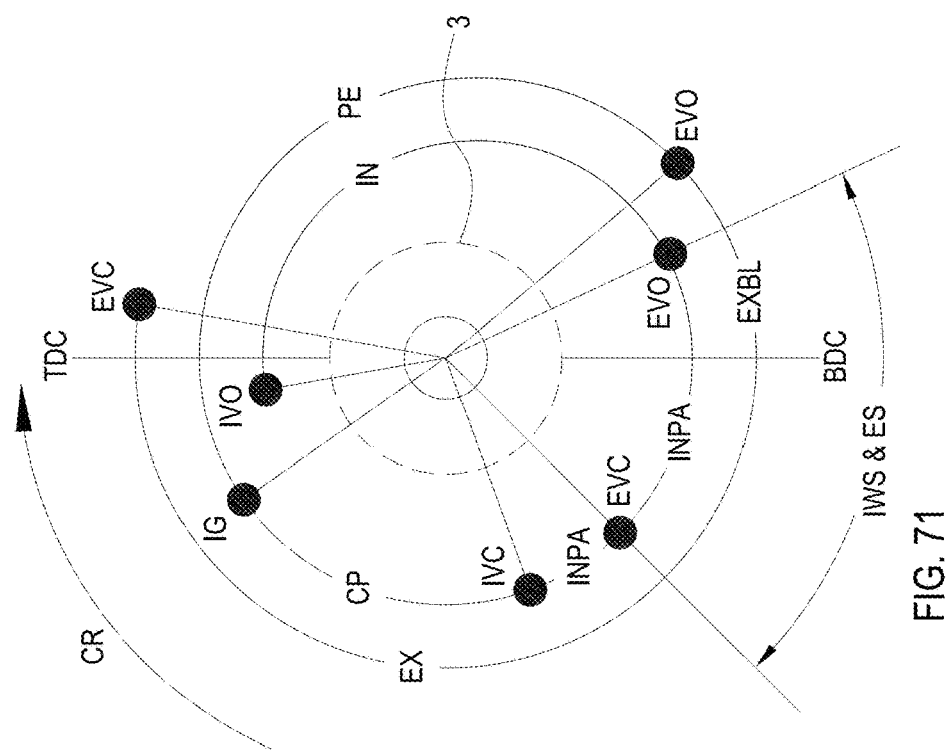
Figure 74:
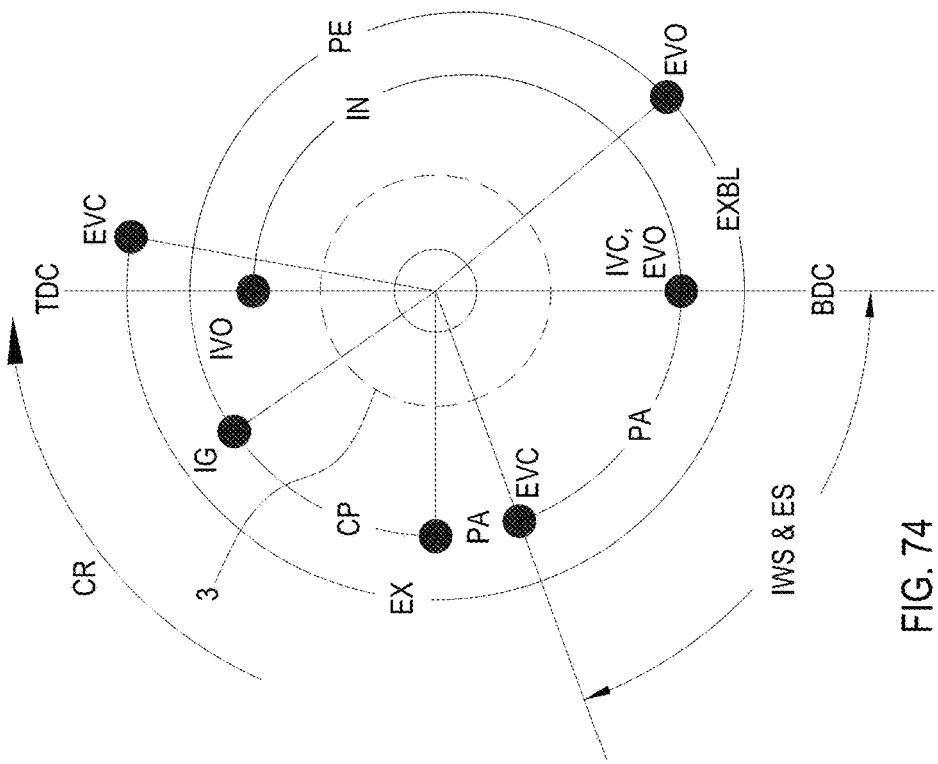
Figure 73:
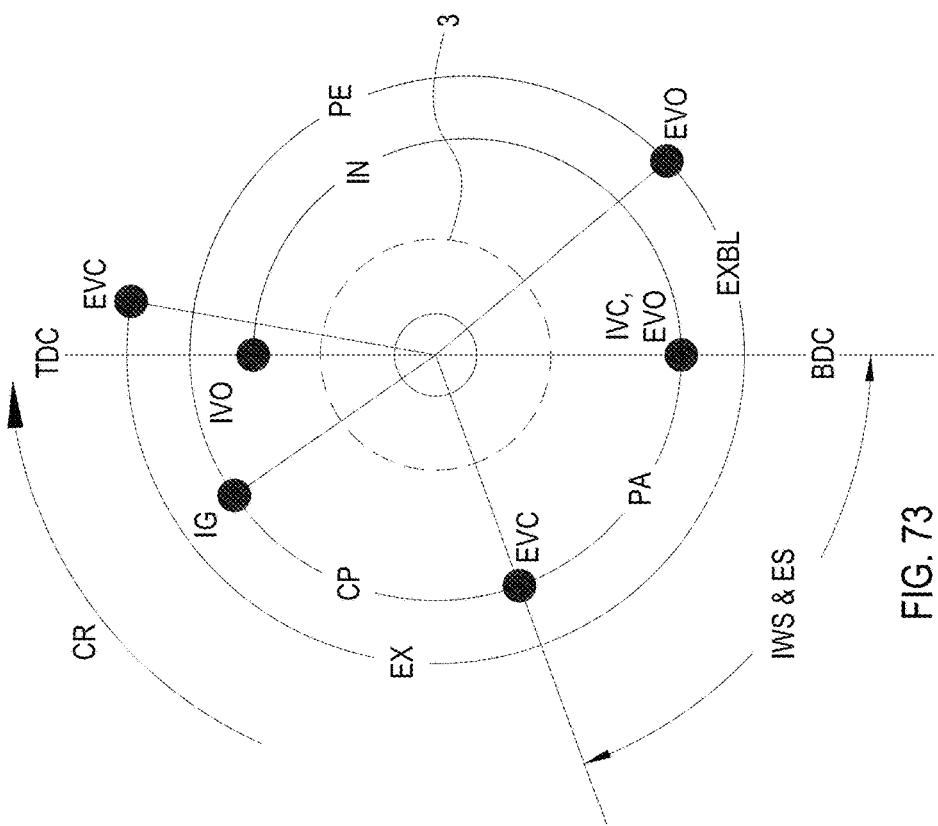
Figure 75:
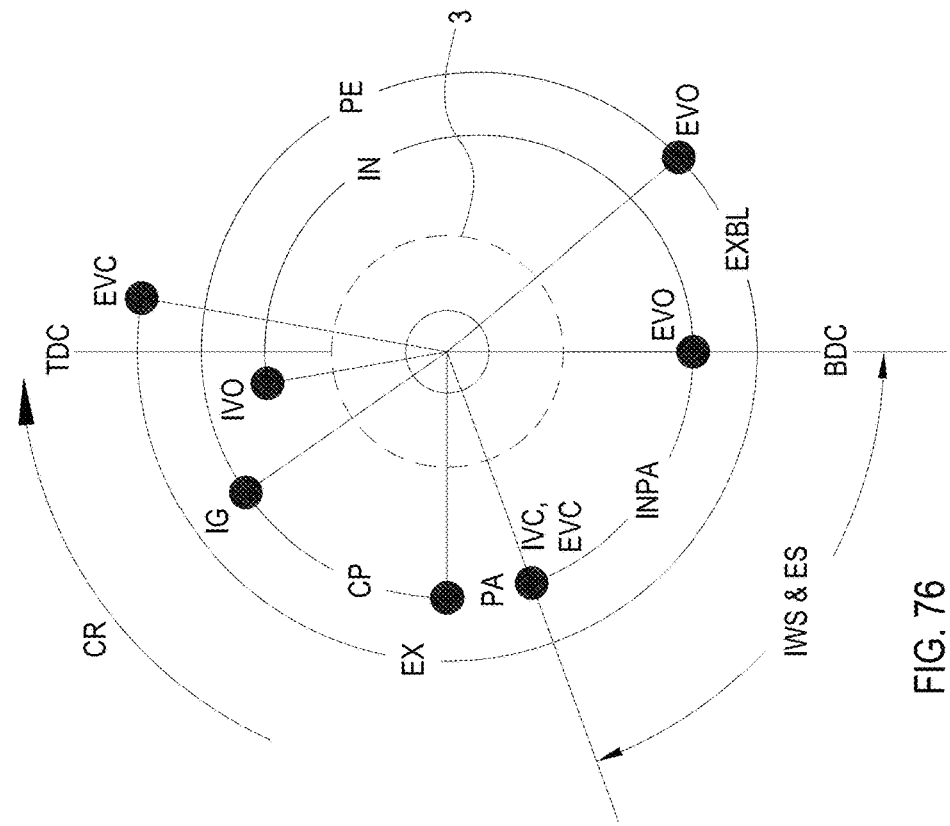
Figure 76:
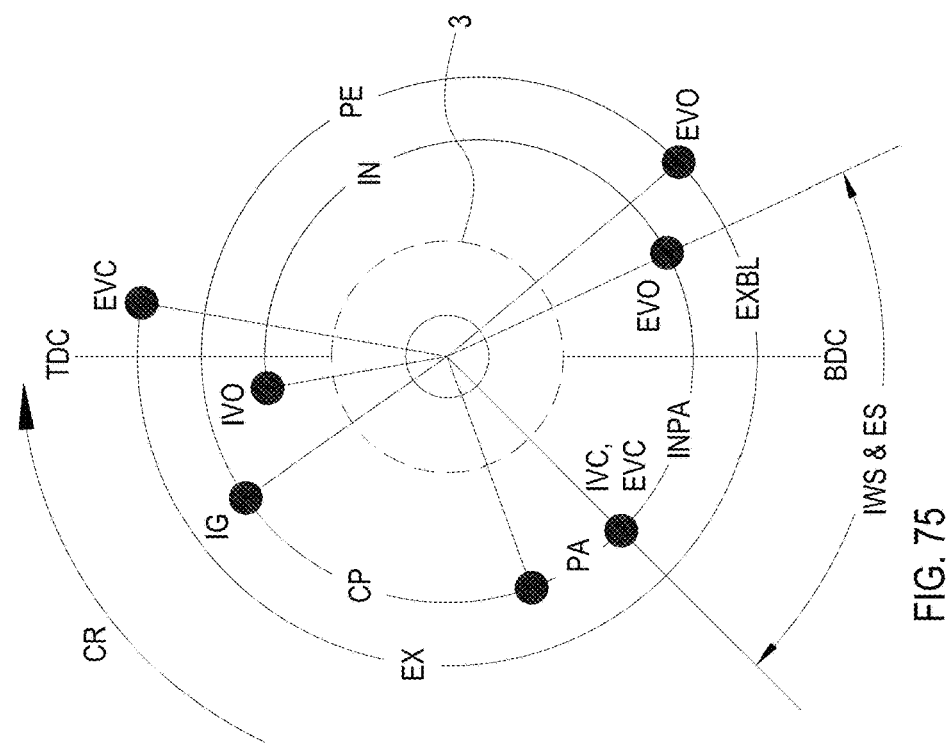
Figure 77:
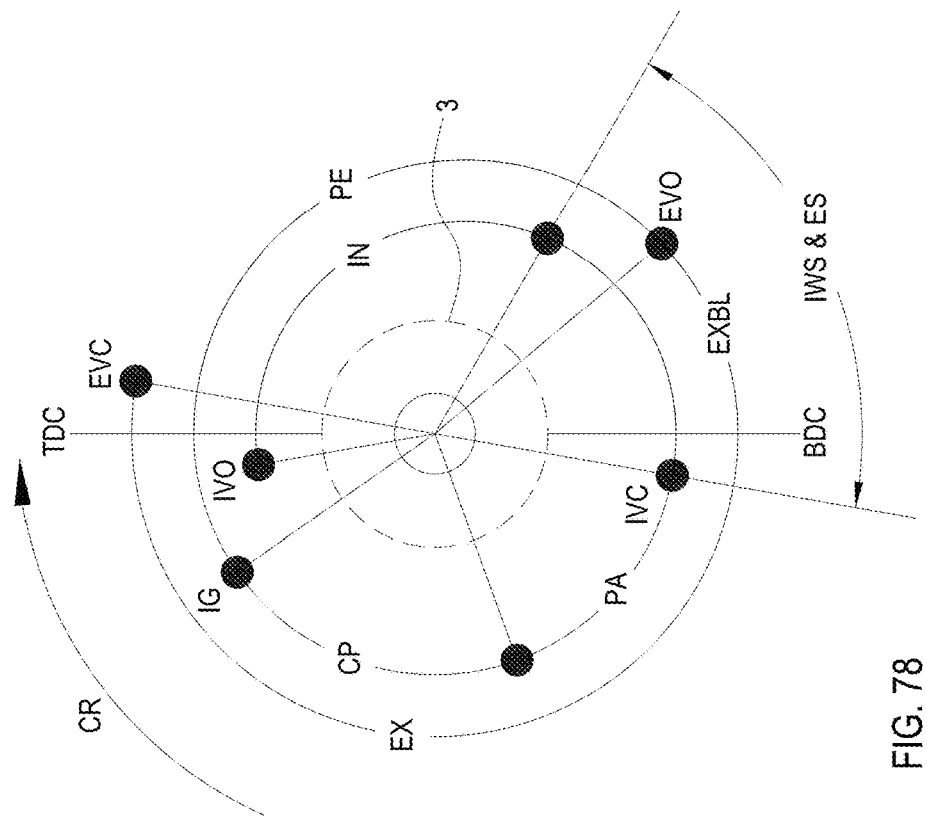
Figure 78:
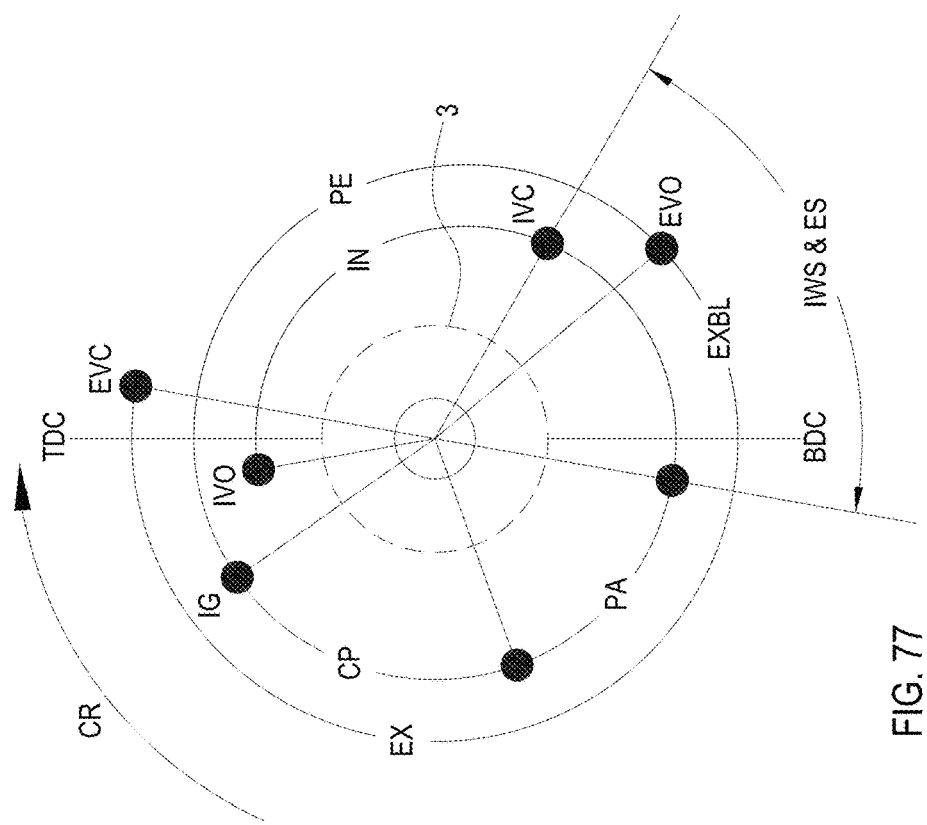
Figure 80:
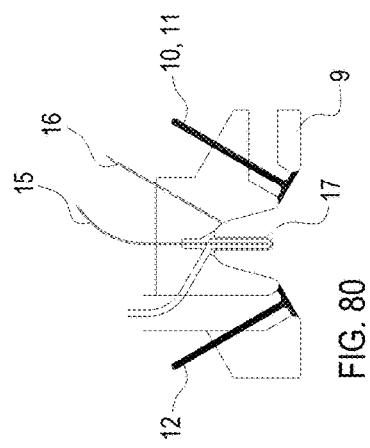
FIG. 80 is a sectional cut drawing illustrating scaled up pieces of FIG. 79.
Figure 81:
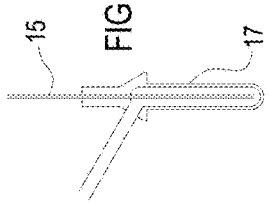
FIG. 81 is a sectional cut drawing illustrating scaled up pieces of FIG. 80.

With reference to the diagrammatic (cycle) drawings; if there are only two exhaust phases in a cycle, referenced as either "EX" or "EXBL" or sometimes "EXPO" on a diagrammatic drawing, and in cases of an "or" option such as labeled "EXBL or PE" such as on FIG. 33 in the drawings, note that one has to be an exhaust phase while the other can either be "PE" or "EXBL". In other words there has to be at least one exhaust phase in a thermodynamic cycle as shown on the diagrammatic drawings disclosed.

Referring now to the sectional cut drawings disclosed shown in FIG. 2, FIG. 3, FIG. 5, FIG. 42 to FIG. 46, FIG. 52, FIG. 53, FIG. 56, FIG. 59, FIG. 79, FIG. 86, FIG. FIG. 88, FIG. 91, FIG. 94, FIG. 96 to FIG. 100, FIG. 111, FIG. 114, FIG. 153, FIG. 156, FIG. 158, and FIG. 169 in which some parts such as labeled crank throw 2, connecting rod 4, piston 6, in some cases cylinder 8, intake valve 10, exhaust valve 11, etc., illustrate fairly simple and straightforward parts of an engine in order to more clearly relate with. If the same numeral labels appear in a figure but with a different lower case letter after each like occurrence, this means that whatever that number label represents can appear optionally or together in different combinations with the similar numerals in the figure. If more than one numeral appears on a label that means that that particular piece may fall under more than one category in that instance.

Referring to FIG. 1 which illustrates a simple flow chart outlining some of the main factors applying to methods of the present invention. Heat utilized in a conventional engine is only a small part of the total heat passing through the engine and new cycles from methods of the present invention utilize heat (transfer) that is usually discarded, and they utilize heat in different ways than conventional engine cycles.

Aspects in Phases Used in Methods of the Present Invention

The present invention provides novel methods of directly and/or indirectly creating and/or efficiently utilizing gas change(s) created by directly and/or indirectly utilizing an engine's heat to use in new efficient complete thermodynamic engine cycles.

The gas change(s) utilized in the present invention is timed with the mechanical cycle of the engine and the gas change(s) can be utilized to contract or expand independently of a changing volume produced by the displacement of the engines piston or other mechanical means and/or the combustion pressure of the fuel-air mixture in the engine itself.

The displacement of the contraction(s) or expansion(s) utilized in the present invention can produce certain phases, and because of this, certain phases in the engines cycle(s) no longer require displacement of the engines piston or other mechanical means and/or the combustion pressure of the air-fuel mixture in the engine itself to produce the phases.

For example, the engine could intake without relying on a moving piston or other mechanical means to displace air and produce an intake stroke or phase. Because of this, intake can take place on what would conventionally be the engines exhaust or compression stroke during the engines piston movement to TDC, or for example, an engine could exhaust without relying on the engines moving piston or other mechanical means to displace gases and/or the combustion pressure of the fuel-air mixture in the engine itself, to produce an exhaust stroke or phase. Because of this, exhaust can take place on what would conventionally be the engines intake or expansion stroke during the engine's piston movement to BDC. The present invention allows different phases and/or combinations of phases to occur in different ways and at different times than they conventionally would in an engine cycle.

The gas change(s) utilized in the present invention can also be manipulated to produce different effects for different phases during a mechanical cycle of the engine. For example, the gas change(s) utilized in the present invention can be utilized, timed and manipulated with the displacement of the engines piston or other mechanical means of the engine to reduce the cylinder charge of the engine even if the engines cylinder charge is unthrottled during intake, or for example, gas change(s) utilized in the present invention can be utilized, timed and manipulated with the displacement of the engines piston or other mechanical means of the engine to reduce pressure during a compression stroke or phase from what it would be even if the engines mechanically effective compression stroke is set (fixed) to the movement of its piston or other mechanical means, the present invention can be manipulated to vary and delay the point of compression in the engines cycle from what it would be which could be then used to reduce the peak compression of the engine or to completely cancel out the point of compression of the engine during the engine piston's travel to TDC independent of the engines set mechanically effective compression stroke. The gas change(s) utilized in the present invention can also be utilized, timed and manipulated with the displacement of the engines piston or other mechanical means of the engine, for example, to sustain or increase the pressure of an expansion stroke or phase.

Gas change(s) utilized in the present invention can be timed and utilized with the mechanical cycle of the engine in different ways depending on how the engine is intended to be used and how it is built, i.e. depending on mechanical features and construction of the engine, what limitation factors there are such as power to weight, power to displacement or size, low manufacturing cost, etc.

Because engines are usually limited by set or narrowly-timed valving and/or porting, they usually have no way to indicate or know what cylinder pressure and phases are happening in each cycle and they are usually limited in the cycles they can run in and that can be obtained. Conventional ways of timing intake and exhaust gas flow through the engine include valves and/or cylinder ports. These valves and/or ports can also be used to time and carry out methods in the present invention but care must be taken to time them in ways that efficiently utilize gas change(s) in the engine. Examples of some methods of timing the present invention with the mechanical cycle of the engine can be clearly seen in the simple diagrammatic drawings disclosed.

Figure 140:
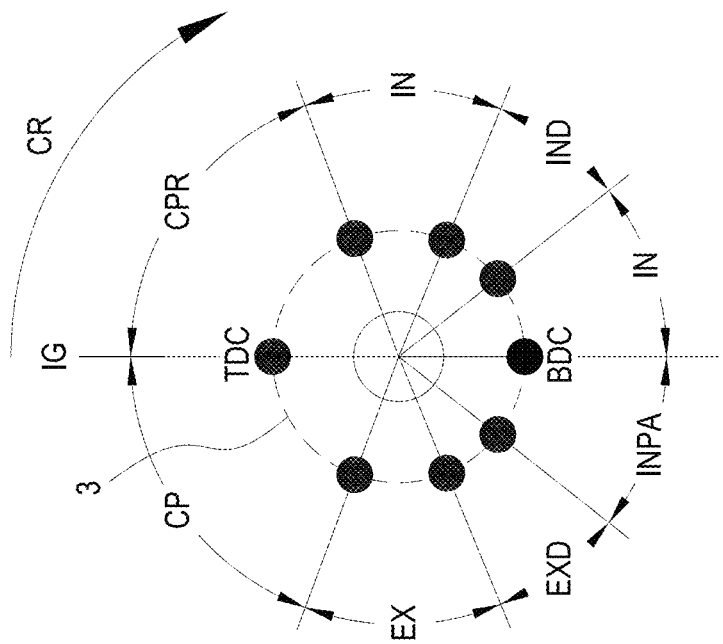
FIG. 139 to FIG. 152 are diagrammatic drawings illustrating 2-stroke cycles.
Figure 139:
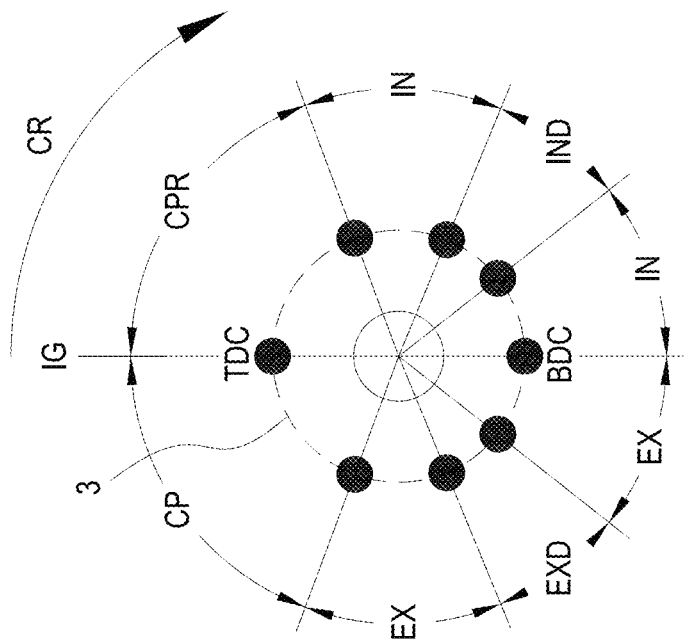
Figure 142:
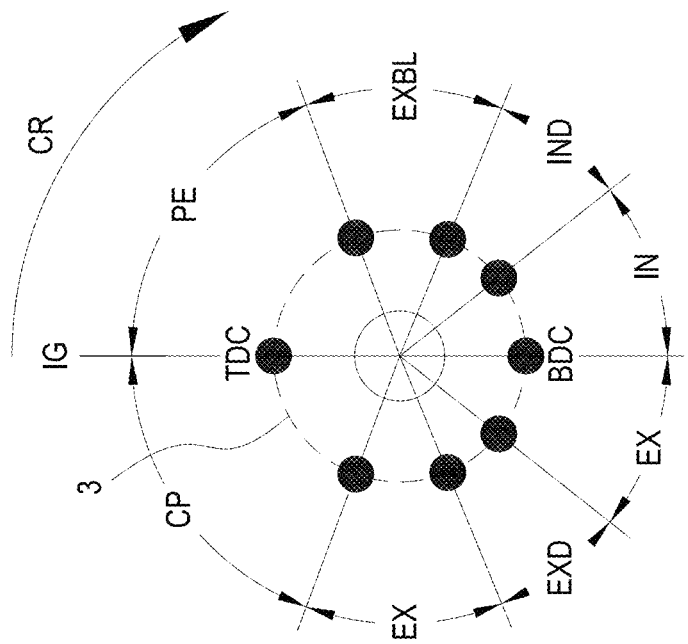
Figure 141:
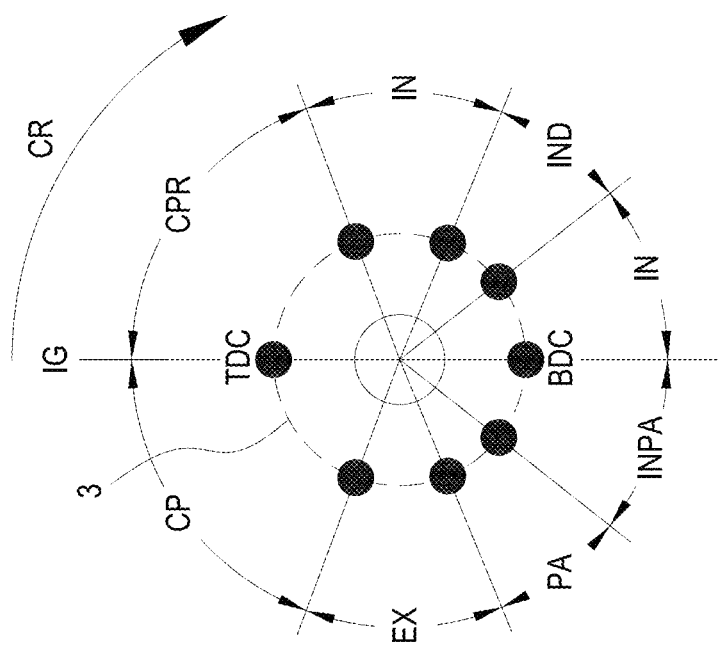
Figure 144:
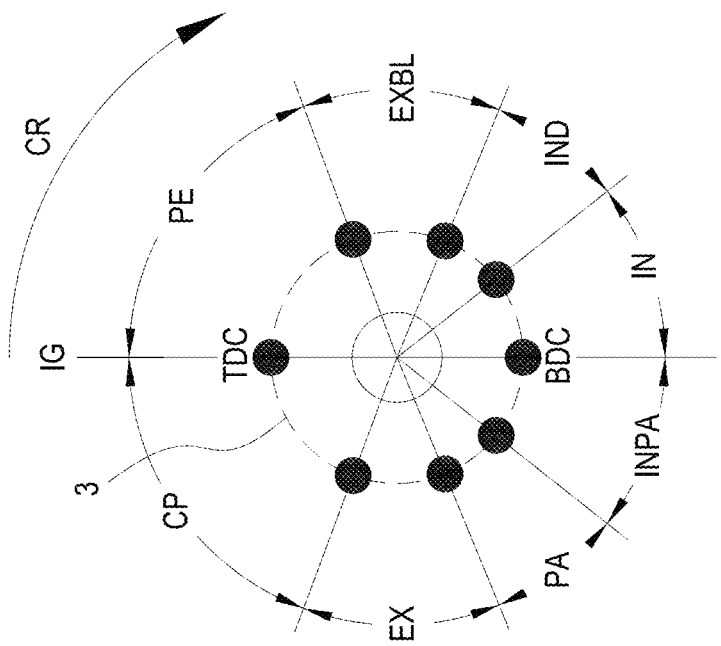
Figure 143:
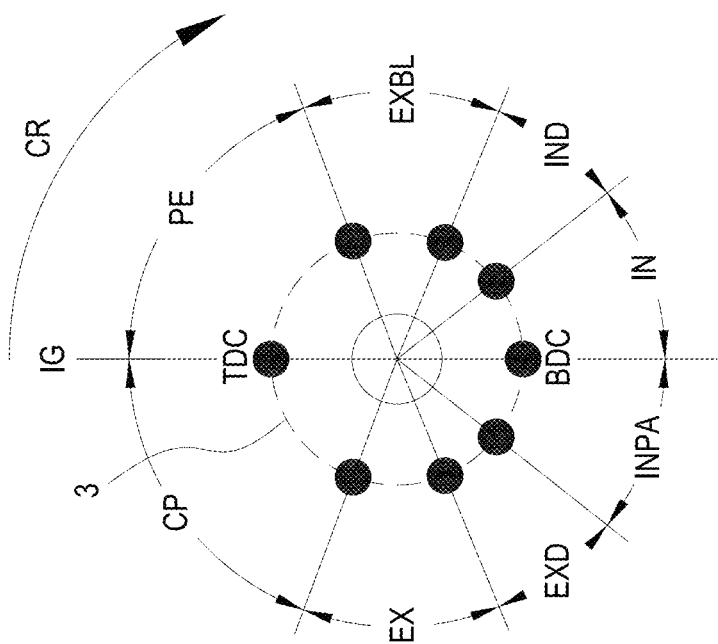
Figure 146:
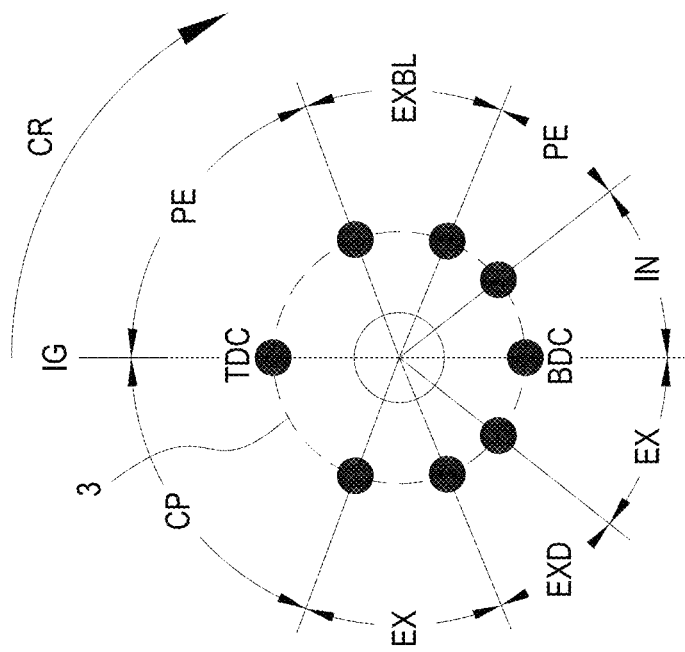
Figure 145:
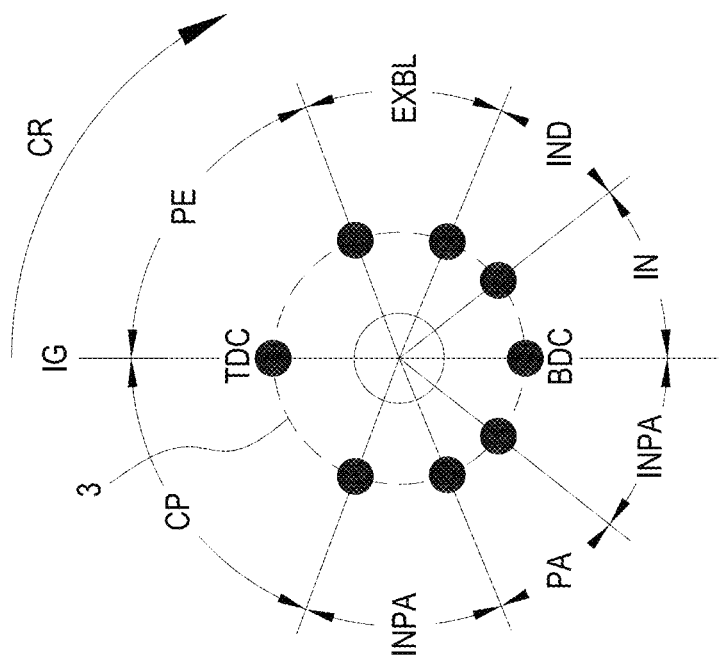
Figure 148:
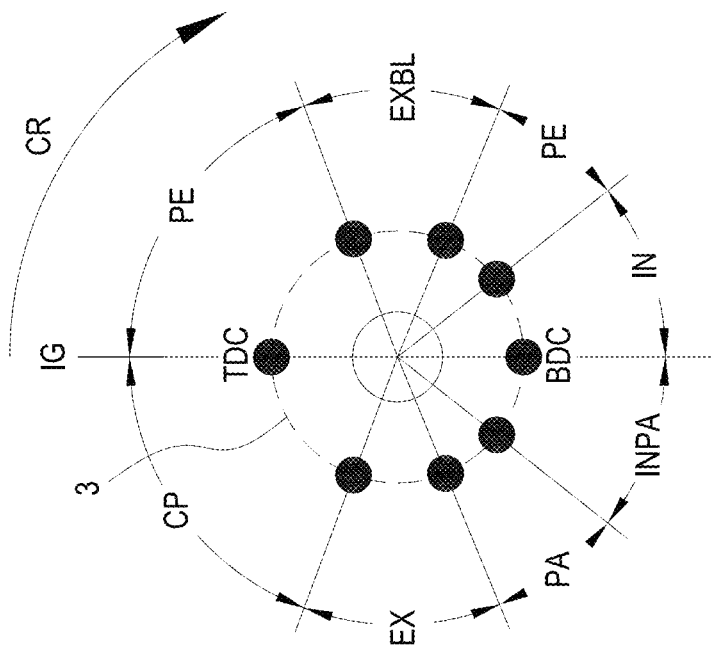
Figure 147:
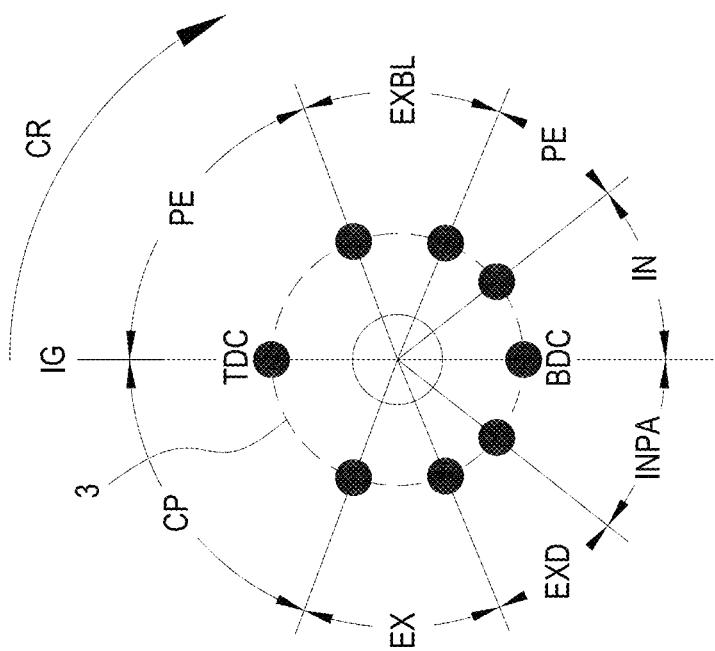
Figure 150:
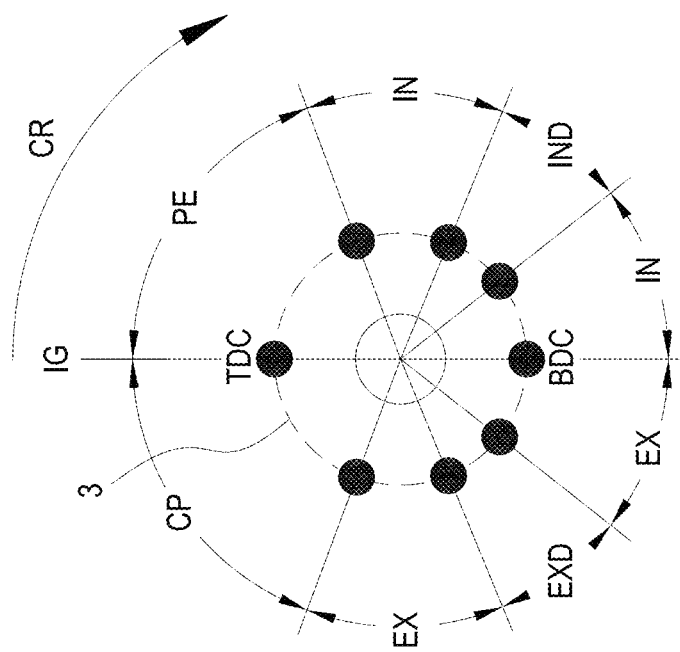
Figure 149:
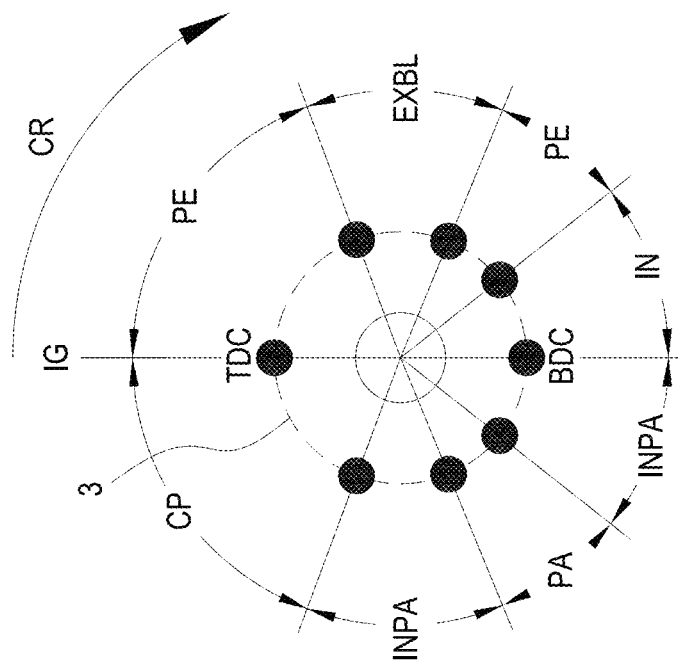
Figure 152:
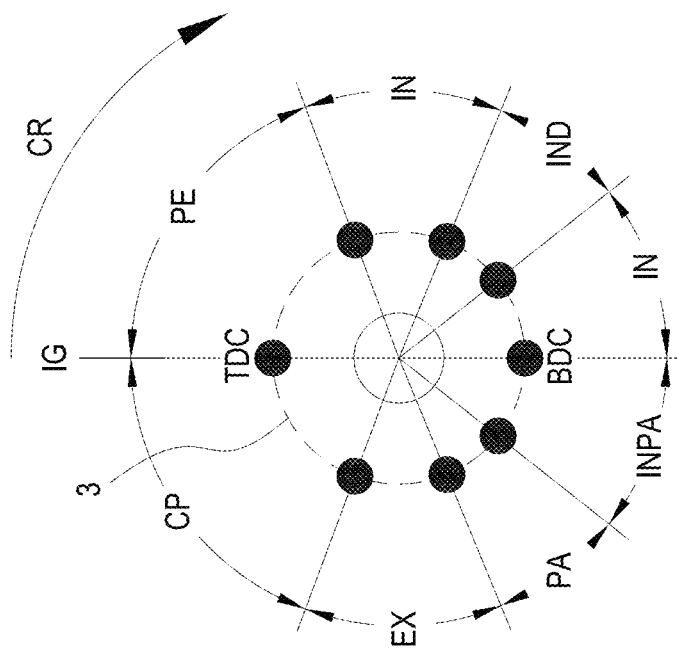
Figure 151:
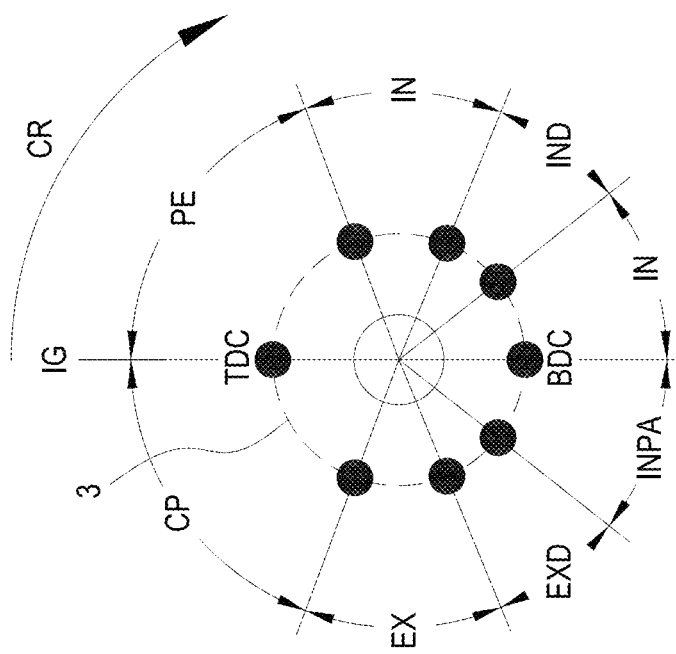
Figure 163:
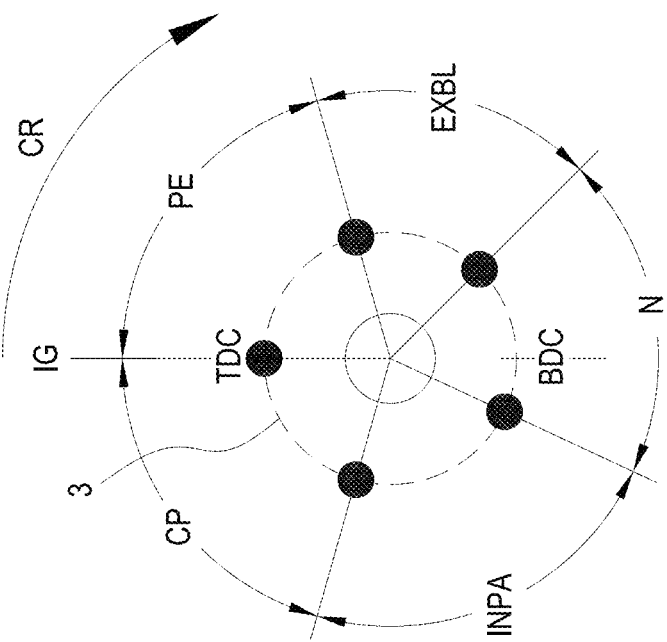
FIG. 162 to FIG. 165 are diagrammatic drawings illustrating 2-stroke cycles that could be carried out in an embodiment similar to FIG. 153, FIG. 156 or FIG. 158.
Figure 162:
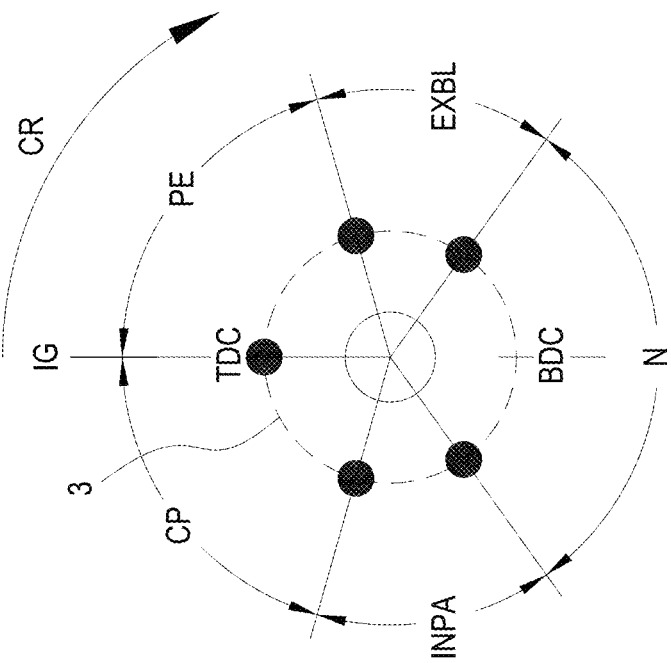
Figure 165:
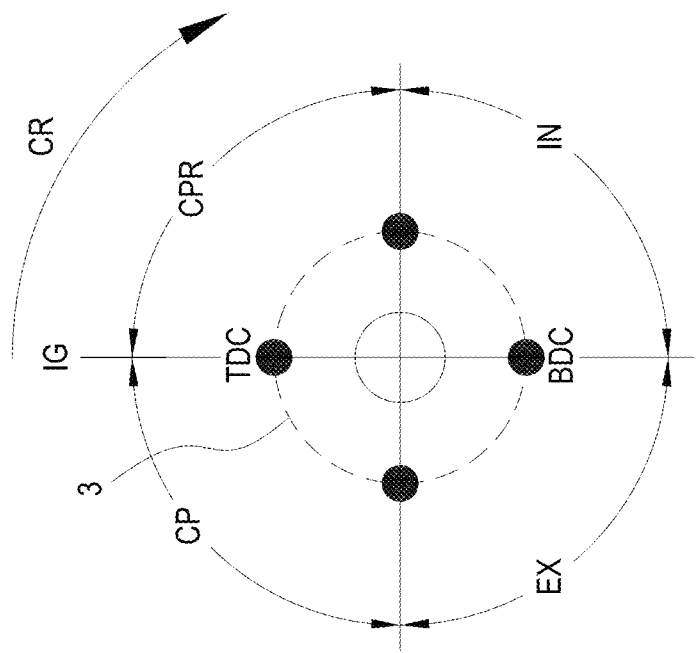

In some cases the cycle(s) of an engine utilizing methods of the present invention may vary or change widely in different conditions such as at start-up and shut down, varying the load/power output of the engine, a change in running rpm, a misfire, etc. and if the engine isn't able to readily adapt mechanically to phases in the engine's current cycle then the engine might lose the ability to utilize the effects from methods of the present invention. For examples of some start-up cycles see the diagrammatic drawings shown in FIG. 139 to FIG. 141, FIG. 164 and FIG. 165, FIG. 170, FIG. 187, FIG. 195, FIG. 198, FIG. 200, FIG. 201 and FIG. 206. The diagrammatic drawing in FIG. 139 shows an example of what might be a start-up cycle in an engine at lower rpm. The diagrammatic drawing in FIG. 140 shows an example of what might be a start-up cycle at a higher rpm that can occur in the same engine as FIG. 139 was shown from. For some examples of changing thermodynamic cycles see the diagrammatic drawings in FIG. 166 to FIG. 168. Other examples of changing cycles can be seen from an actual test engine by the inventor which was similar to the sectional cut drawing clearly seen in FIG. 169. This engine could readily adapt mechanically to phases in the engine's current cycle which would change depending on many factors including a change in rpm, a change in load, a change in the ignition point/phase, a change in fuel, etc. Some examples of cycles from this engine can be seen in the simple diagrammatic drawings in FIG. 186 to FIG. 205.

On another test engine by the inventor, the thermodynamic cycle of the engine could be varied so much from the engines mechanical cycle of its piston and crankshaft that the engine could be stopped with the piston and crankshaft held still while the thermodynamic cycle of the engine in its cylinder continued to run even when the valves were restricted (throttling intake & exhaust flows). This was a naturally aspirated carbureted engine that had an intake poppet valve and an exhaust poppet valve along with mechanical linkage that could operate independently of the piston and crankshaft of the engine. Only fuel and power for ignition was supplied to the engine while it ran without rotation and the engines valves and related linkage was all worked off pressure changes from the engines functioning thermodynamic cycle in its cylinder. If the engines crankshaft was spun-over from rest, the engine's mechanical cycle of it crankshaft & piston would start to engage with the thermodynamic cycle of the engine and the engines rpm would increase.

In some cycles shown in the diagrammatic drawings disclosed, a functioning cycle may lose the ability to produce another functional cycle and the engine may need to fall back into a start-up cycle. Variable valve and variable port timing are widely known in the art and are just some ways of counter-acting these complications so an engine can readily adapt mechanically to phases in the engines current cycle. In some circumstances, other ways to counter-act some of these complications might be to use flow-controlling orifice(s) like used in some actual test engines by the inventor, some examples of which were similar to the sectional cut drawings clearly shown in FIGS. 153 to 161 with pieces made up mostly of 8, 21, 22, 23, and 25. Other ways to counter-act complications might be to use separate intake, and separate exhaust, one-way flow-controlling fast-acting valves etc., and also separate rigid flow-controlling devices something like shown in FIG. 161. The examples of engines shown in FIG. 153, FIG. 156, and FIG. 158 can be run with just flow-controlling devices, they can run along with different additional/optional valve setups like the ones shown in their heads (if the valves are timed correctly with a set or variable lift, calibrated flow, etc.), or they can be run just with said additional/optional valve setups and this all depends on how much mechanical complexity can be tolerated in the demands of the engines construction and intended use.

In some cases the cycle(s) of an engine may only change slightly in different conditions which can include changes in ignition timing, injection timing and duration, throttling or restricting intake and/or exhaust flow, etc. along with combinations of the above but any change in the thermodynamic cycle of the engine from the mechanical cycle of the engine can lower the engines ability to efficiency utilize gas change(s) in the engine which further shows a need for a constantly adaptable engine that can more fully utilize the effects from the present invention.

In one or more embodiments, an engine timing device comprising a computerized controller, microprocessor, and/or other circuitry may be operatively coupled to at least one cylinder intake valve, at least one cylinder exhaust valve, a gas flow-controlling device (e.g., an electronically actuated auxiliary engine valve), at least one pressure sensor for sensing the pressure conditions in a cylinder of the engine, and at least one temperature sensor for sensing the temperature conditions in the cylinder of the engine. In these one or more embodiments, the engine timing device may be specially programmed to control the operation of the at least one cylinder intake valve (e.g., by opening or closing the intake valve), the at least one cylinder exhaust valve (e.g., by opening or closing the exhaust valve), and the gas flow-controlling device (e.g., by modulating and/or opening or closing the gas flow-controlling device) in order to operate the engine in accordance with any of the engine cycles illustrated herein based upon an output signal from the at least one pressure sensor indicative of a sensed pressure in the engine cylinder and/or an output signal from the at least one temperature sensor indicative of a sensed temperature in the engine cylinder.

How Gas Changes are Created for Use in Phases Used in Methods of the Present Invention Gas change(s) efficiently utilized in the present invention are created different ways by directly and/or indirectly utilizing the engines heat to be used in new methods of different phases and/or combinations of phases utilized in the present invention.

In an aspect of the present invention, heat is utilized in an engine from hot expanded combustion gases to produce contraction(s) created from cooling the combustion gases to be used in new methods of different phases and/or combinations of phases in the present invention.

An aspect of the present invention involves utilizing heat from the engines combustion to preheat a substance(s) to be and/or being injected and then utilizing the injected substance(s) and its properties, to further expand gases, and in some cases to further contract gases to be used in new methods of different phases and/or combinations of phases in the present invention.

In an aspect of heating the injected substance(s), the present invention involves utilizing heat from the engines combustion by directing combustion heat from combustion gases toward a portion(s) of surface area surrounding/containing some of the gases wherein the portion(s) surrounding/containing the gases may protrude into the combustion gases. Some portion(s) of surface area may have a higher heat transfer coefficient than the rest of the surface area surrounding/containing the gases. Combustion heat is somewhat directed and transferred into specific portion(s) of surface area where some of the heat preheats a substance(s) to be and/or being injected in the engine. Heating the substance(s) affects its properties and the way it interacts in the engine, and the resulting gas changes. The heated injected substance(s) can contain enough heat to expand and/or flash into a gas or similar state directly after injection in which it sometimes may lose heat and/or said heated injected substance(s) can pick-up additional heat after injection, from being exposed to a heated portion of surface area (for instance, the heated portion of surface area of a nozzle said substance(s) is being injected from) and/or from the hot gases the said substance(s) is injected into. Some examples of said nozzles can be clearly seen in some of the sectional cut drawings disclosed, labeled as 17 in FIG. 2 and FIG. 3, FIG. 42 to FIG. 46, FIG. 56, FIG. 59 to FIG. 63, FIG. 79 to FIG. 81, FIG. 86 to FIG. 88, FIG. 91 to FIG. 102, and FIG. 111 to FIG. 116.

In some cases the portion(s) of surface area surrounding/containing some of said gases is best utilized having a shape that produces efficient combustion which occurs usually when the engines piston is at TDC or in its half stroke nearest TDC, and having a shape that allows manipulated heat transfer into the substance(s) to be injected, so that for example, the pressure of the substance(s) may be monitored as an indication of the temperature of the portion(s) of said surface area. Some examples of said surface area shapes surrounding/containing some of said gases can be clearly seen in some of the sectional cut drawings disclosed with pieces made up mostly of 9 and sometimes 8 and/or 17, 37 and 38, in FIG. 2, FIG. 3, FIG. 5, FIG. 42 to FIG. 46, FIG. 52, FIG. 53, FIG. 56, FIG. 59 to FIG. 62, FIG. 79 to FIG. 80, FIG. 86 to FIG. 88, FIG. 91 to FIG. 102, FIG. 111, FIG. 114, FIG. 153, FIG. 156, FIG. 158, and FIG. 169. Another example of why a substance(s) to be injected may need to be monitored is because heat is being utilized from combustion gases and there is a balance to the amount of a substance that can be efficiently heated, injected and vaporized to the amount of heat that is available to be efficiently utilized, and this balance usually changes with any change in the operating conditions of the engine and to keep an efficient balance, certain things should be monitored. Keeping a liquid substance, such as water, under pressure can prevent it from vaporizing prematurely in the engines injection lines before an injection phase is carried out and keeping a liquid substance, such as water, at a higher possible temperature in these conditions can reduce the amount of heat required, if any, to vaporize it during and/or after an injection phase. Preferred embodiments and best mode features depend on how the engine is intended to be used and how it is built, i.e. depending on mechanical features and construction of the engine, what limitation factors there are such as power to weight, power to displacement or size, low manufacturing cost, etc.

In some cases it may be preferable but may not be necessary to use high pressure and/or low pressure injection in the engine along with or without carburation. In these cases, methods of the present invention need to be analyzed in order to efficiently utilize the injected substance(s) especially when fuel is involved. Tumble flow, swirl flow, etc. may be used in phases utilized in methods of the present invention and some examples of different flows may be seen in FIG. 42 to FIG. 44. Keeping fuel/fuel vapor more or less contained to the center of the cylinder, similar to that labeled as 30a in FIG. 42 and FIG. 43, may better utilize the fuel since less of it would come in contact with and become lost to the cylinder walls. Fuel/fuel vapor can also be used with a nozzle similar to that labeled as 17 in FIG. 42 to FIG. 44, if this better fits a design or construction of an engine. Injecting a substance such as water/water vapor from a nozzle, similar to that labeled as 17 in FIG. 42 to FIG. 44, and depending on the exiting orifice of the nozzle, the injected substance could be manipulated to expand more closer to the piston 6 and nearest volume of cylinder 8 like shown in FIG. 42 and FIG. 43, or for example, the injected substance could be manipulated to expand more closer to the head 9 and nearest volume of cylinder 8 like shown in FIG. 44, to better utilize the injected substance(s) and help produce a more efficient cycle. Like said above, these things depend on the engines construction, its intended use, etc.

Many examples of engine cycles occurring from methods of the present invention are shown in the simple diagrammatic drawings disclosed to better demonstrate how methods of the invention interact in engines and to better show how phases can be manipulated and utilized in a cycle in different conditions. Some cycles from methods of the present invention can run efficiently with little or no compression or less but when compared to one another, the most thermal efficient cycles from methods of the present invention tend to utilize a degree of compression from at least one compression phase and a compression pressure of over 125 psi which is desirable in order for an engine utilizing methods from the present invention to achieve over a 35% thermal efficiency. Because cycles from the present invention are extremely unstable when compared to conventional engine cycles, care must be taken to time and manipulate phases from methods of the present invention accordingly to any changes in compression, etc. With increased compression, for example, combustion burn time may become faster which may result in less heat, less pressure, etc. at the end of an expansion stroke or phase, etc., all of which will affect following phases in a cycle from the present invention.

When looking at the simple diagrammatic drawings of engine cycles disclosed it should be noted that certain things like the ignition point can vary and that it is usually shown occurring at TDC in the diagrammatic drawings for convenience and clarity. Like most conventional engines, the actual optimal point of ignition will vary with the conditions of the engine (its rpm, its compression pressure, etc.) and different means of ignition can be applied to methods of the present invention. Some things like intake phase and/or exhaust phase throttling/restriction(s), etc. may occur in some of the diagrammatic drawings and all phases will vary depending on conditions of the engine. Also note that everything takes time and some phases might take longer than others to form. In some cases the amount, period or duration of an event or phase depends on porting area, valve size, etc., and RPM etc. Because the diagrammatic drawings were left simple for better clarity and understanding, some phases and events in some cycles may not be shown on the diagrammatic drawings disclosed such as neutral pressure, constant pressure, and other less important events and/or other phases (for example the time/duration of heat utilized to cool gases from a certain pressure and produce a contraction that can be utilized).

Some cycles shown in the simple diagrammatic drawings disclosed may be partly dependent on the fuel used (its heating value, heat released per combustion, etc.), the heat loss of the engine itself (heat loss through the exposed surface of the piston, head, etc.) and other factors. If fuel injection is used, fuel injection timing and duration of the phase(s) is not usually shown on the diagrammatic drawings. In some cases on the simple diagrammatic drawings disclosed, the water/steam injection phase(s) is not shown, or it may be shown occurring with the same exact starting and ending points as another phase which may not always be the case in actual practice. This was done because the diagrammatic drawings examples would become excessive and cluttered. What are shown are some examples of the methods of some of the main phases that make-up the cycles in the diagrammatic drawings and how said phases can work and flow together in different cycles. In actual practice the water/steam injection phase timing and duration will vary depending on engine rpm, temperature, combustion chamber, injection nozzle design, etc. but it can be set to help produce the main phases shown in the diagrammatic drawings disclosed. Most of the water/steam injection phases shown in the diagrammatic drawings disclosed occur when the engine's piston is away from its TDC position, when the pressure of the cylinder gases would be lower than their maximum, when more cooling surface of the cylinder walls would be exposed, and when the temperature of the exposed cooling surface nearer to the piston's BDC position would be lower, etc.

Figure 79:
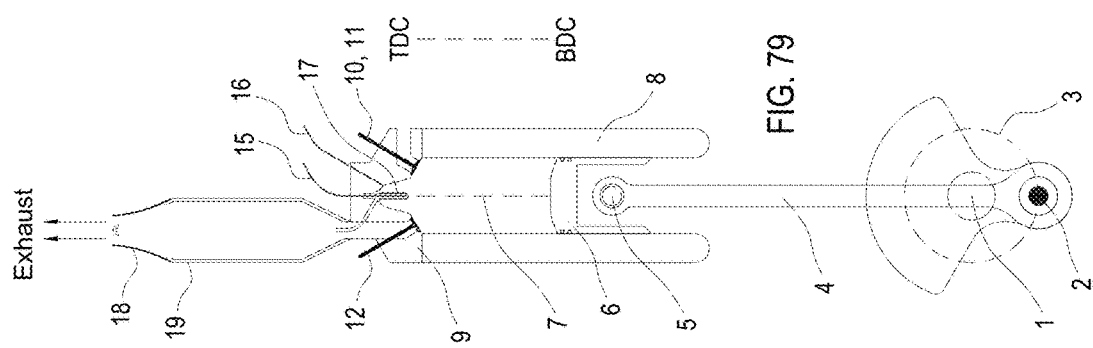
Figure 83:
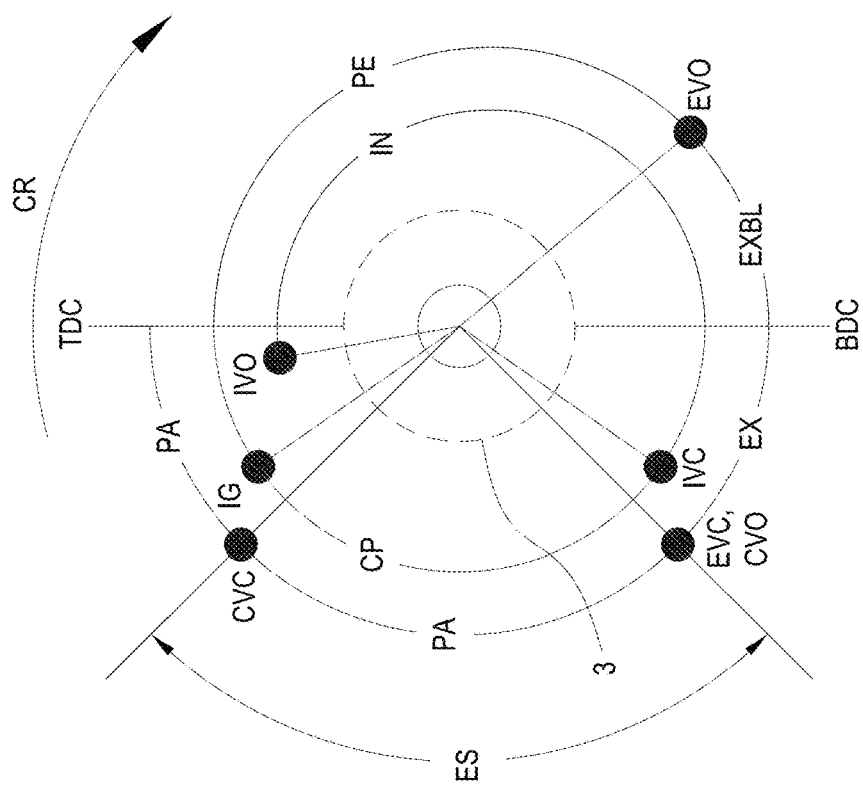
FIG. 82 to FIG. 85 are diagrammatic drawings illustrating 4-stroke cycles that could be carried out in an embodiment similar to FIG. 79.
Figure 82:
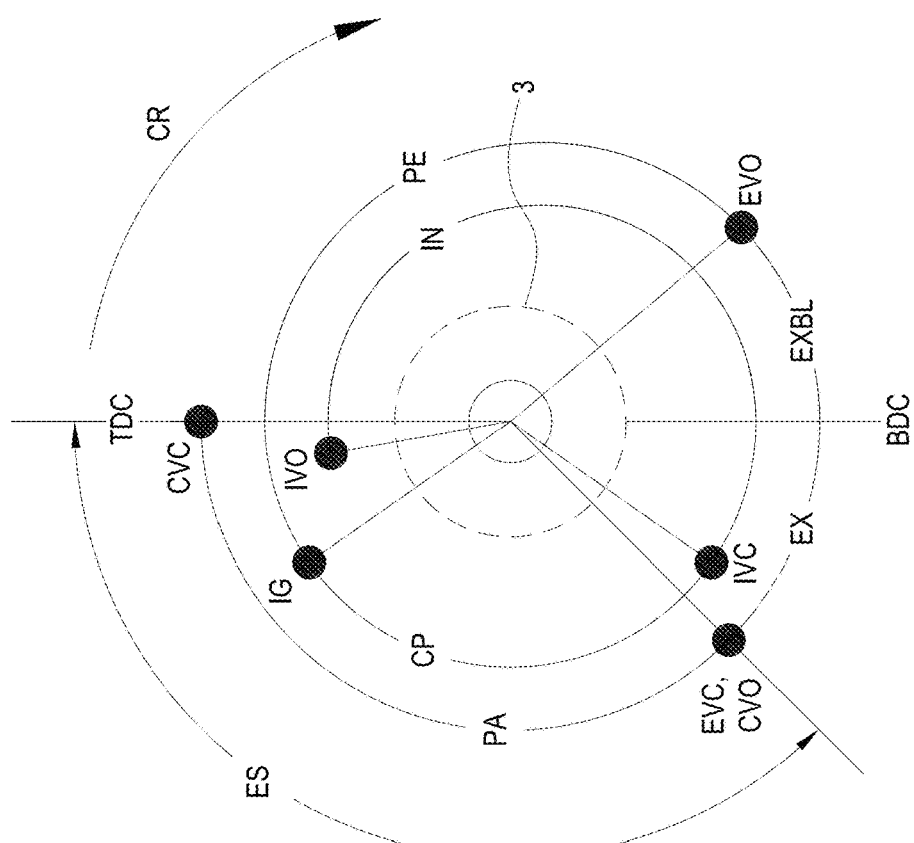
Figure 85:
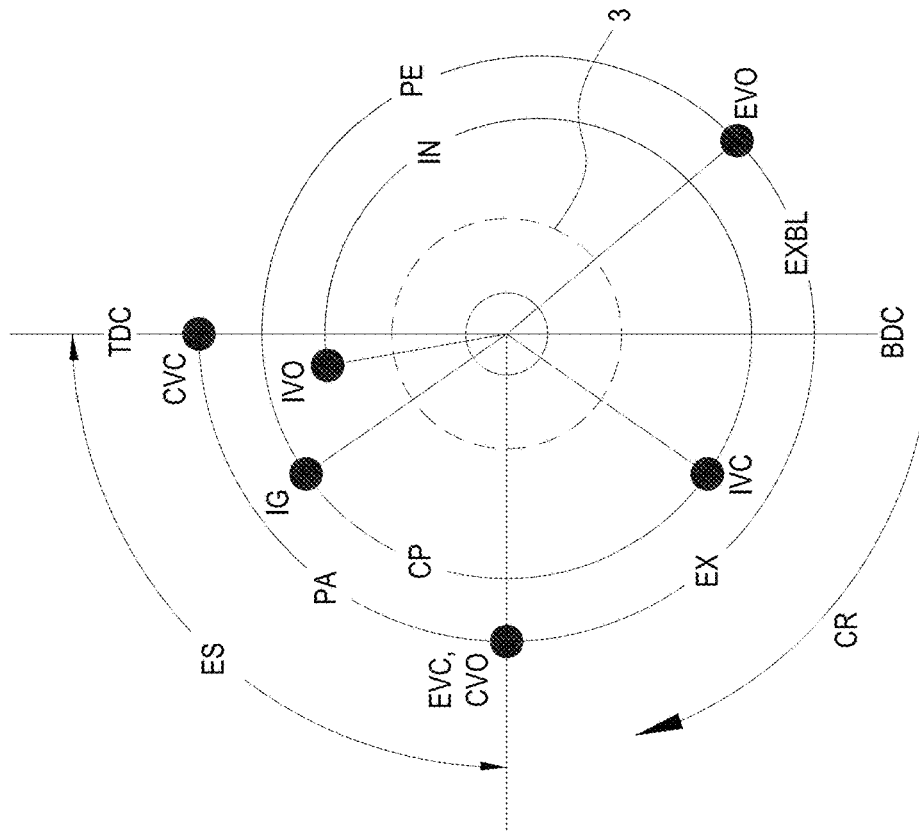
Figure 84:
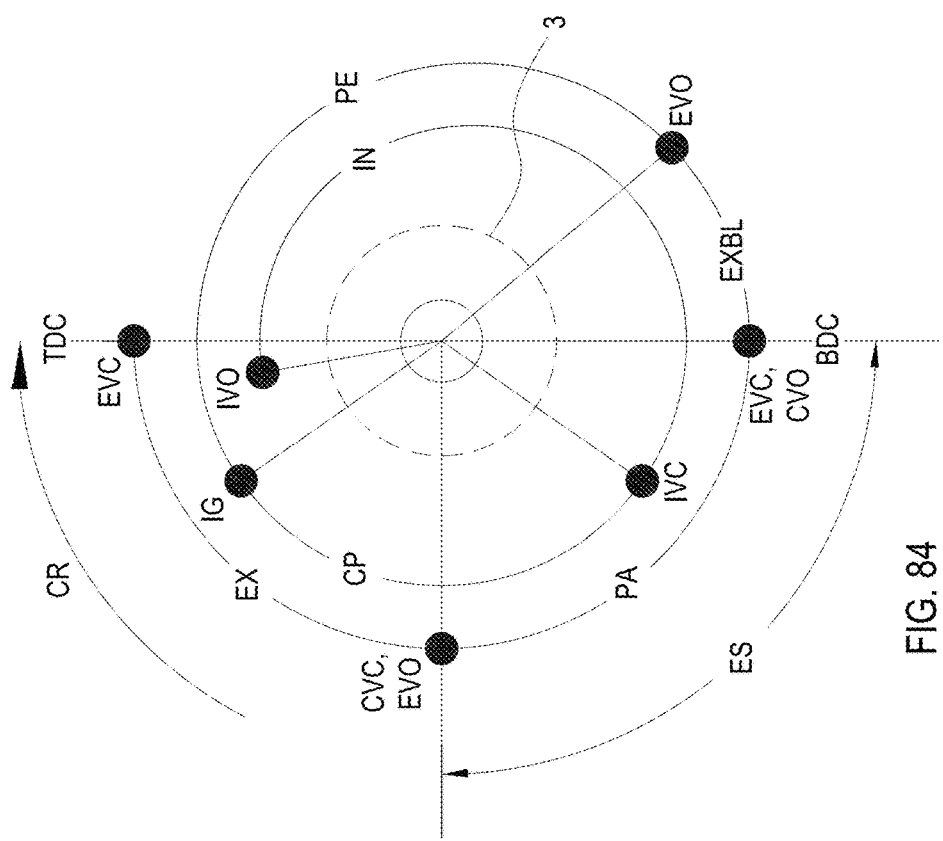
Figure 88:
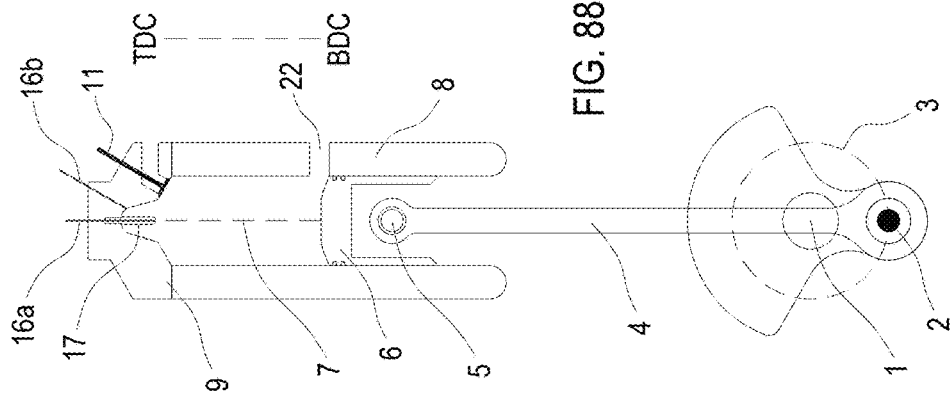
Figure 87:
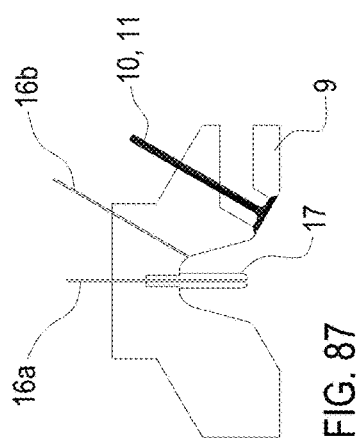
FIG. 87 is a sectional cut drawing illustrating scaled up pieces of FIG. 86 and FIG. 88.
Figure 86:
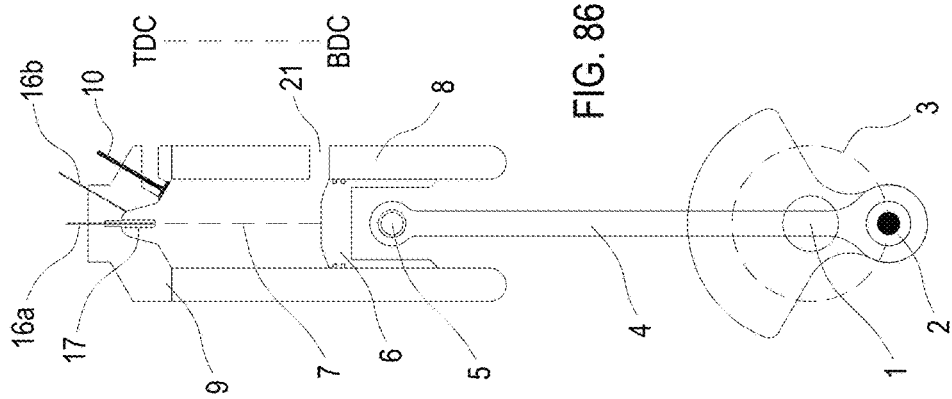
Figure 90:
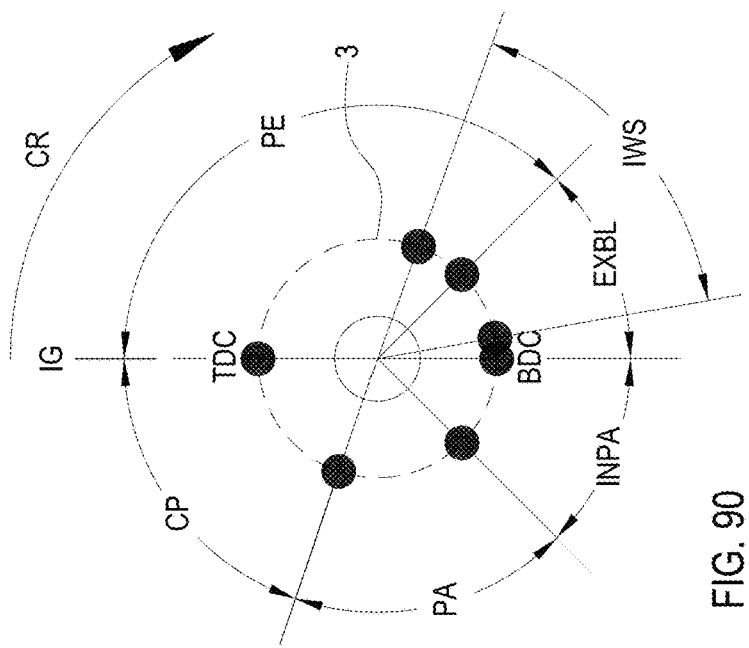
FIG. 89 and FIG. 90 are diagrammatic drawings illustrating 4-stroke cycles that could be carried out in an embodiment similar to FIG. 86 or FIG. 88.
Figure 89:
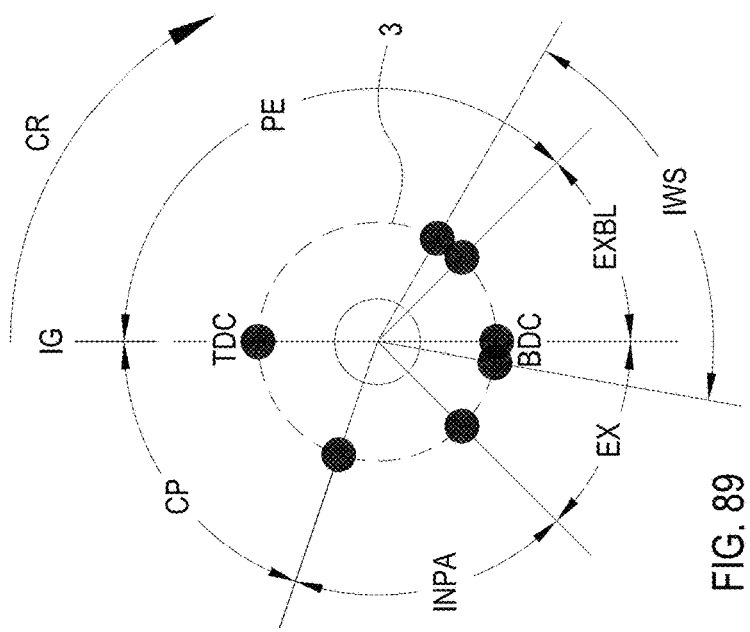
Figure 96:
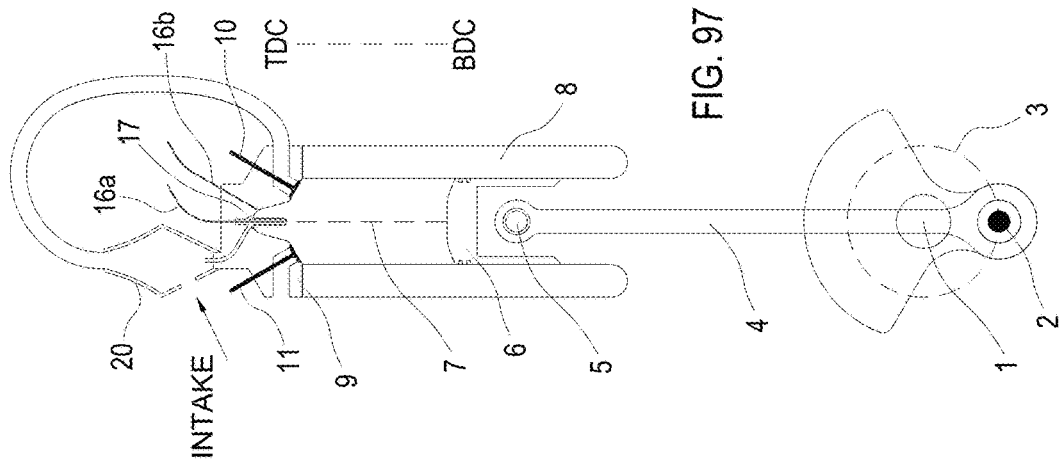
Figure 97:
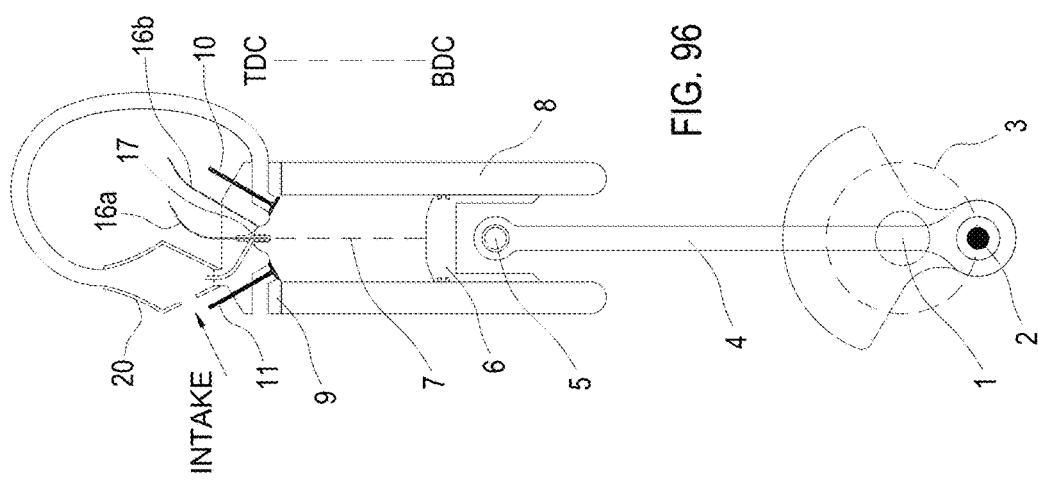
Figure 101:
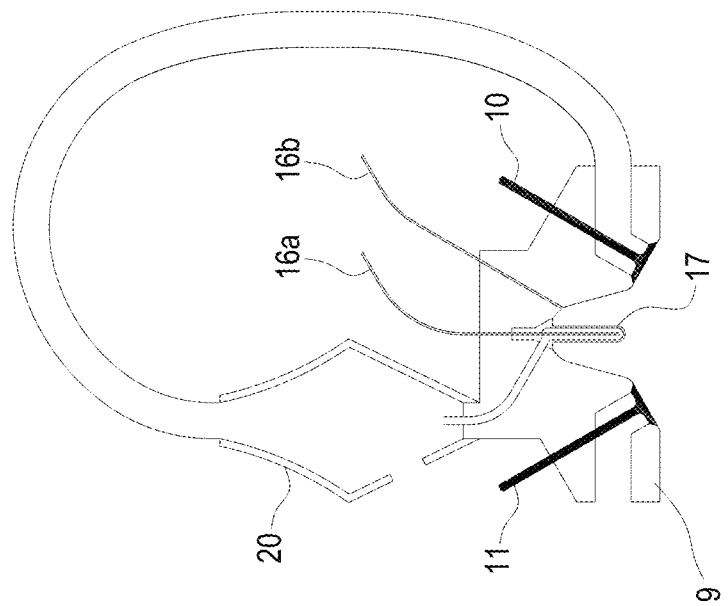
FIG. 101 is a sectional cut drawing illustrating scaled up pieces of FIG. 96.
Figure 102:
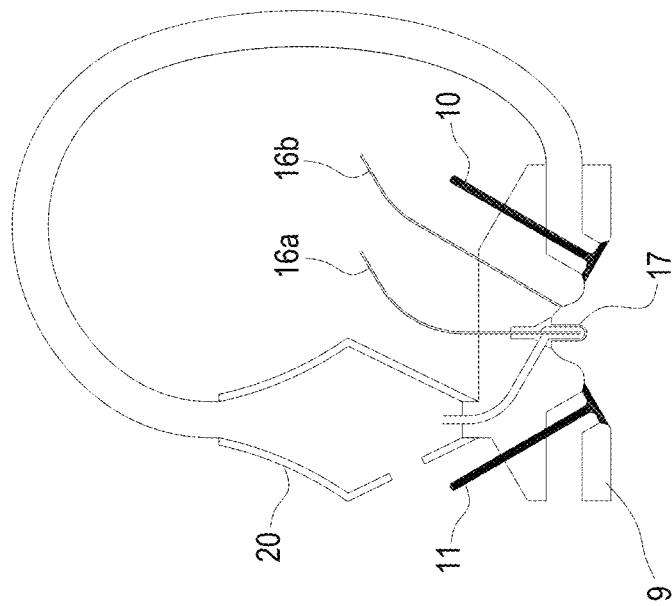
FIG. 102 is a sectional cut drawing illustrating scaled up pieces of FIG. 97.
Figure 104:
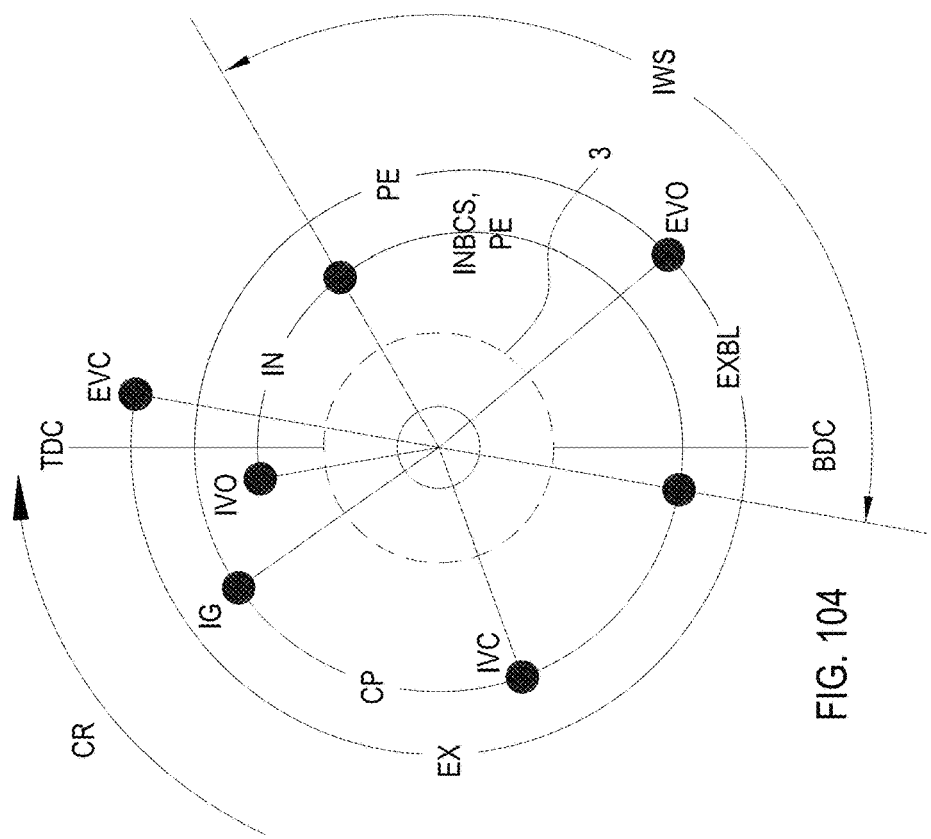
FIG. 103 to FIG. 106 are diagrammatic drawings illustrating 4-stroke cycles that could be carried out in an embodiment similar to FIG. 96 or FIG. 100.
Figure 103:
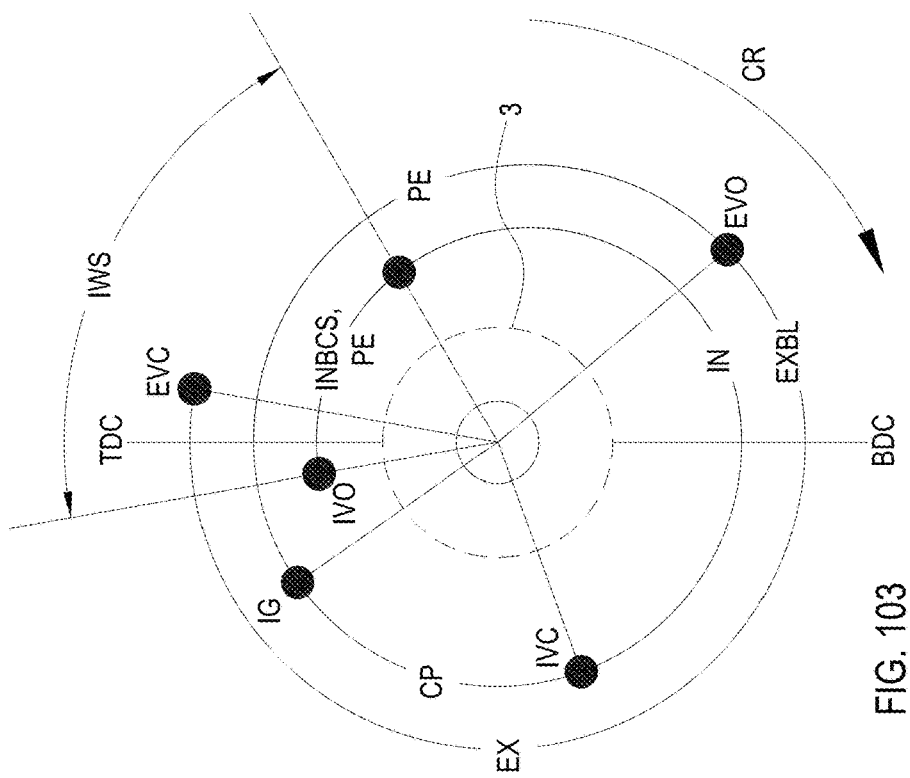
Figure 106:
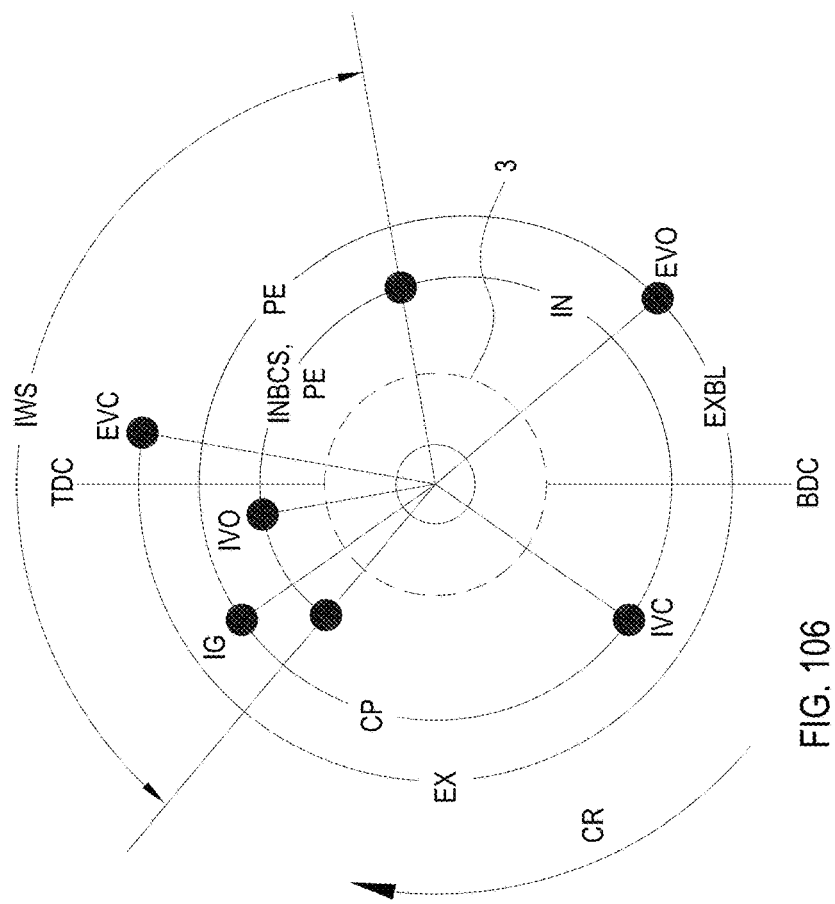
Figure 105:
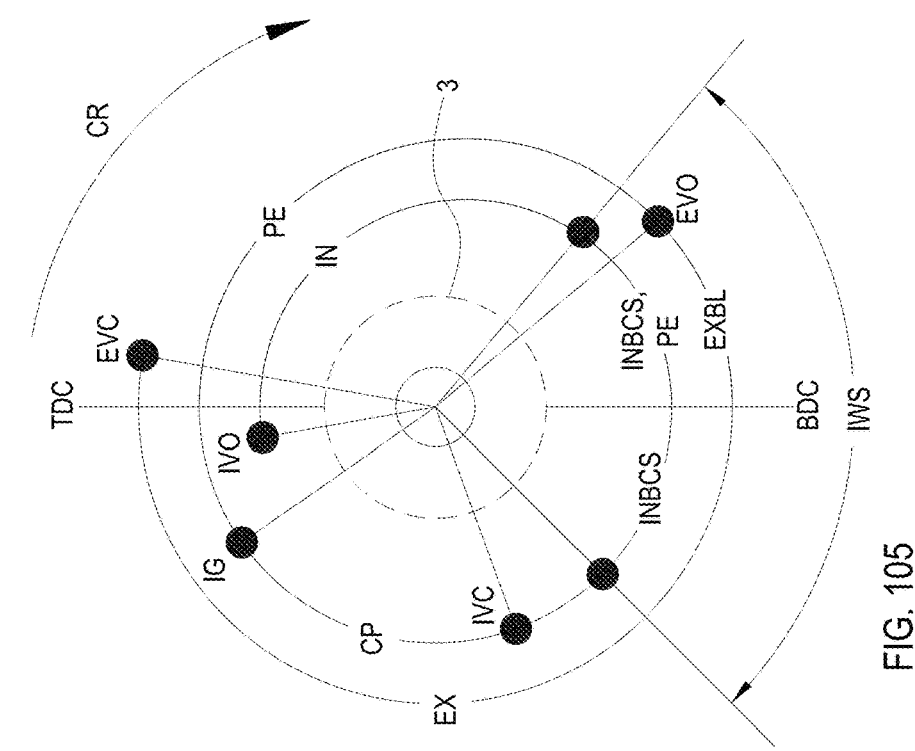
Figure 108:
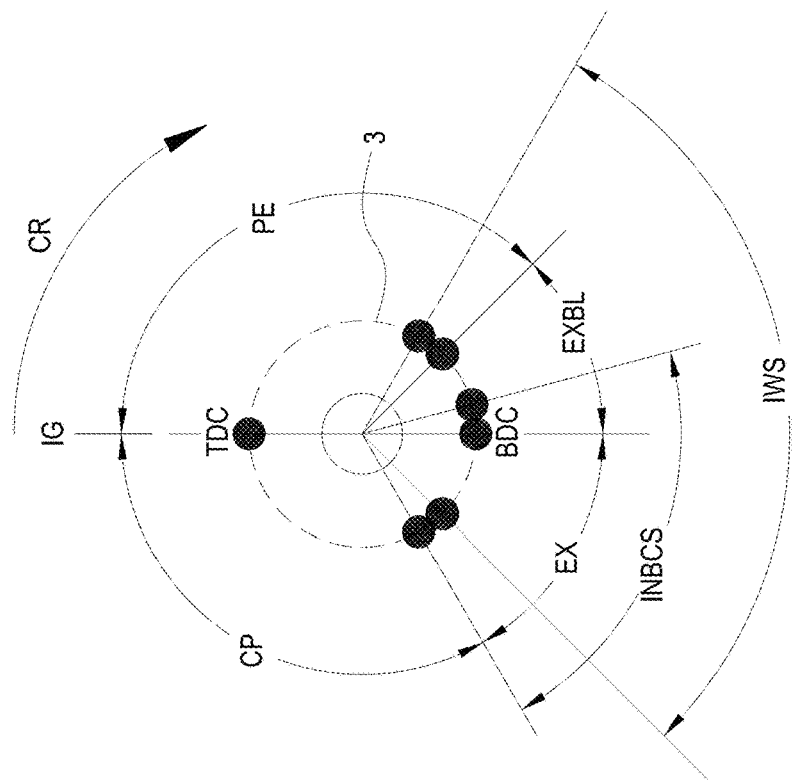
FIG. 107 to FIG. 110 are diagrammatic drawings illustrating 2-stroke cycles that could be carried out in an embodiment similar to FIG. 96 or FIG. 100.
Figure 107:
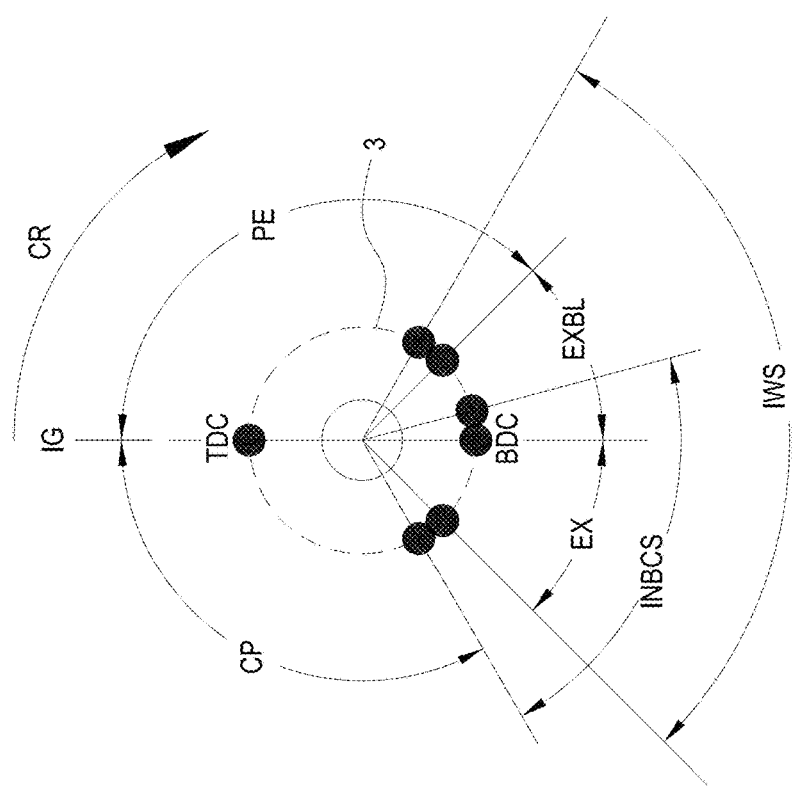
Figure 110:
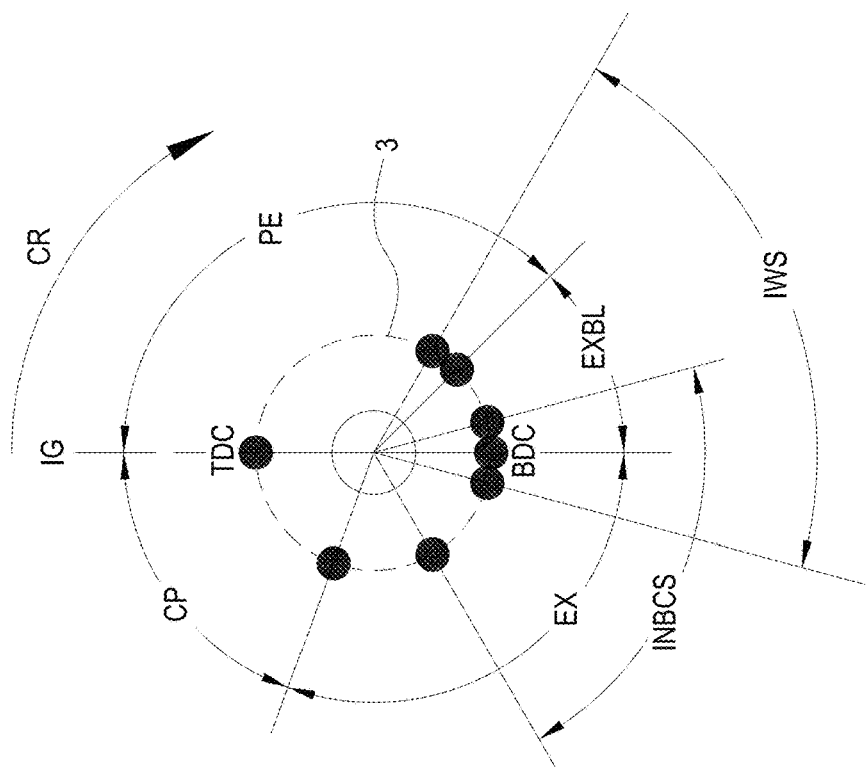
Figure 109:
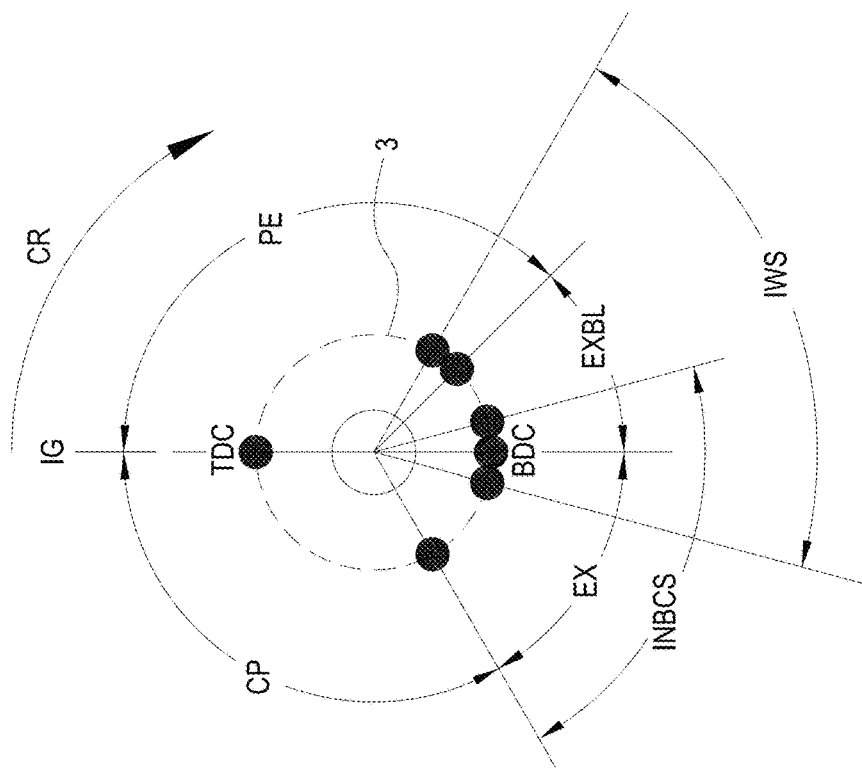
Figure 118:
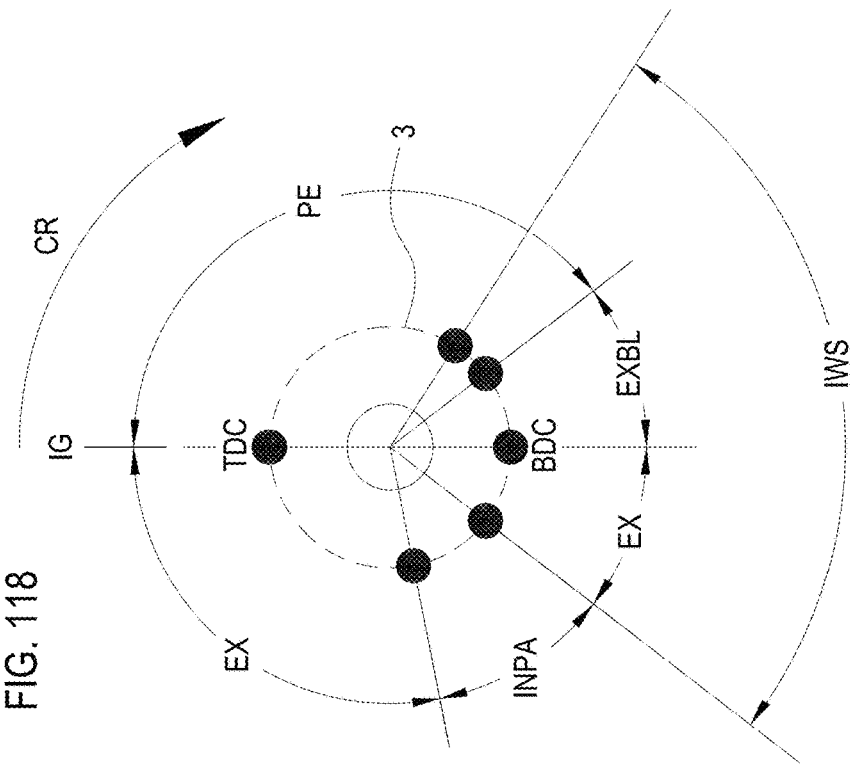
FIG. 117 to FIG. 135 are diagrammatic drawings illustrating 2-stroke cycles that could be carried out in an embodiment similar to FIG. 111 or FIG. 114.
Figure 117:
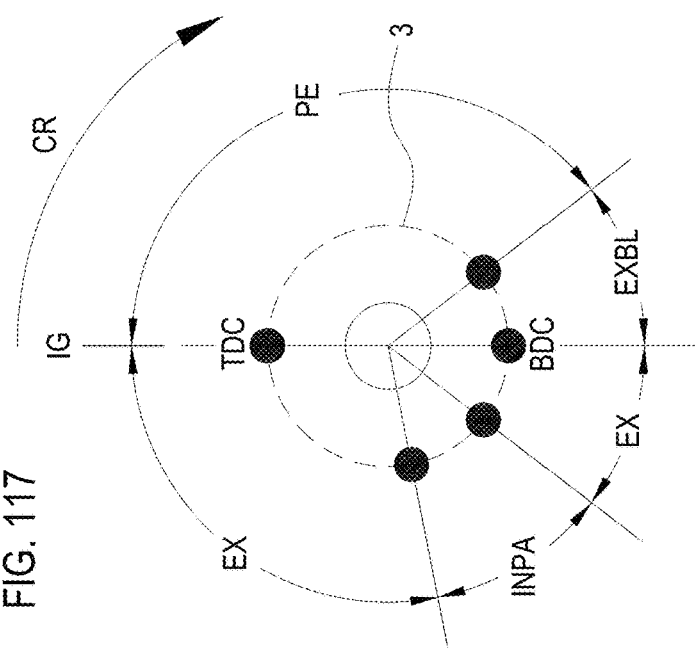
Figure 120:
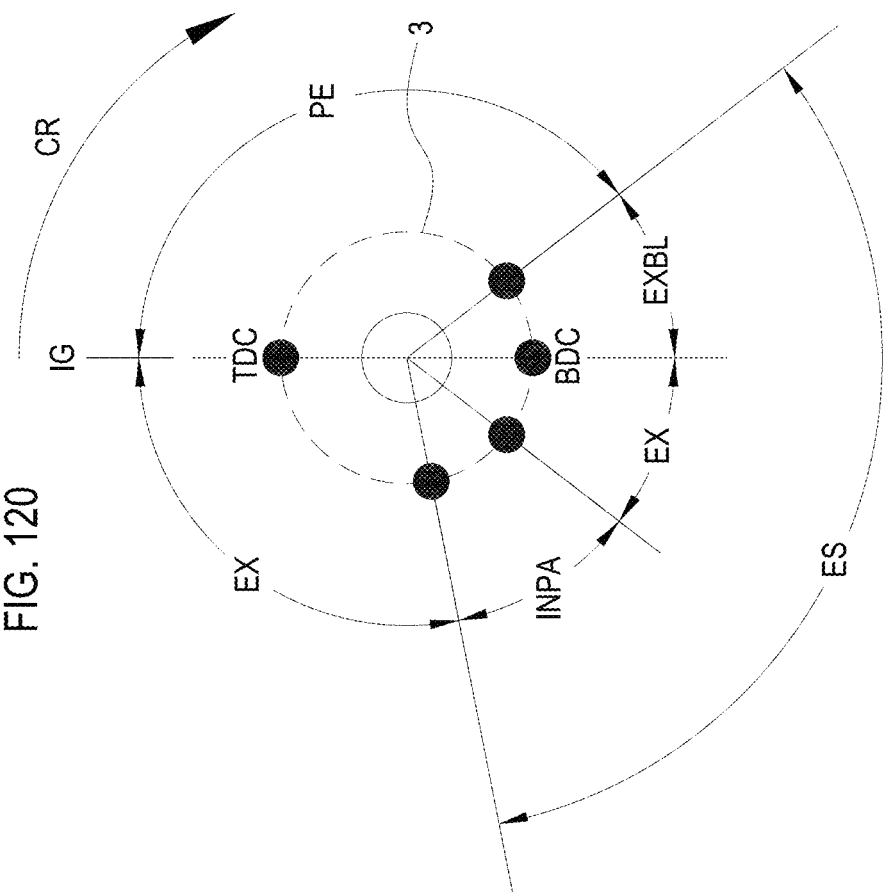
Figure 119:
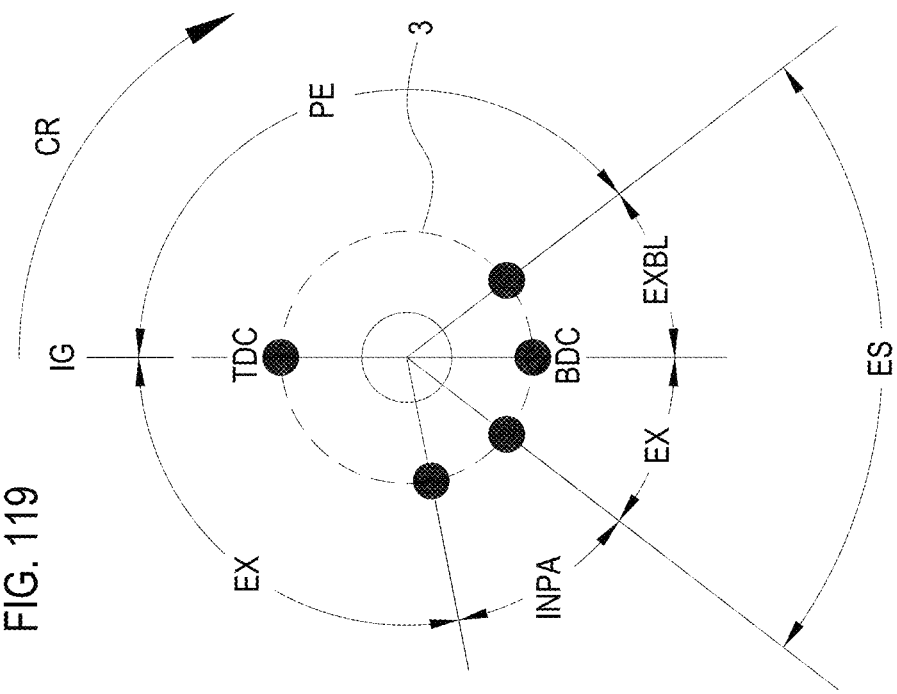
Figure 122:
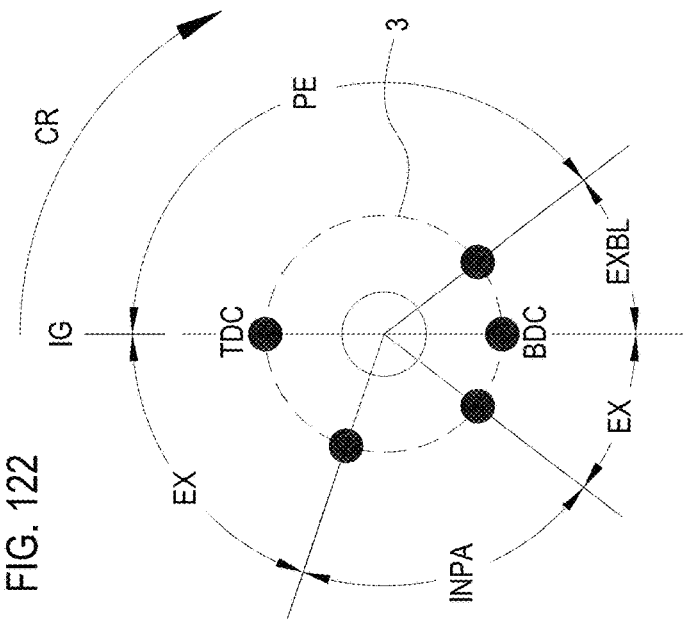
Figure 121:
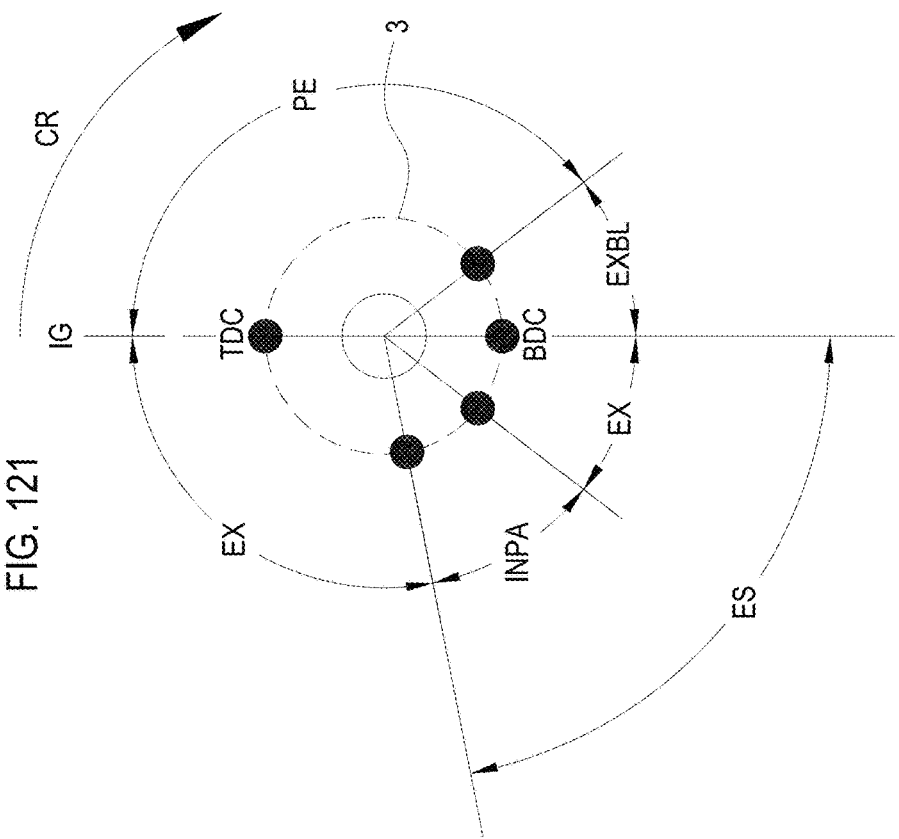
Figure 124:
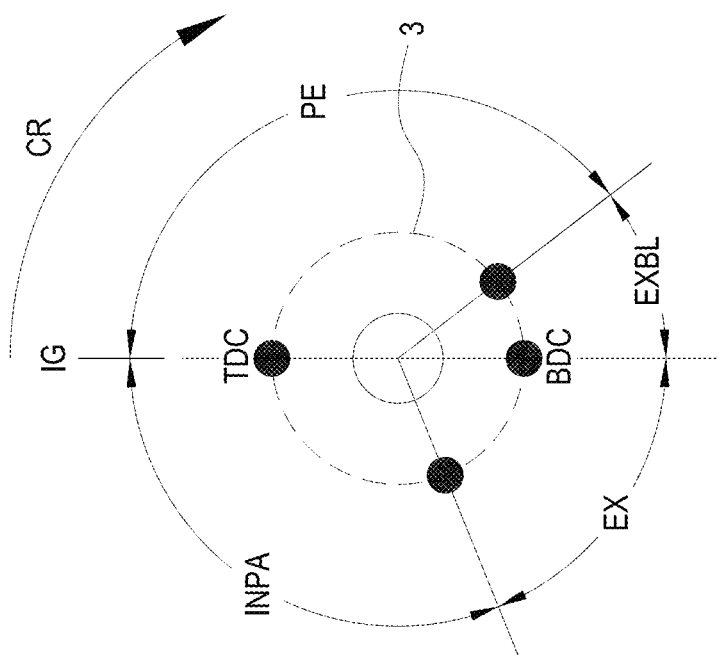
Figure 123:
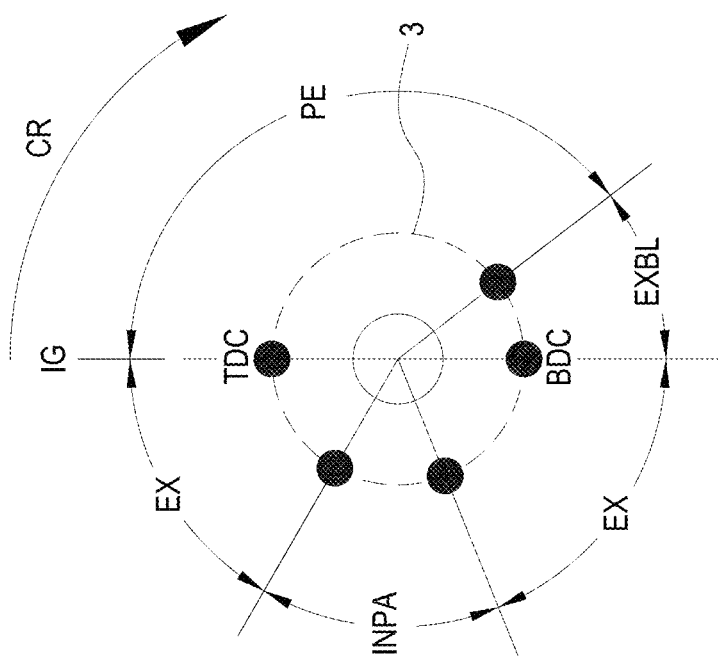
Figure 125:
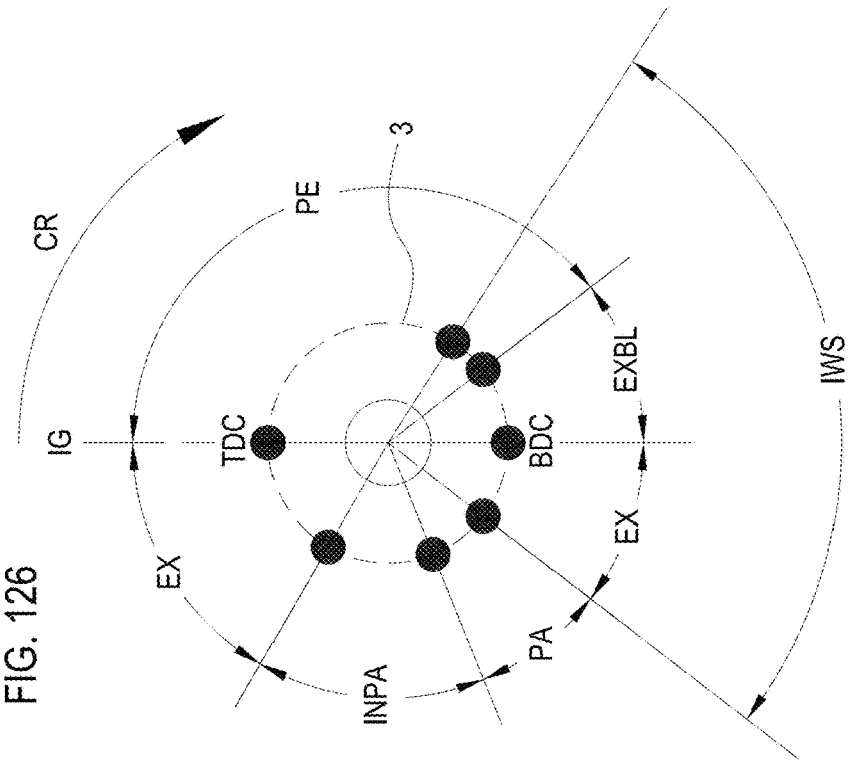
Figure 126:
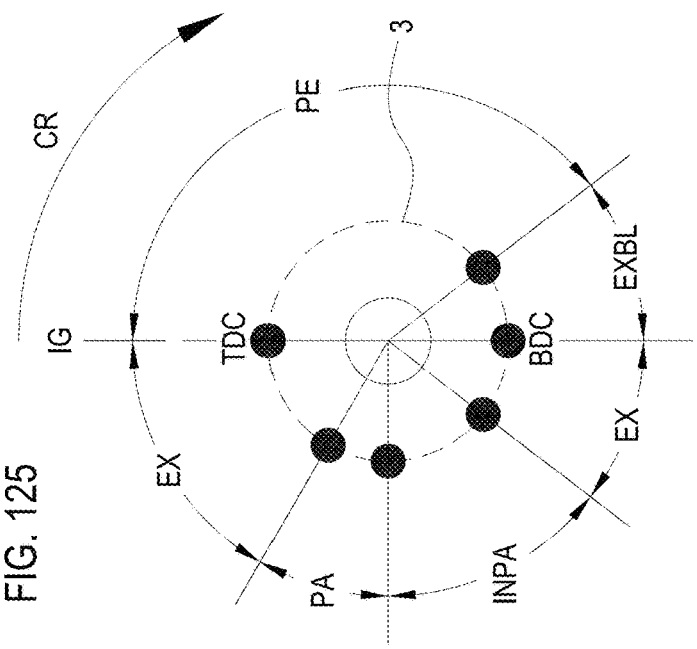
Figure 128:
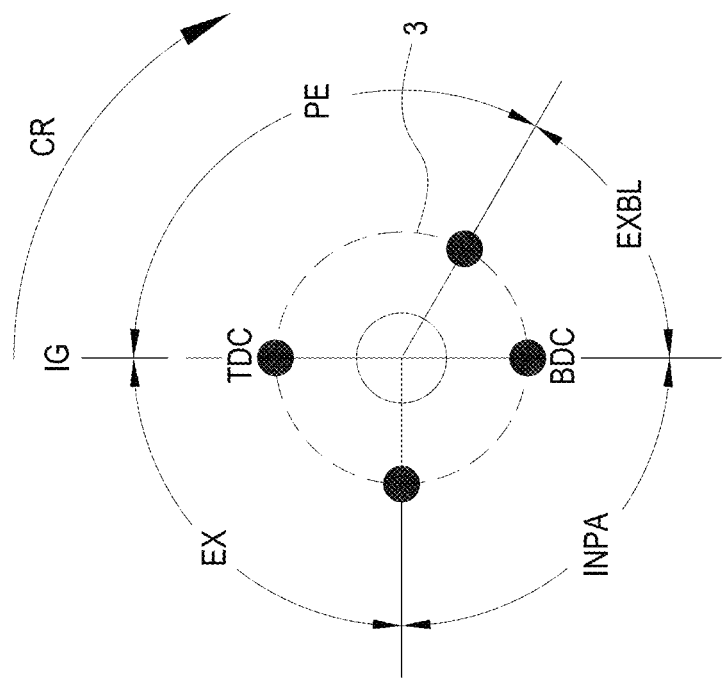
Figure 127:
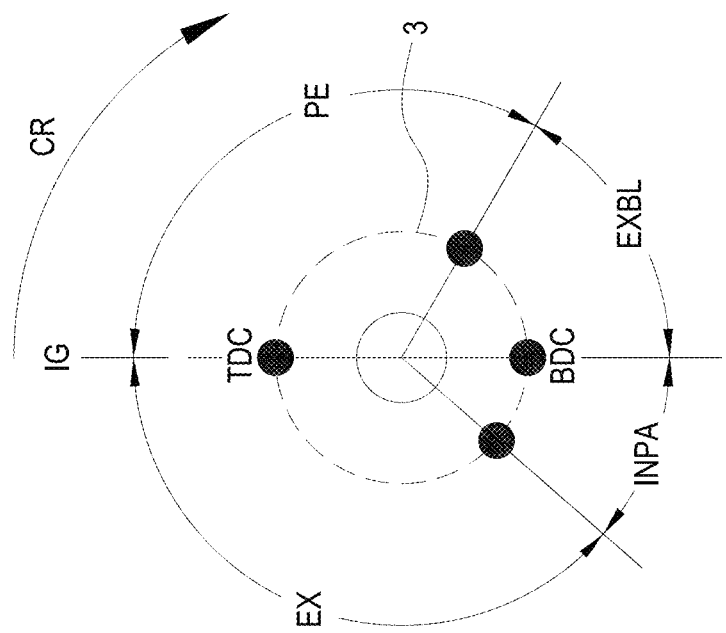
Figure 130:
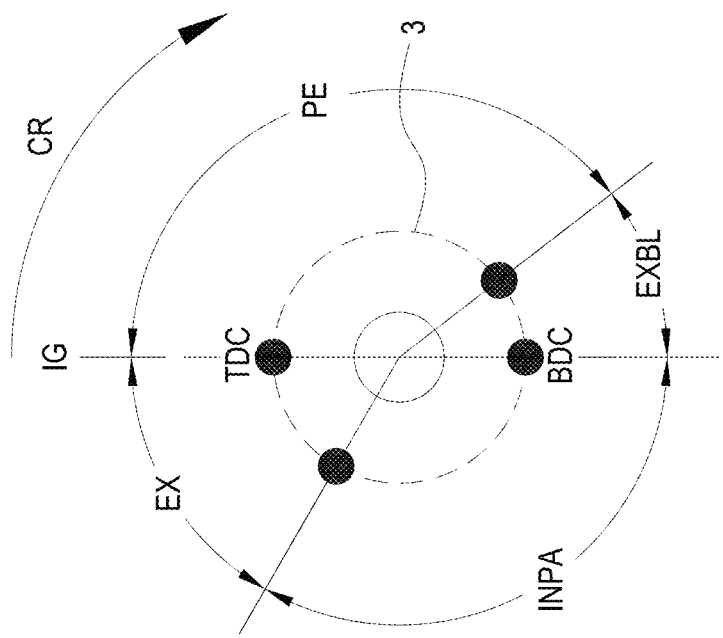
Figure 129:
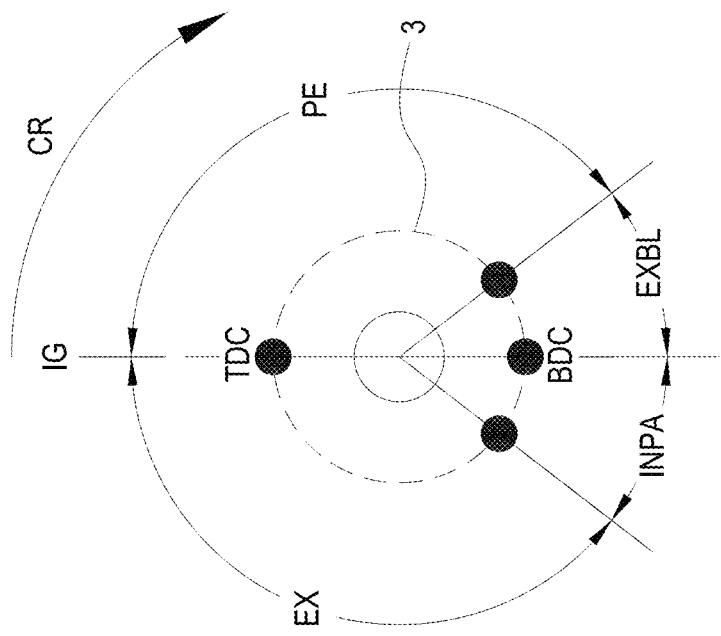
Figure 132:
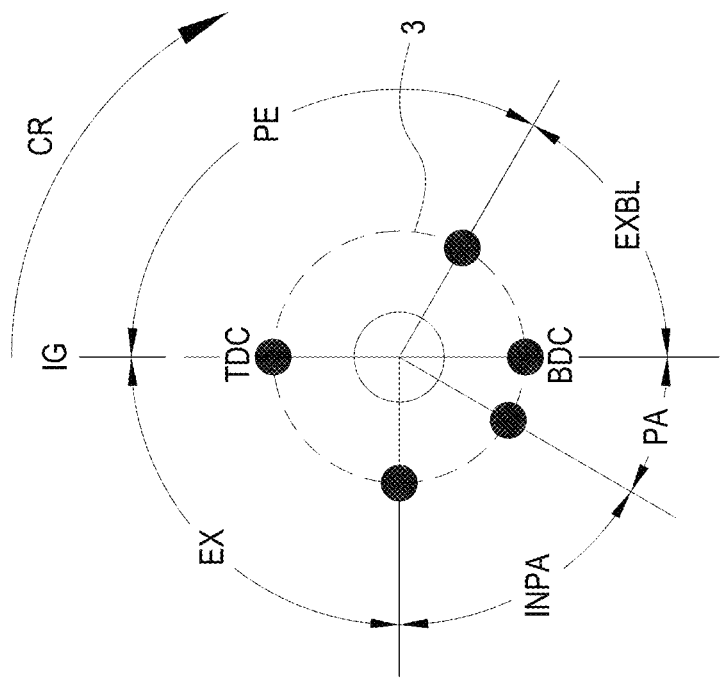
Figure 131:
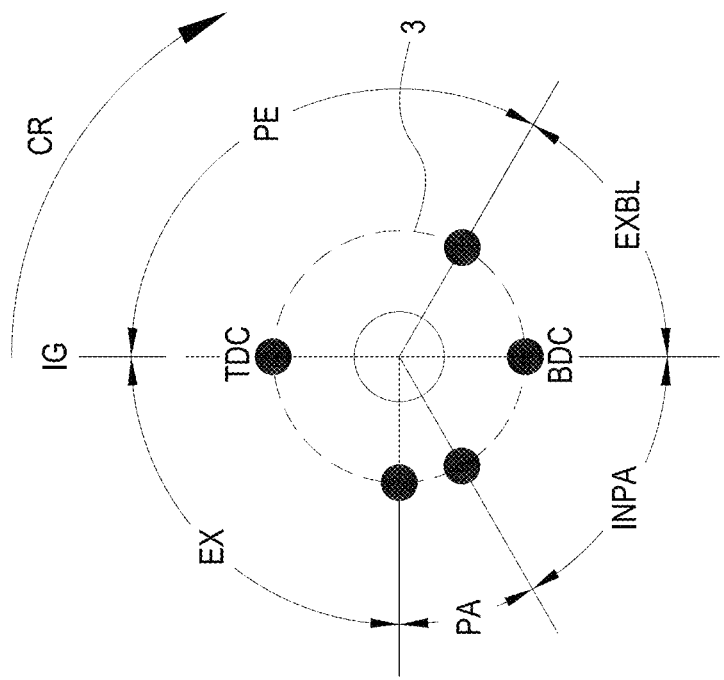
Figure 134:
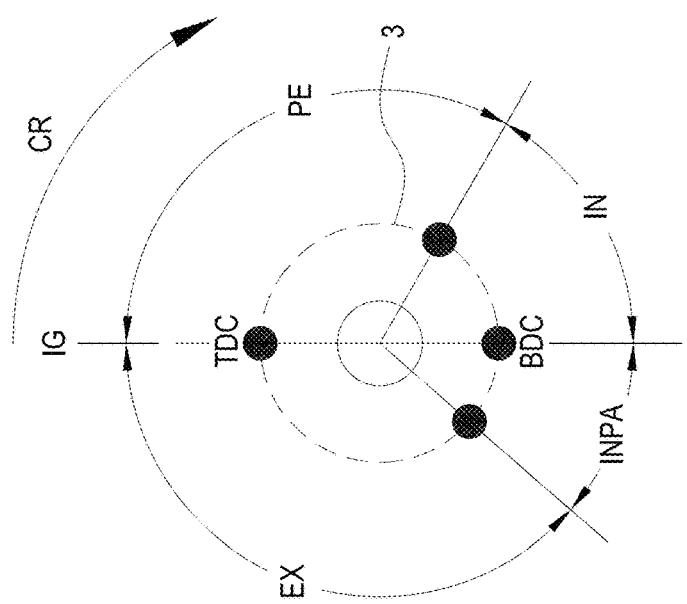
Figure 133:
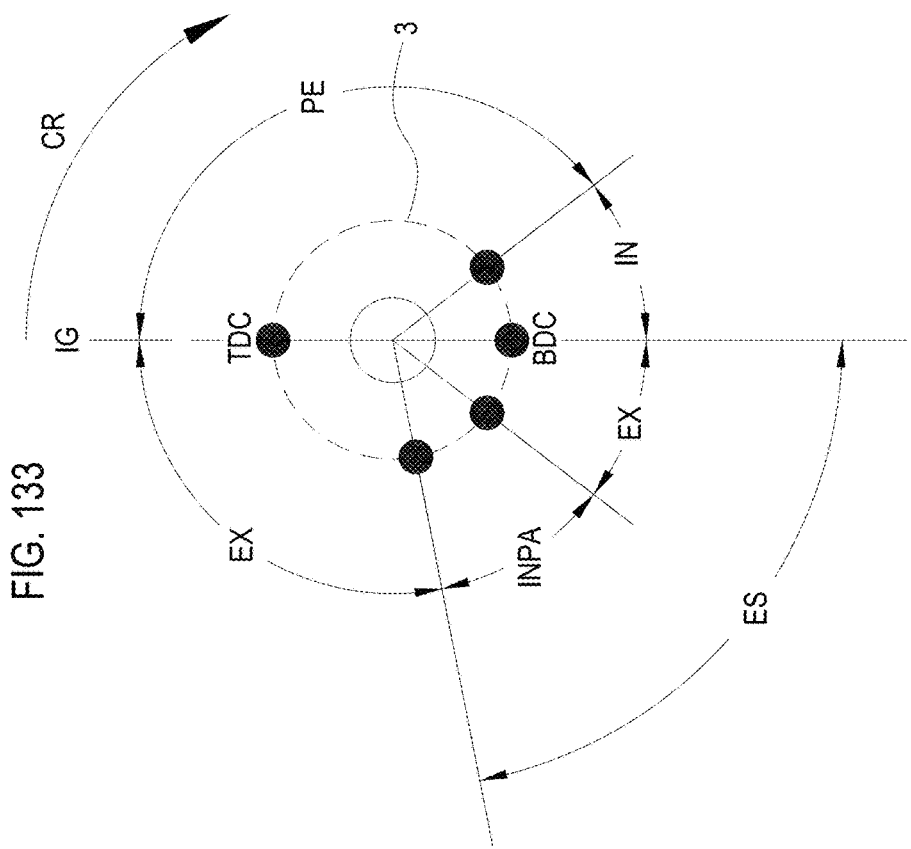
Figure 136:
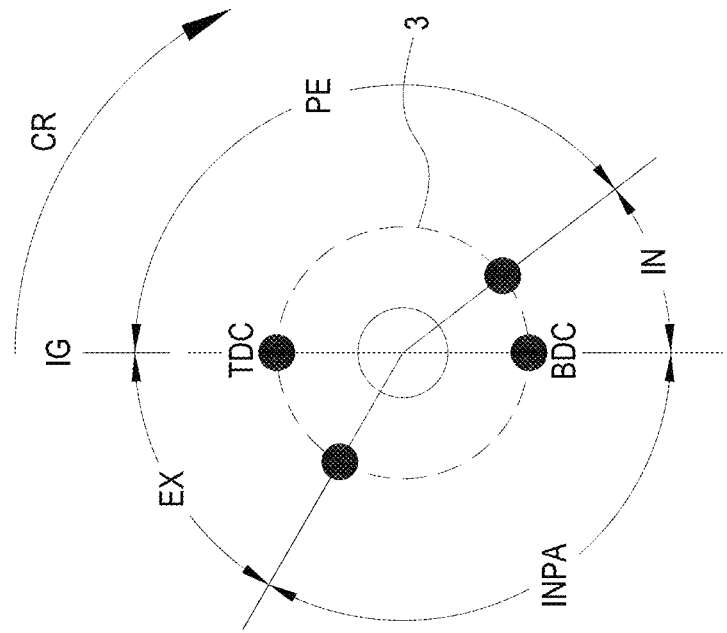
FIG. 136 is a diagrammatic drawing illustrating a 2-stroke cycle that could be carried out in an embodiment similar to FIG. 114.
Figure 135:
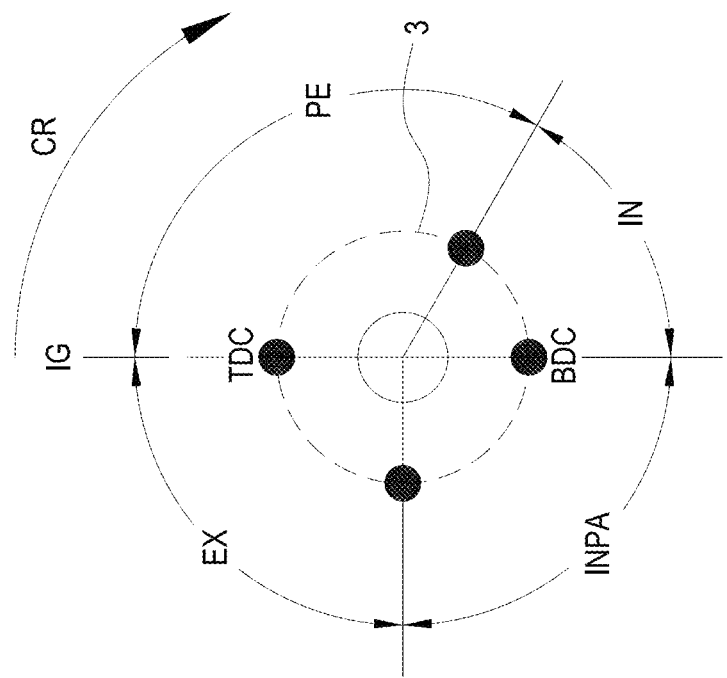
Figure 138:
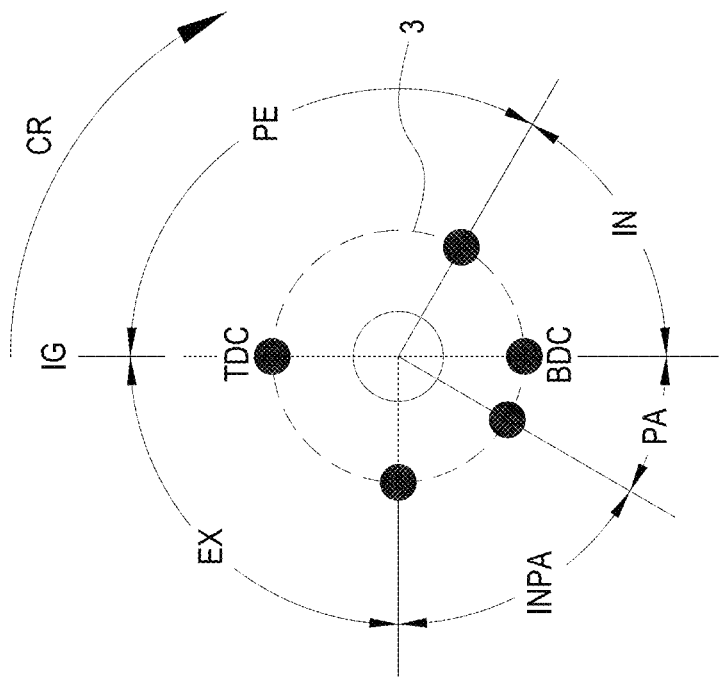
FIG. 137 and FIG. 138 are diagrammatic drawings illustrating 2-stroke cycles that could be carried out in an embodiment similar to FIG. 111 or FIG. 114.
Figure 137:
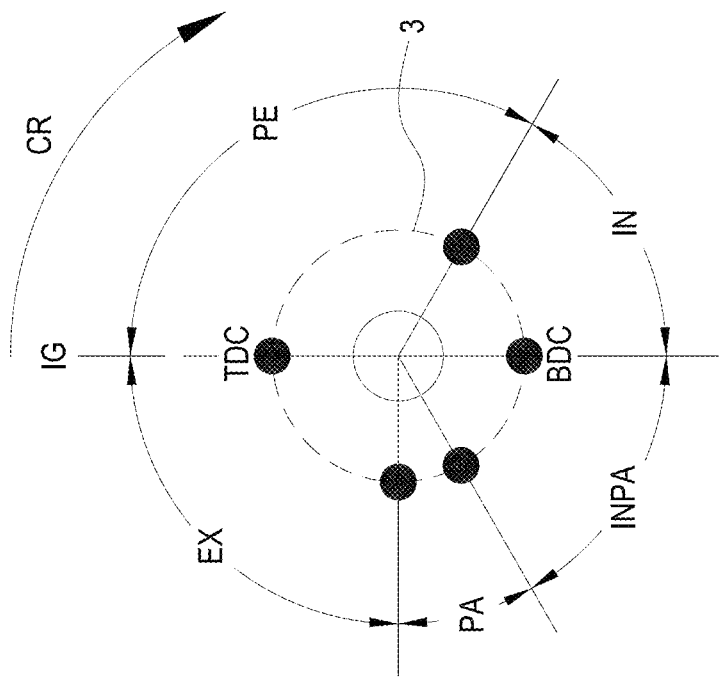

In-cylinder (water/steam) injection may occur a period before "IN" or "INPA" phase(s) shown on some of the diagrammatic drawings so that the injected substance has time to expand, cool and contract to create and/or aid in an intake phase. These periods all depend on conditions of the engine, etc. Note that in some engines, depending on their construction and intended use, the BOS chamber, that is shown in the sectional cut drawings labeled as 19, may not be needed to help produce some of the diagrammatic drawings illustrating cycle(s) related to it. To help keep the timing diagrams from becoming cluttered, injection and/or BOS chamber charge scavenging is not shown in all of the diagrammatic drawings. A BOS chamber (water/steam) injection may occur in the BOS chamber 19 during different times when its most efficient, convenient, etc. The BOS chamber's exhaust flow out and/or corresponding vacuum, if any, can be used to produce or aid intake, a power stroke, etc. or the vacuum can be stored in the BOS chamber and used later in that cycle or another (especially if, for example, the BOS chamber is separately valved, similar to what is shown in FIG. 79).

Phases used in methods of the present invention can shift or vary from cycle to cycle. Phases in each cycle depend on the preceding cycle and preceding methods of phases in the current cycle itself. For example, an intake phase utilized in the present invention might not rely on any mechanical piston displacement from the engine itself to produce the intake phase. Instead this intake phase might rely solely on the cooling and condensing of hot expanded combustion gases to produce the intake phase. The strength and/or size of this intake phase would depend on the amount of contraction of the hot combustion gases in the combustion and expansion phases, which in turn would depend (all with many other factors) on the temperature of the hot combustion gases, which in turn would depend on the heat release of the fuel from an amount which in turn would depend on the cylinder charge of fresh air (volumetric efficiency) of the intake phase(s) of the preceding cycle. Each cycle is usually based off the one before; each phase is usually based off ones before.

In some cases, depending where a contraction is to be utilized, a stronger and/or larger contraction of the hot combustion gases can be obtained, if wanted, by further expanding the gases before they are utilized. Similar or comparable to how an increase of power from an expansion stroke or phase can be obtained from an increase in the compression of gases (of a combustible charge) from a compression stroke or phase in an engine, an increase of power from a contraction stroke or phase can be obtained from an increase in the expansion of gases from a expansion stroke or phase in an engine. In some cases, depending on the construction of an engine, etc., the time/duration of heat utilized to cool gases and produce a contraction that can be efficiently utilized may vary. In most cases carrying out an expansion and/or cooling phase of gases to produce an efficient contraction usually occurs somewhere when the engines piston is around BDC or in its half stroke nearest BDC when more cooling surface of the cylinder walls is exposed, along with the fact that the piston is moving slower in its stroke near BDC and exposing the gases to the cylinder walls for a longer period of time. Also using an expansion stroke or phase(s), if wanted, to produce an efficient contraction, can reduce the mass of gases in the cylinder when compared to not having said expansion stroke or phase(s), and because of this there will be more cylinder surface area per mass of gases available to utilize heat transfer.

Depending on the mechanical construction of the engine, things like the engines cooling wall surface to cylinder displacement ratio may be ample to better utilize heat in methods of the present invention so that preheated substance injection (such as water/steam injection) may not be needed to efficiency utilize the gas changes. Even though preheated substance injection can be used in these cases, the engine would function efficiently for its intended use without said injection.

In some cases there can be certain limitations in utilizing the gas changes utilized in the present invention which can be overcome or strengthened by another aspect of the present invention. Depending on the mechanical construction of the engine, things like the engines cooling wall surface to cylinder displacement ratio may not be ample to better utilize heat in methods of the present invention. In these cases, the engines cycle may function, even efficiently, but for example, usable power, if any, might be too low for the engines intended use, etc. Using preheated substance injection (such as water/steam injection) is just one way of counter-acting these complications in these cases.

Mechanical construction of engines varies greatly and is well known in the art and because of this, individual parts on the sectional cut drawings disclosed were left simple to keep these diagrams from becoming excessive and cluttered. Most sectional cut drawings disclosed show engines with injectors but depending on the engines intended purpose, a carburetor can be used instead if care is taken to use the carburetor efficiently with the mechanical and thermodynamic cycles of the engine. The present invention can be applied to most any engine construction, engine layout, engine parts, etc. to fit the demands of its intended use. Injectors, injection systems, carburation systems, oil systems, exhaust systems, etc. designs are also all well-known in the art and most any can be applied to the present invention. In some cases it may be preferable but may not be necessary to use certain materials in construction (such as materials with a higher, or lower heat transfer coefficient, lighter materials, stronger materials, etc.) to fit the demands of the engines intended use but all can be applied to the present invention.

Cycles from methods of the present invention may function independently (without relying upon aid) from charging and/or scavenging devices such as the use of auxiliary compressors, compression and/or charging cylinders or devices, crank case pumping, superchargers, fans, blowers, external condensers, etc., and from intake and/or exhaust charge velocity systems such as from ballistic speed/wave-energy of the gases, tuned pipes, intake and/or exhaust overlap scavenging, intake and/or exhaust flow, wave pulse, mass inertia, etc. scavenging systems but cycles from methods of the present invention may also function with the aid or using the aid from these devices and/or systems, sometimes to fit the demands of the engines intended use, and most all can be applied to methods of the present invention.

On a test engine by the inventor, the mass-inertia gas flows (usually caused from tuned pipes, velocity charging systems, intake and exhaust overlap timing scavenging, etc.) were done away with and a highly restricted breathing test engine was built and shown to have a functioning cycle(s) without these scavenging aids. An engine similar to that shown in FIG. 158 with pieces made up mostly of 8, 21, 22, 23, and 25 throttled and somewhat contained and restricted the exhaust flow from the cylinder, and also slowed the intake flow into the cylinder. This engine did not use the additional/optional head valves 10 and 11 shown in FIG. 158, and this engine didn't have intake or exhaust pipes which meant there could not be any intake and exhaust phase overlap scavenging aiding its cycle. The sectional cut drawing in FIG. 159 shows the engines exhaust/intake flow restrictor 25 at a position that gave the cycle good power (i.e. with the throttle opened but still in a restrictive position to gas flow). The sectional cut drawing in FIG. 160 shows the engines exhaust/intake flow restrictor 25 at a highly restrictive position when the cycle was functioning at an idle.

In some cases, an engine utilizing methods of the present invention may have a reduced cylinder charge of fresh air (a lower volumetric efficiency when compared to a conventional engine) and the resulting power per explosion/expansion phase might be less than in a comparable conventional engine but in some cases in an engine utilizing the present invention, the number of power-producing phases per mechanical cycle of the engine can be increased over that of a conventional engine which would help make up for the lower volumetric efficiency, and because an engine utilizing methods of the present invention like this would have lower, more even loads, the stresses in some of the mechanical parts of the engine would be reduced in which case the parts can be made lighter and some more cheaper than the corresponding parts required for a conventional engine not utilizing the present invention.

Methods of the present invention can be used as an advantage, without limitation, to reduce or reverse pumping loss, reduce mechanical friction, and decrease the idle (non-power-producing i.e. power-taking) strokes and phases usually found in conventional engine cycles and to increase an engine's performance from what it would be otherwise, which gives the present invention the ability to produce an engine that can achieve higher thermal efficiencies for wider ranges of operating conditions from what they would be in a comparable engine that doesn't utilize methods from the present invention.

The present invention provides novel methods of phases, and/or change in existing phases that occur in a conventional engine, some without relying on mechanical displacement of the piston like in a conventional engine, to produce new efficient complete thermodynamic engine cycles by utilizing heat transfer.

First Illustrative Embodiment

In a first illustrative embodiment of the present invention, the invention is carried out with engine parts similar to the sectional cut drawing disclosed shown in FIG. 2 labeled crank throw 2, connecting rod 4, piston 6, cylinder 8, intake valve 10, exhaust valve 11, which are similar to that used on automotive, tractor or lawn mower engines. Crank throw 2 travels around the center of crankshaft 1 as indicated by dashed line 3. Crank throw 2 is free to rotate in the attached end of connecting rod 4 in which the other end of connecting rod 4 is attached and free to pivot to piston 6 at the center of wrist pin 5. Piston 6 slides in cylinder 8 and has a reciprocating travel between a top dead center position (TDC) and a bottom dead center position (BDC) as indicated by dashed line 7. In this embodiment, standard engine valves are shown in FIG. 2 and FIG. 3 labeled 10 and 11 in head 9.

Referring now to FIG. 4 which shows a diagrammatic drawing of a functioning 2-stroke cycle from the embodiment shown in FIG. 2 when the cycle shown in FIG. 4 is functioning near a suitable operating speed, say 2,500 rpm. With cycle efficiency in mind, a longer expansion phase PE is shown in FIG. 4 when compared to the compression phase CP in order to obtain more energy from expanding combustion gases. When piston 6 travels toward BDC and a suitable expansion phase PE has been carried out, exhaust valve 11 opens in FIG. 2 and an exhaust blow-out phase EXBL begins which is shown in FIG. 4 when piston 6 is traveling towards its BDC position. Depending on the pressure of the gases in cylinder 8 at this point, the gases in cylinder 8 may or may not have enough pressure to provide a cylinder exhaust blow-out phase EXBL on their own, and if not, the cylinder gases may need to be aided by an additional expansion of gases from an injected substance such as water/vapor from a combustion heated nozzle 17 shown in FIG. 2 and FIG. 3. To aid a cylinder exhaust blow-out phase EXBL, the substance is injected towards the end of expansion phase PE as shown in FIG. 4 by an injection phase IWS. The injected substance from nozzle 17 expands from heat from nozzle 17 and from combustion heat from the combustion gases of expansion phase PE. The gas pressure from the expanding substance in the cylinder can aid or produce an exhaust blow-out phase EXBL in which cylinder gases are exhausted past exhaust valve 11. Towards the end of exhaust blow-out phase EXBL the cylinder gases are expanded and are at roughly atmospheric pressure and exhaust valve 11 is closed and intake valve 10 is opened while cylinder gases are transferring heat to the surface area of cylinder 8 containing them. Cylinder 8 should be limited to within a certain temperature range wherein more effective cooling of the cylinder gases can be utilized while still providing efficiency from the cycle, a range which can be found in actual conditions. The cylinder gases cool and contract and an intake flow forms when piston 6 is around its BDC position as shown in FIG. 4 labeled IN. The cooling of the expanded gases continues and the gases contract further producing an intake phase during travel of piston 6 to TDC as shown in FIG. 4 labeled INPA. When traveling to its TDC positon, piston 6 is decreasing the volume in cylinder 8 but the flow from the contraction of the gases in cylinder 8 still provides an intake INPA into the decreasing volume of cylinder 8. At the end of intake phase INPA, intake valve 10 is closed. At this point compression phase CP begins as shown in FIG. 4 in which the gases are compressed to at least 125 psi. Fuel injection phase IF follows along with ignition phase IG of the compressed gases. Piston 6 travels to its TDC position at which point piston 6 reverses in its reciprocating motion, starting its travel to BDC and repeating another cycle.

Figure 164:
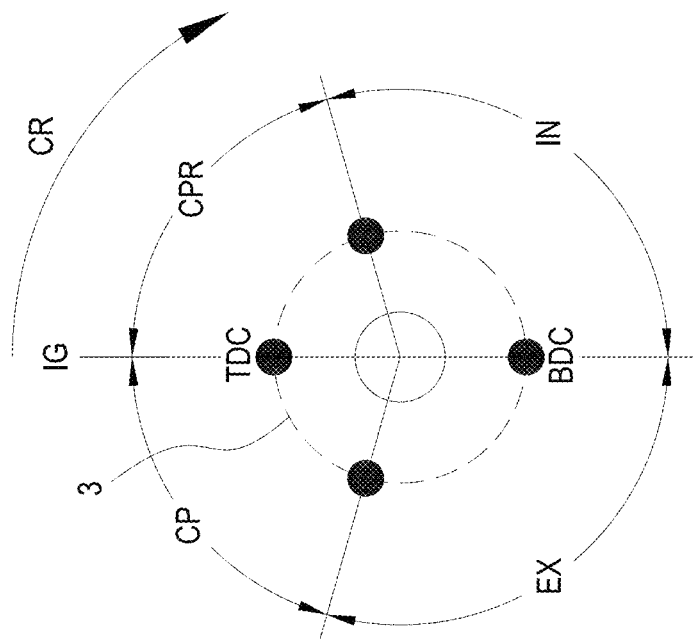
Figure 172:
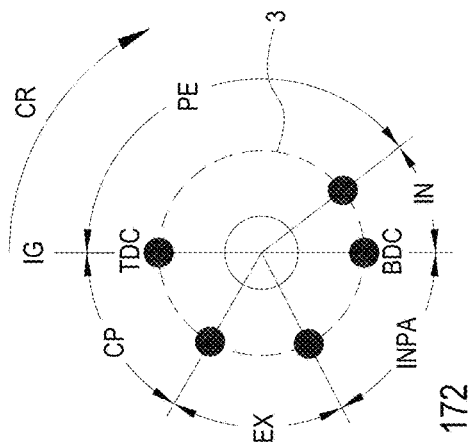
Figure 173:
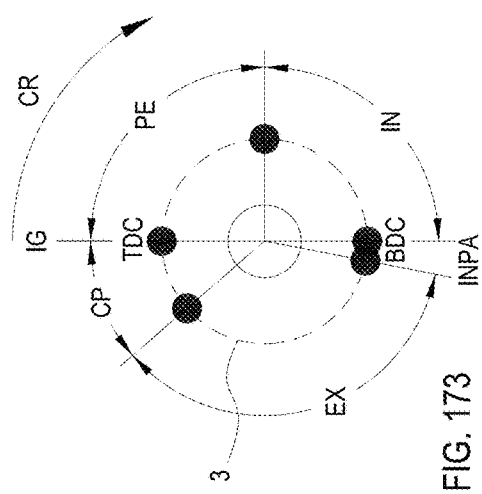
Figure 171:
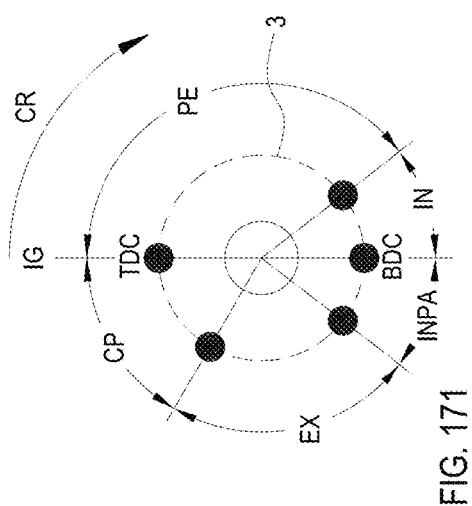
Figure 174:
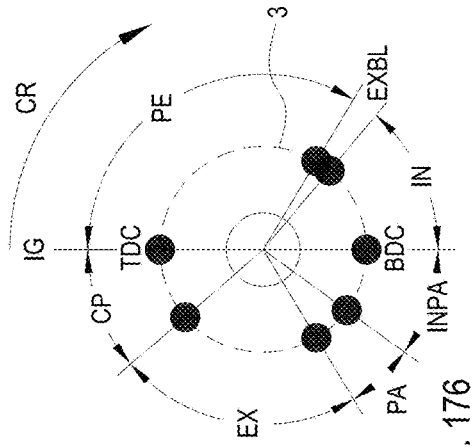
Figure 177:
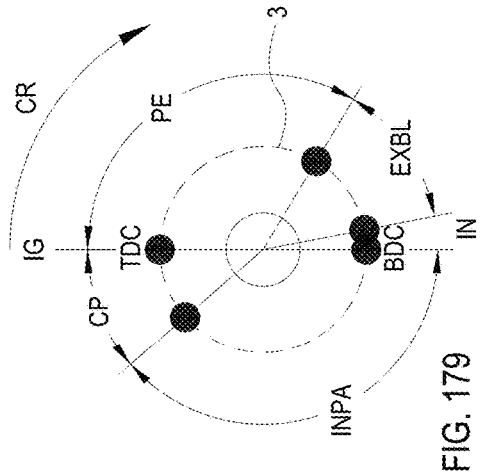
Figure 175:
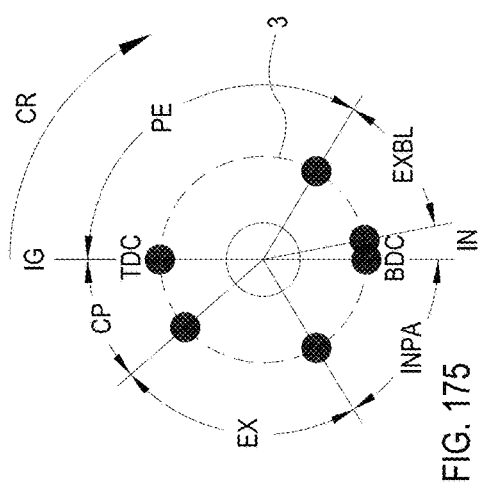
Figure 178:
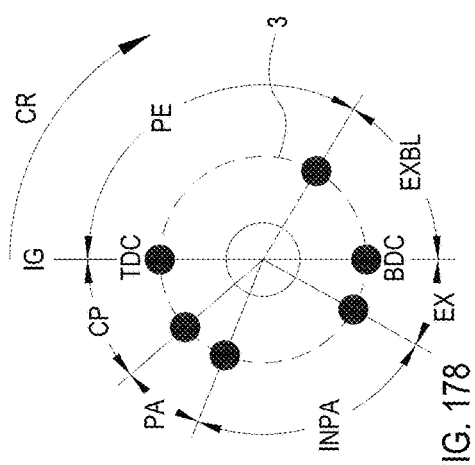
Figure 176:
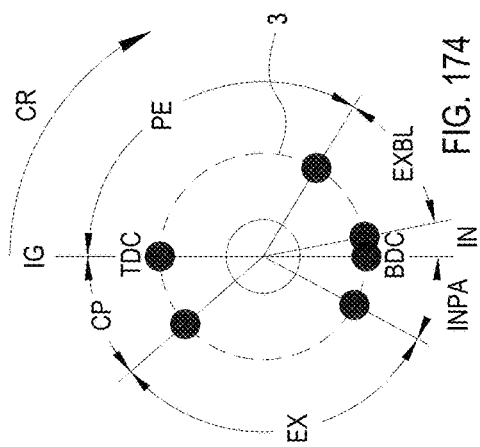
Figure 179:
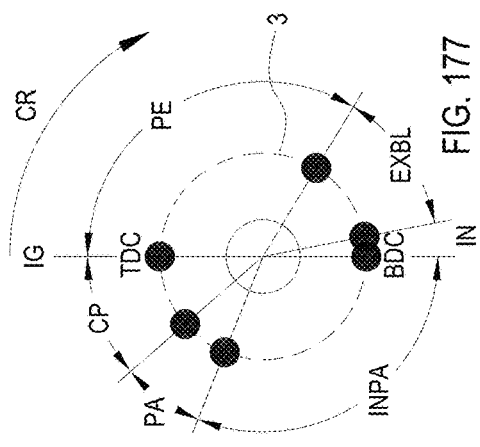
Figure 180:
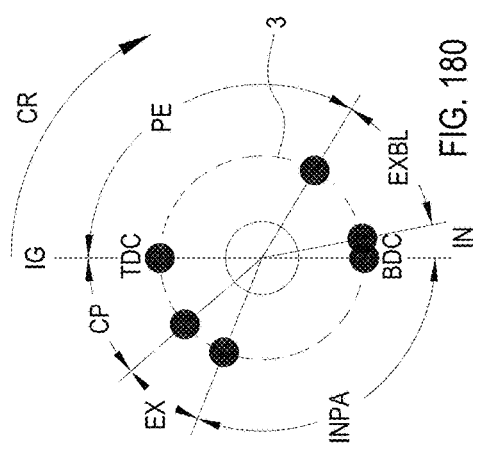
Figure 181:
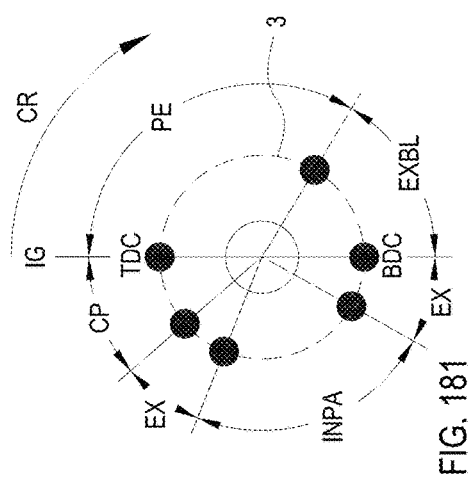
Figure 182:
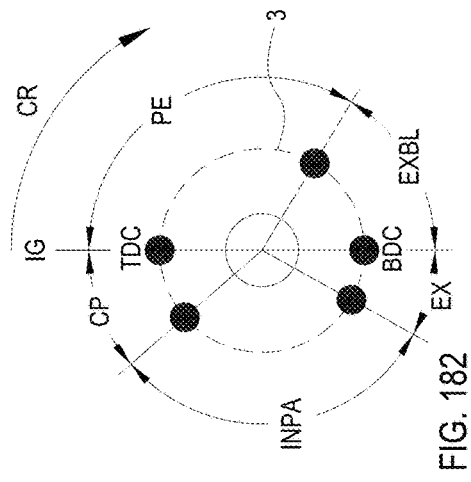
Figure 183:
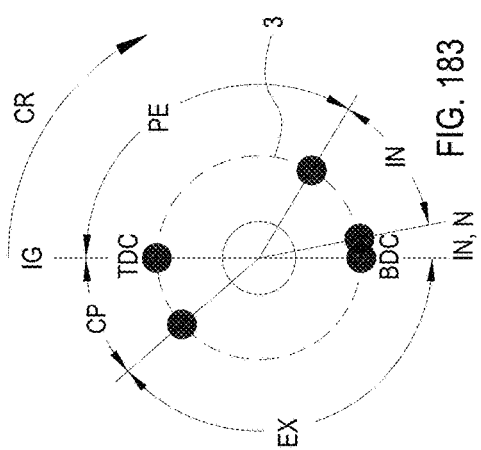
Figure 184:
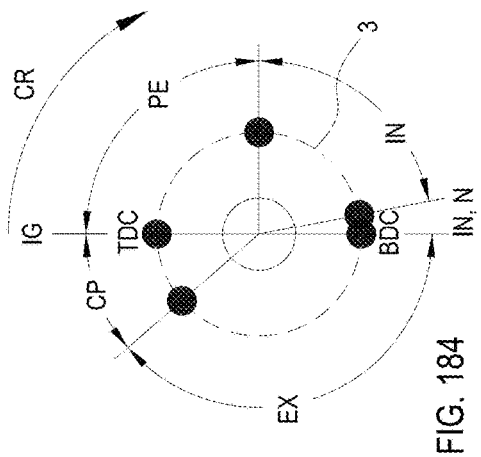
Figure 185:
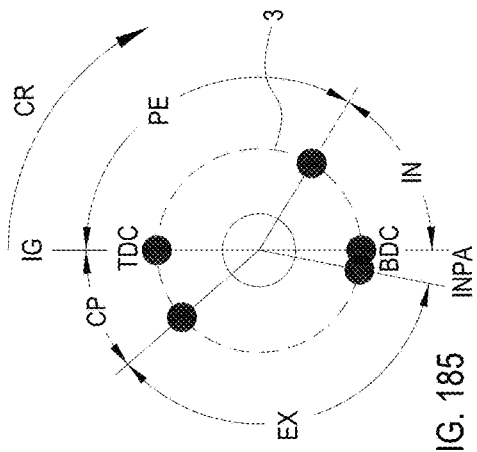
Figure 201:
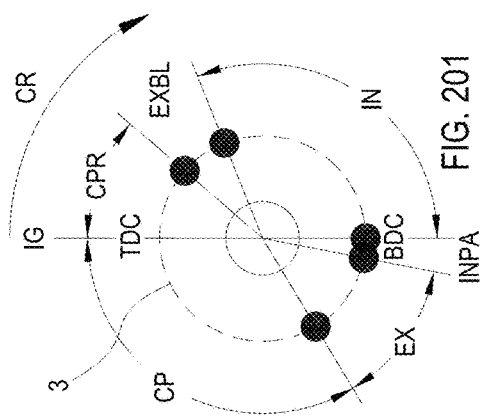
FIG. 201 to FIG. 205 are diagrammatic drawings illustrating 2-stroke cycles that could be carried out in an embodiment similar to FIG. 169.
Figure 203:
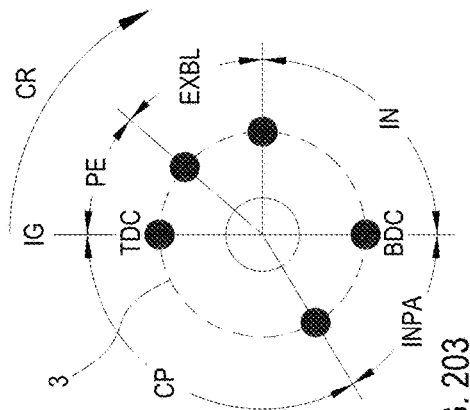
Figure 205:
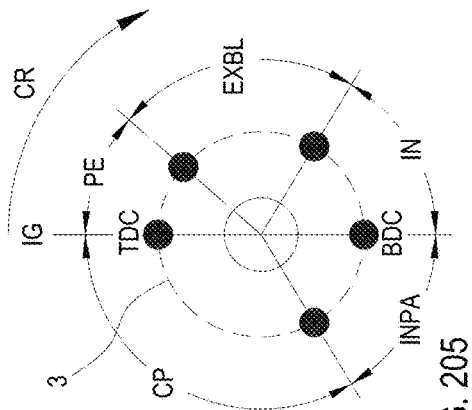
Figure 202:
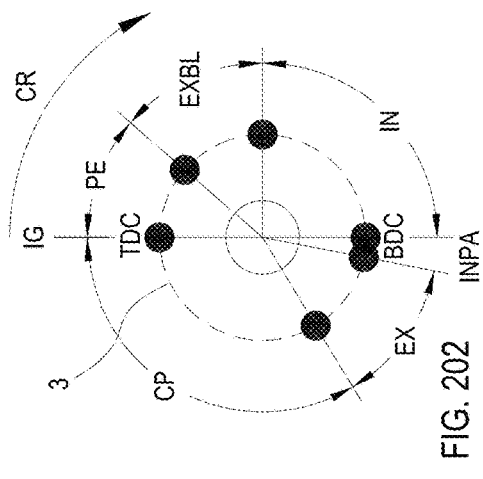
Figure 204:
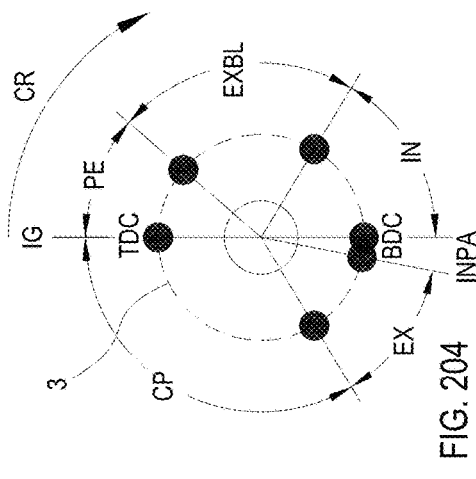
Figure 208:
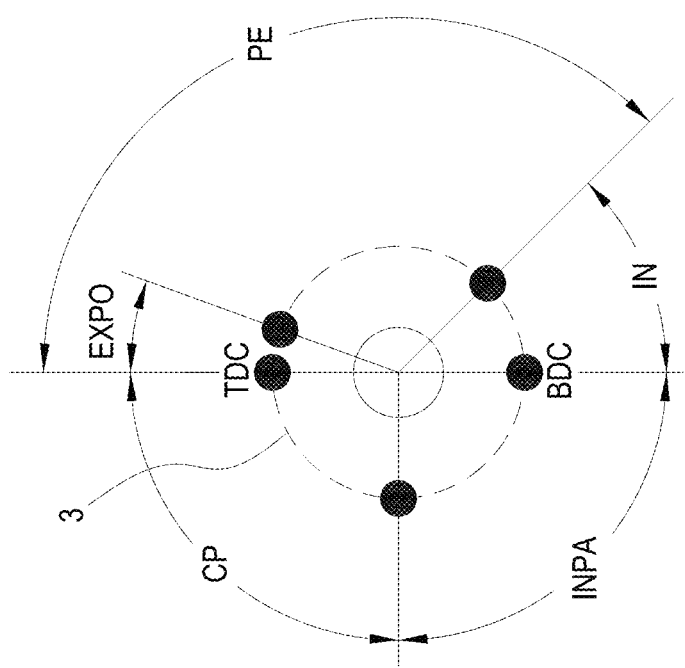
FIG. 208 is a diagrammatic drawing illustrating a 2-stroke cycle.

Because intake phase INPA of a cycle like shown in FIG. 4 depends on combustion heat from a previous combustion phase, another cycle, such as the start-up cycle shown in FIG. 164, is needed to initiate an intake phase IN such as from the mechanical displacement of piston 6 as piston 6 moves toward its BDC position. The intake phase IN provided by piston 6 is needed to initiate a combustion phase, to initiate an intake phase INPA similar to that in FIG. 4. If a combustion event does not occur in a cycle, such as in a misfire event, than a similar approach should be taken. In an engine of this embodiment, a timing device 32 is needed with such components as a sensor 34 to indicate or relate to pressure and phases in the engines cylinder 8 and a computerized controller, microprocessor or other circuitry that is able to control and change the timing of intake valve 10 and/or exhaust valve 11 to control air flow into and out of each cycle and to quickly adapt to changes, if any, in each cycle. To further add to this, if an injected substance is used such as water/vapor from a combustion heated nozzle 17 shown in FIG. 2 and FIG. 3, then a sensor 36 is needed to indicate or relate to pressure or temperature of the substance and/or nozzle 17. Because surface area 38 of nozzle 17 is in contact with combustion gases and because heat from combustion gases is being reflected or directed at nozzle 17 from the surface of an open-sided dome-shaped dead volume cavity 37, a nozzle such as nozzle 17 may become damaged overtime from combustion heat if a substance is not injected through nozzle as a means to cool nozzle. Using a sensor 36 to indicate or relate to the injection substance and/or nozzle 17 is one way to efficiently regulate the substance flow and prevent damage to nozzle 17 and because of this and because of changing phases that can occur in an engine like shown in the embodiments in FIG. 2 when carrying out a cycle such as in FIG. 4, a sensor 36 indicating or relating to the injection substance and/or nozzle 17 should be linked to a timing device 32 with such components as a computerized controller, microprocessor, or other circuitry that is able to control and regulate the injection substance, its timing, durations, etc., which should be linked to communicate with the circuitry of sensor 34 indicating or relating to phases in the engines cylinder 8.

The cycle in FIG. 4 is shown for one speed, one power, under steady conditions, etc., if conditions change, the cycle will change and the mechanical valve timing of intake 10 and exhaust 11 should be changed to provide efficient timing for the cycle to utilize heat transfer and gas changes in the cycle. An electronically controlled and mechanically adaptable engine is required in the embodiment shown in FIG. 2 to carry out the cycle in FIG. 4. Conditions vary but intake volume in a cycle from using methods of heat transfer and gas contraction should be over $\frac{1}{5}^{th}$ of the displacement of the engine. Depending on the engines application, high pressure fuel injection, low pressure fuel injection, carburation, etc. can be used with an engine of this embodiment but because of the widely changing timing events from cycle to cycle of an engine of this embodiment, fuel feed into the engine needs to be timed with the engines cycle to restrict or limit fuel/fuel vapor from escaping out the engines exhaust.

Second Illustrative Embodiment

In a second illustrative embodiment of the present invention, the invention is carried out with engine parts similar to the sectional cut drawing disclosed shown in FIG. 169 labeled crank throw 2, connecting rod 4, piston 6, cylinder 8, intake valve 10, exhaust valve 11/12, which are similar to that used on automotive, tractor or lawn mower engines. Crank throw 2 travels around the center of crankshaft 1 as indicated by dashed line 3. Crank throw 2 is free to rotate in the attached end of connecting rod 4 in which the other end of connecting rod 4 is attached and free to pivot to piston 6 at the center of wrist pin 5. Piston 6 slides in cylinder 8 and has a reciprocating travel between a top dead center position (TDC) and a bottom dead center position (BDC) as indicated by dashed line 7.

In this embodiment, standard engine valves are shown in FIG. 169 labeled 10 and 11/12 in head 9. FIG. 169 was drawn to be similar to an actual test engine by the inventor that was setup in many configurations and that had an optional exhaust port 21 that can be ignored in this case. This engine had a flow-controlling device such as a reed valve, (not shown), in series and upstream of intake valve 10 that can quickly detect and respond to flow changes past intake valve 10, i.e. if flow into cylinder 8 reversed and tried to flow out of cylinder 8 past intake valve 10, the flow-controlling device stopped or slowed the flow. Exhaust valve 11/12 shown in FIG. 169 controls flow from cylinder 8 into BOS chamber 19 with reed valves 18. Reed valves 18 can quickly detect and respond to flow changes past exhaust valve 11/12 from cylinder 8 even if exhaust valve 11/12 does not respond to sudden changes in flow, i.e. if flow out of cylinder 8 reversed and tried to flow into cylinder 8 past exhaust valve 11, a flow-controlling device like reed valves 8 can stop or slow the flow. An engine similar to shown in FIG. 169 is more able to adapt to changes in each cycle than without reed valves 18 or other flow-controlling devices. Using simple reed valves or other devices to adapt to any changes in each cycle can be less complex, and cheaper than an engine construction like shown in the previous embodiment of FIG. 2 that uses a sensor and associated circuitry to indicate or relate to phases in the cycle and mechanically adapt to any changes.

Figure 30:
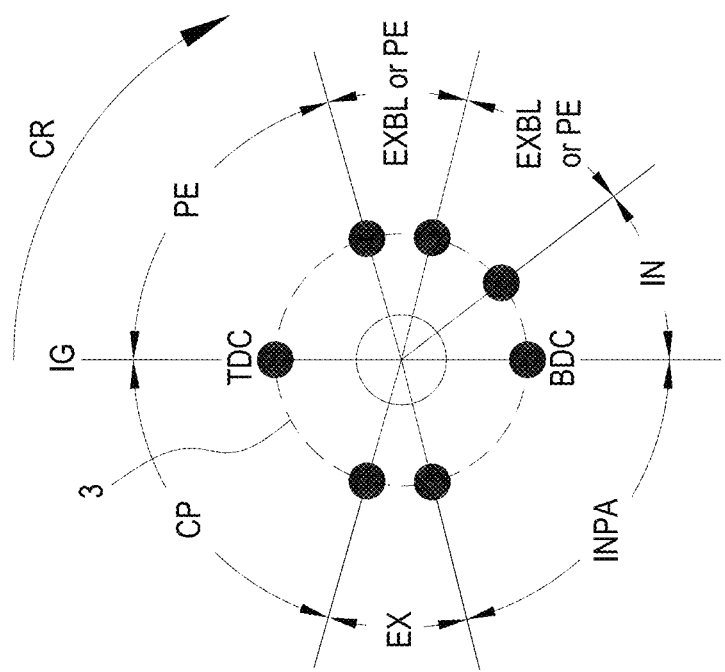

Referring now to FIG. 164 which shows a diagrammatic drawing of a start-up cycle that can be carried out from the embodiment shown in FIG. 169. This start-up cycle has intake IN caused by the mechanical displacement of piston 6. Because intake valve 10 and exhaust valve 11 have flow-controlling devices detecting and responding to flow changes, intake valve 10 and exhaust valve 11 do not need to respond instantly to changes in the cycle, if any, of the engine, and intake valve 10 and exhaust valve 11 can be more mechanically tied to the engines mechanical cycle rather than the changing cycles such as at start-up and misfire events, and changing thermodynamic cycles of the engine. Intake valve 10 and exhaust valve 11 can both open after the compression rebound phase φR shown on FIG. 164 and because of the flow-controlling devices, in this case reed valves 18, intake flow during intake phase IN shown in FIG. 164 can only flow past intake valve 10 shown in FIG. 169. This intake phase IN is produced by the displacement of piston 6 as piston 6 moves toward its BDC position which provides intake IN for the next cycle similar to that shown in FIG. 30 which can be assumed to be functioning at lower rpm such as an idle speed. Starting at TDC on FIG. 30, cylinder 8 has gases under compression from compression phase CP as shown in FIG. 164. Ignition occurs and combustion gases expand in cylinder 8 during expansion phase PE in FIG. 30. When piston 6 travels toward BDC and a suitable expansion phase PE has been carried out, exhaust valve 11 as shown in FIG. 169 opens and exhaust blow-out phase EXBL begins which is shown in FIG. 30. Along with or shortly after exhaust valve 11 opens, intake valve 10 opens during some of exhaust blow-out phase EXBL but because of the flow-controlling device upstream of intake valve 10, combustion gases are stopped or slowed from flowing past intake valve 10 and instead flow past exhaust valve 11 to provide exhaust for cylinder 8. Towards the end of exhaust blow-out phase EXBL shown in FIG. 30, cylinder gases are expanded and are at roughly atmospheric pressure. Intake flow forms when piston 6 is near its BDC position. The cylinder gases are transferring heat to the surface area of cylinder 8 containing them and cylinder 8 should be limited to within a certain temperature range wherein more effective cooling of the cylinder gases can be utilized while still providing efficiency from the cycle, a range which can be found in actual conditions. The expanded gases of the cylinder further cool and contract further producing an intake phase during the pistons travel towards TDC as shown in FIG. 30 labeled INPA. When piston 6 is traveling to its TDC positon, piston 6 is decreasing the volume in cylinder 8 but the flow from the contraction of the gases in cylinder 8 still provides an intake phase INPA into the decreasing volume of cylinder 8. Intake phase INPA will cease when the pressure of the gases in cylinder 8 raise which is usually when the pressure of the gases in cylinder 8 are near the pressure of the intake gases outside intake valve 10, and at this time the engine may have a slight exhaust phase EX as shown in FIG. 30. At some point intake valve 10 and exhaust valve 11 will close and compression phase CP will begin in which the gases are compressed to at least 100 psi. Fuel injection phase IF follows, (not shown), along with ignition phase IG of the compressed gases. Piston 6 travels to its TDC position at which point piston 6 reverses in its reciprocating motion, starting its travel to BDC and repeating another cycle.

Figure 13:
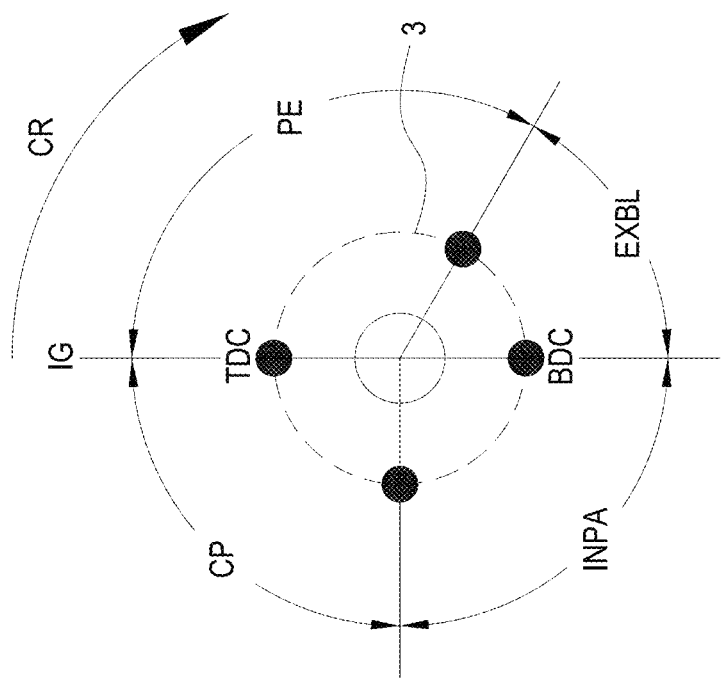
Figure 12:
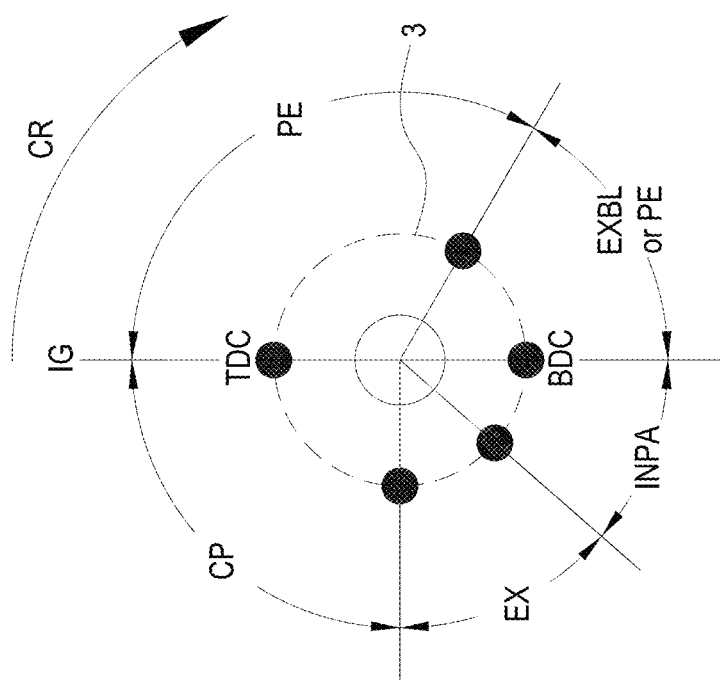
Figure 15:
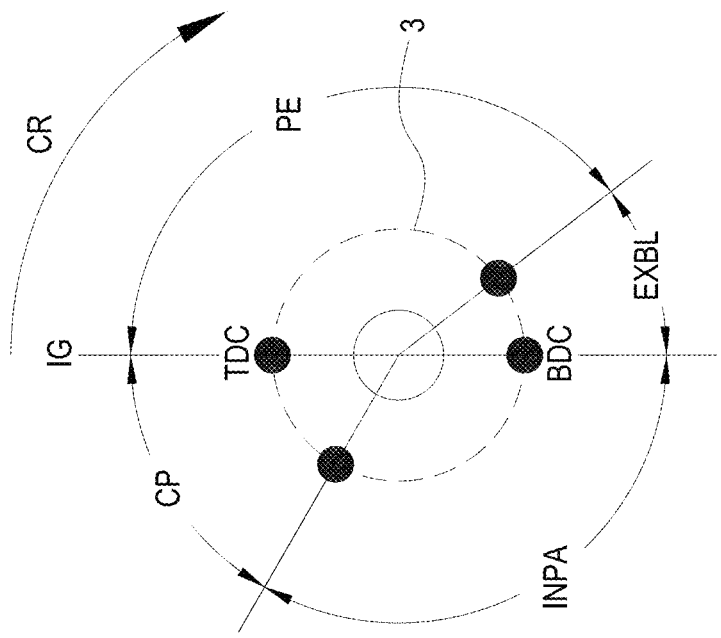
Figure 14:
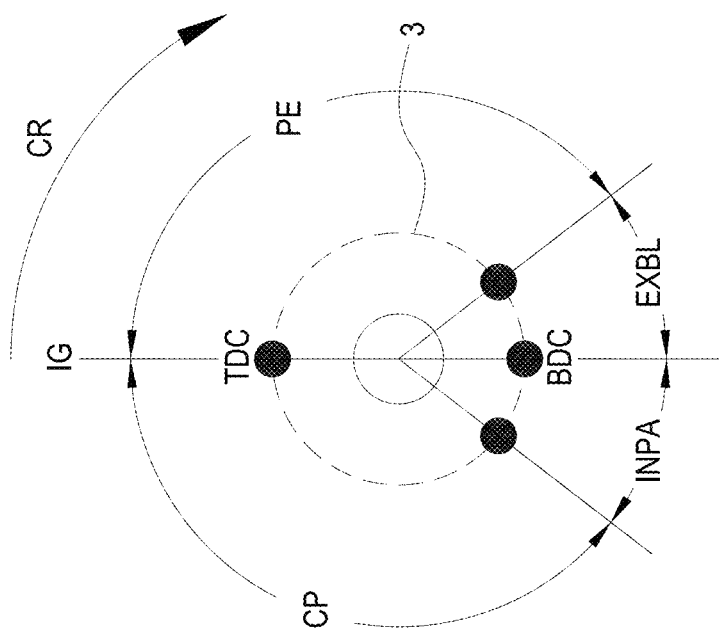
Figure 17:
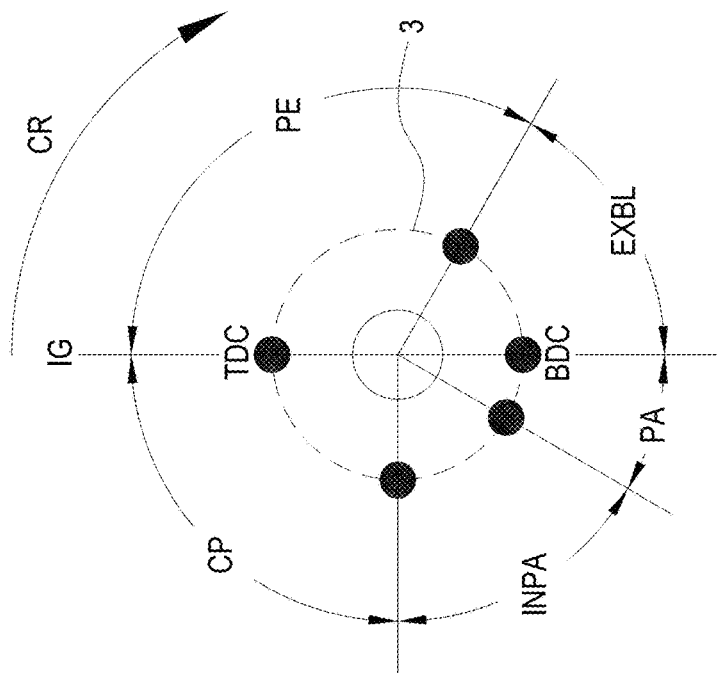
Figure 16:
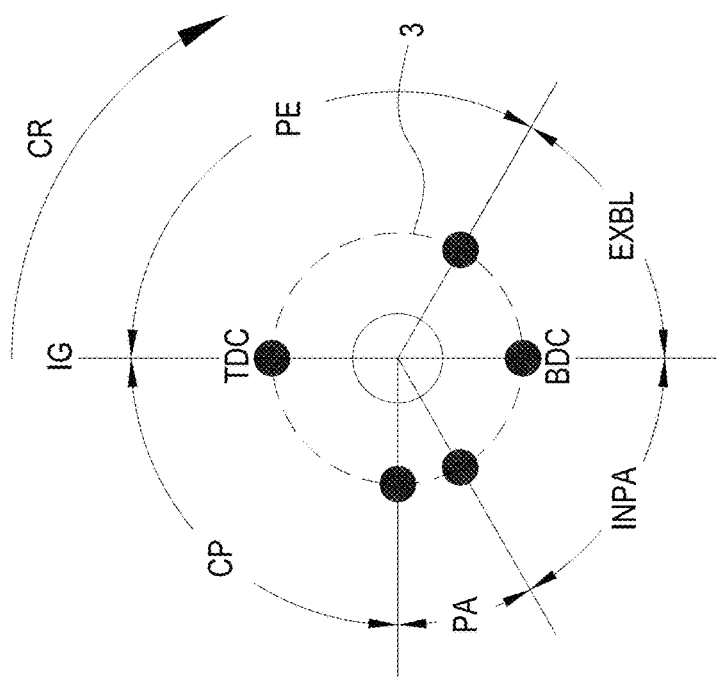
Figure 19:
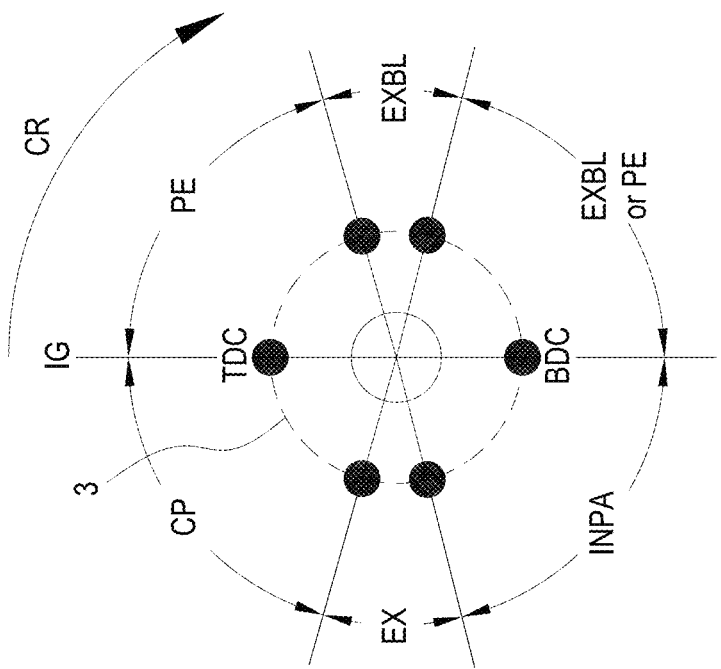
Figure 18:
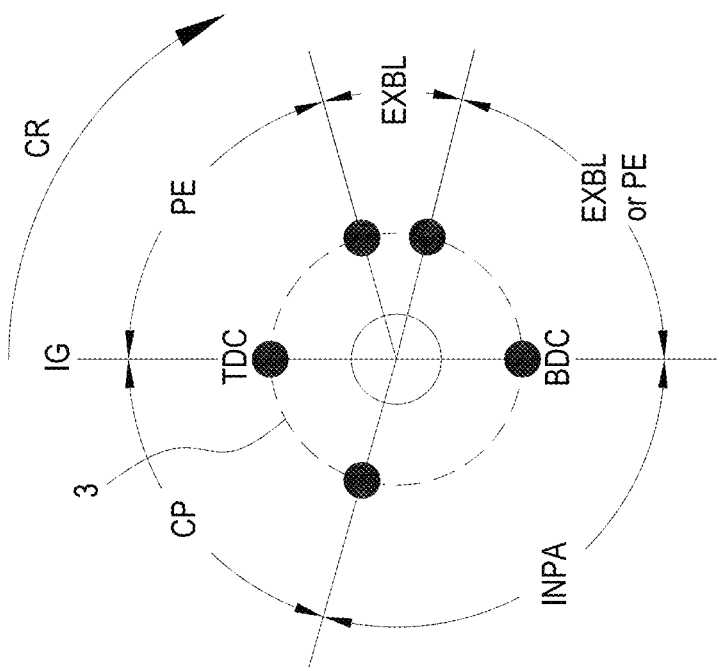
Figure 21:
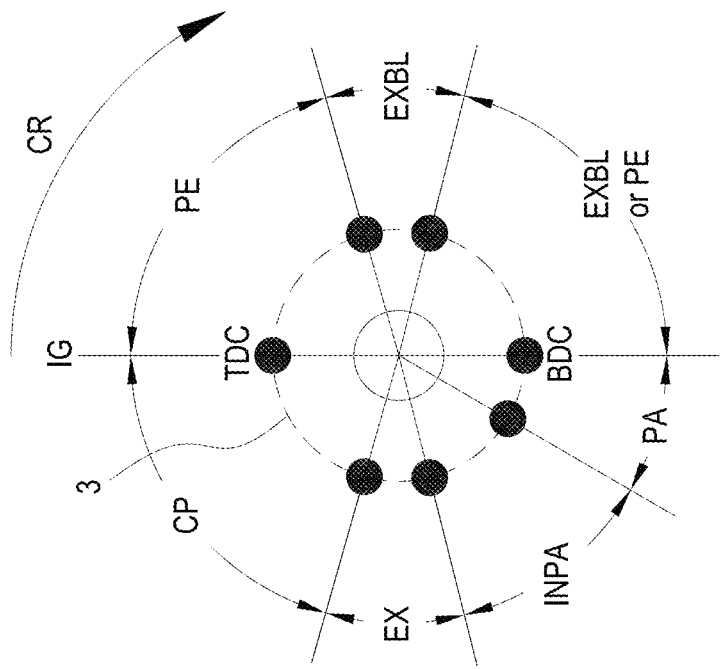
Figure 20:
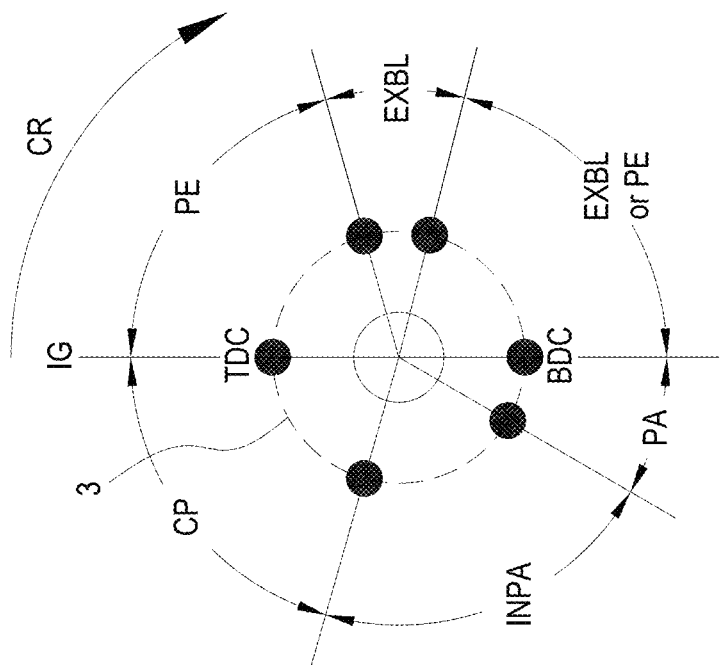
Figure 23:
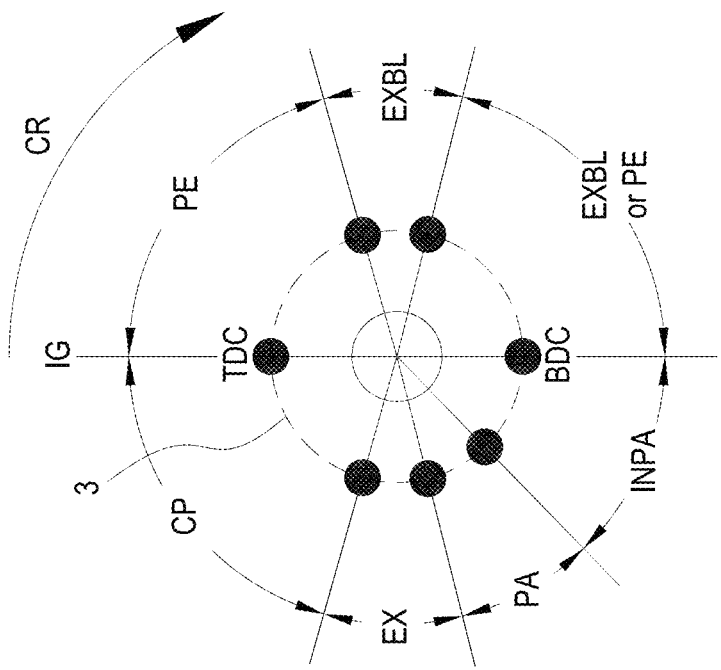
Figure 22:
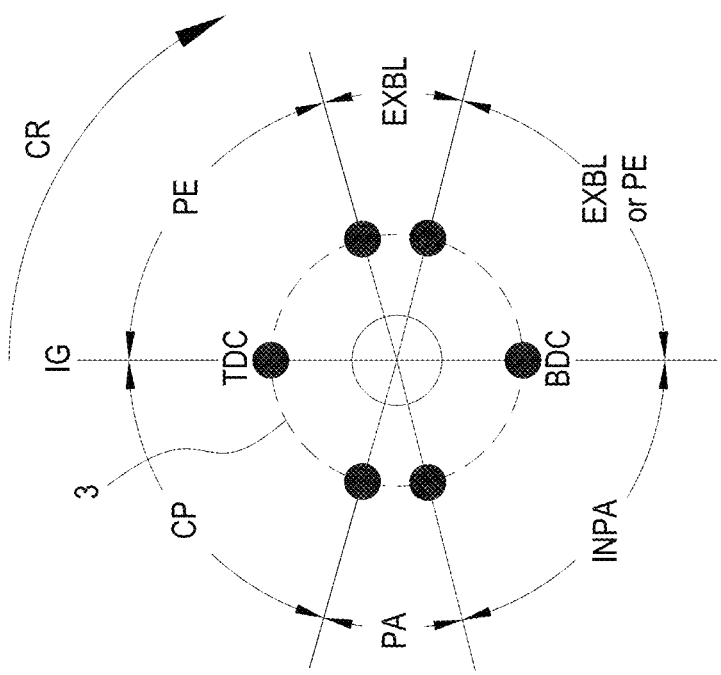
Figure 25:
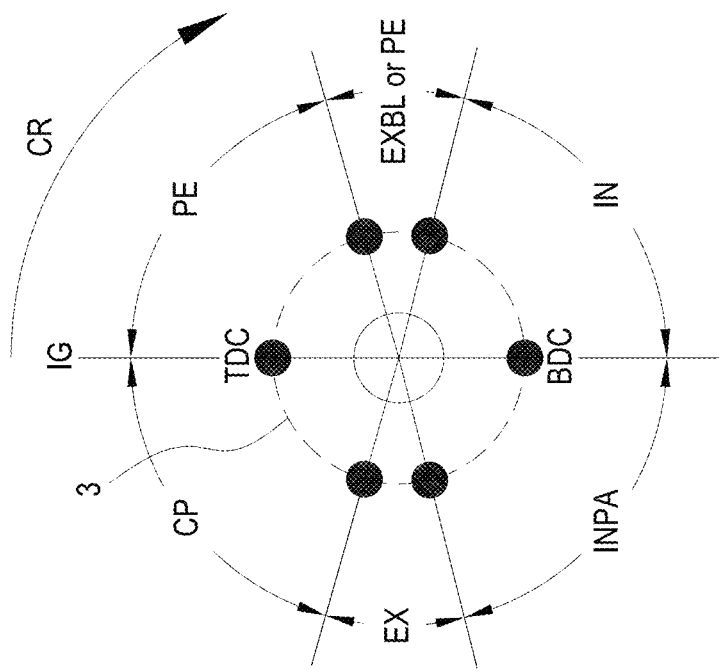
Figure 24:
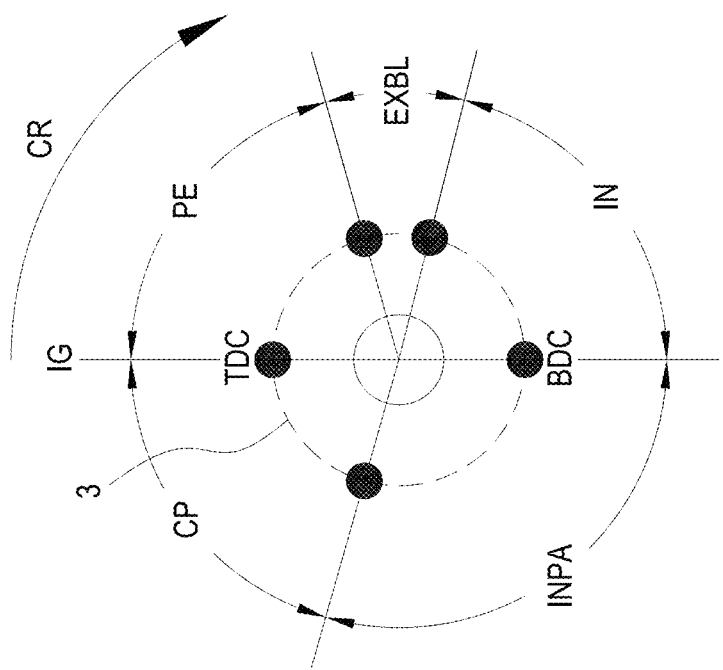
Figure 27:
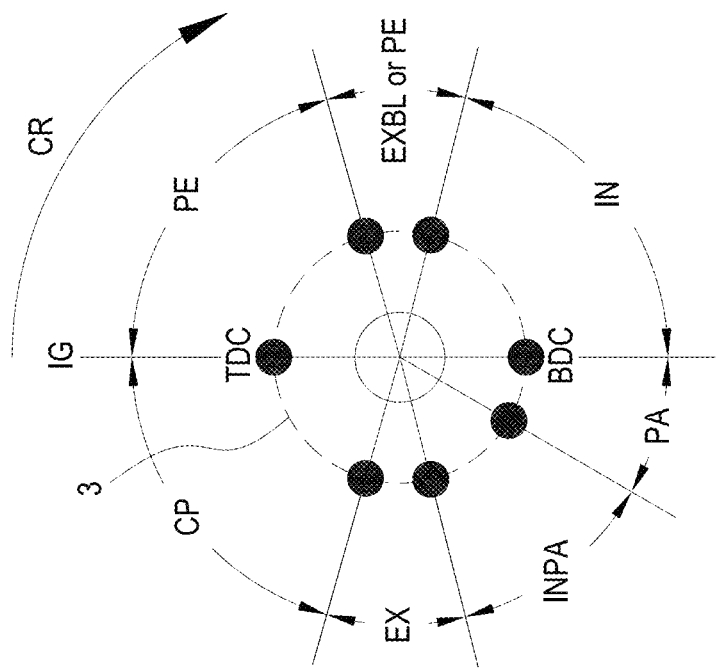
Figure 26:
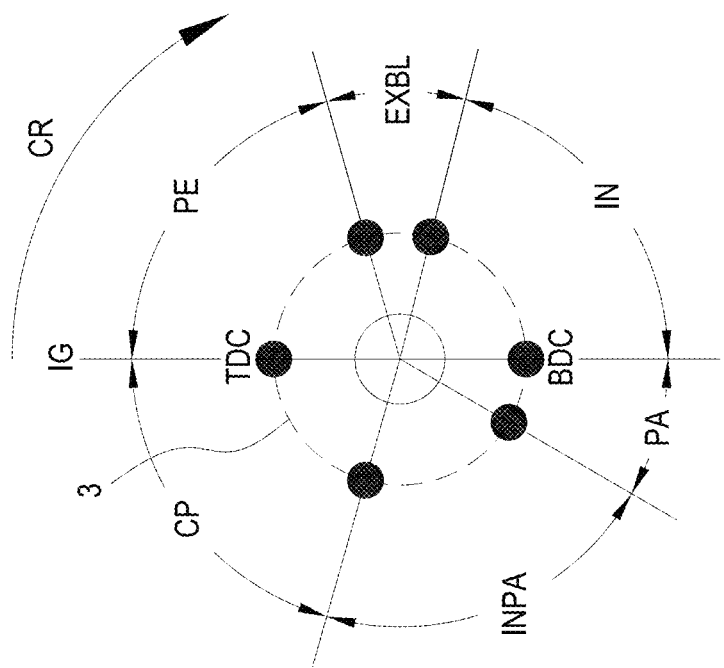
Figure 29:
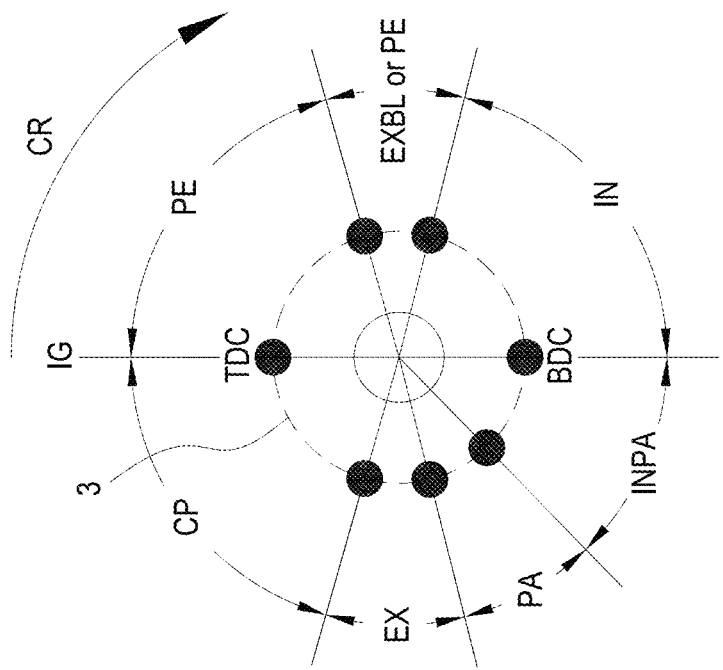
Figure 28:
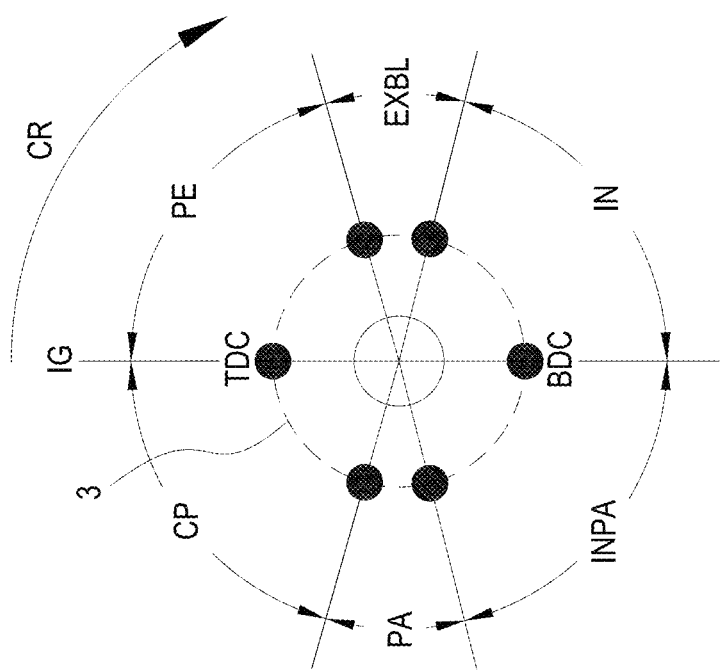
Figure 31:
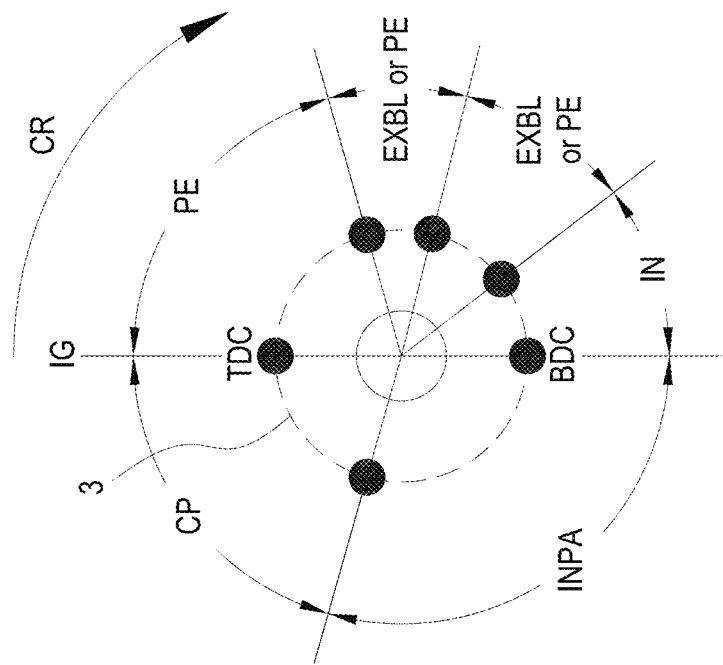

If the operating speed of the cycle that is functioning in FIG. 30 is increased to say 2,500 rpm, then the cycle may now look similar to the 2-stroke cycle shown in the diagrammatic drawing of FIG. 13. Because intake phase INPA of a cycle like shown in FIG. 13 depends on combustion heat from a previous combustion phase, another cycle such as the start-up cycle shown in FIG. 164 is needed to initiate an intake phase IN such as from the mechanical displacement of piston 6 as piston 6 moves toward its BDC position. The intake phase IN provided by piston 6 is needed to initiate a combustion phase, to initiate an intake phase INPA similar to that in FIG. 13. If a combustion event does not occur in a cycle, such as in a misfire, than a similar approach should be taken. It can be seen from the changes in phases in the cycle examples of FIG. 164, FIG. 30 and FIG. 13 carried out in FIG. 169 that an engine like shown in FIG. 169 should be able to respond to wide ranges of varying flow changes into and out of cylinder 8. By using flow-controlling devices, such as reed valves 18, that will detect and respond to flow changes independently of intake valve 10 and exhaust valve 11, intake valve 10 and exhaust valve 11 can be given a longer open duration than needed, and they can be set to operate fairly consistent with the mechanical cycle of the engine, and the simple flow-controlling devices can be relied upon to adapt to changes in each cycle without added complexity. With efficiency and simplicity in construction in mind, an engine similar to that embodied in FIG. 169 and described above is able to adapt to many changes in its cycles.

Further Details on how Phases are Created and/or Utilized in Methods of the Present Invention One example of utilizing a gas contraction in an aspect of the present invention timed with the mechanical piston stroke of an engine would be to time the gas contraction so that it produces intake without any or with minimal displacement of the engines piston (such as when the engines piston is reversing and held fairly still at BDC of the engines piston stroke). When utilized like this, intake work can be performed by the gas contraction without relying on the engines piston displacement or other mechanical means to displace air and produce intake stroke(s) or phase(s). Some examples of which said intake could occur may be seen in the diagrammatic drawings disclosed at and around BDC and labeled sometimes as IN and/or INPA in FIG. 4, FIG. 12 to FIG. 16, FIG. 18, FIG. 19, FIG. 22 to FIG. 41, FIG. 47, FIG. 48, FIG. 67 to FIG. 69, FIG. 77, FIG. 78, FIG. 90, FIG. 127 to FIG. 131, FIG. 133 to FIG. 138, FIG. 143 to FIG. 145, FIG. 147 to FIG. 149, FIG. 151, FIG. 152, FIG. 166. to FIG. 168, FIG. 171 to FIG. 177, FIG. 179, FIG. 180, FIG. 183 to FIG. 186, FIG. 188 to FIG. 193, FIG. 196, FIG. 197, FIG. 201 to FIG. 205, FIG. 208.

Another example of utilizing a gas contraction in an aspect of the present invention timed with the mechanical piston stroke of an engine would be to utilize the gas contraction so it produces intake along with the engines piston displacement to BDC which can create a stronger intake flow. Utilizing a gas contraction can also create means of producing an intake volume of greater capacity than could be accomplished by just the displacement of the engines piston itself for a given amount of intake displacement by the piston. Some examples of which said intake could occur may be seen in the diagrammatic drawings disclosed at and around BDC and/or during or at some duration of the stroke to BDC and labeled sometimes as IN and/or INPA in FIG. 4, FIG. 24 to FIG. 41, FIG. 133 to FIG. 138, FIG. 143 to FIG. 152, FIG. 167, FIG. 168, FIG. 171 to FIG. 177, FIG. 179, FIG. 180, FIG. 183 to FIG. 186, FIG. 188 to FIG. 193, FIG. 196, FIG. 197, FIG. 202 to FIG. 205, FIG. 208.

Another example of utilizing a gas contraction in an aspect of the present invention timed with the mechanical piston stroke of an engine would be to time the gas contraction so it produces intake against the displacement of the engines piston. In other words, the engines piston would normally be displacing gases out of the engines cylinder but because of the gas contraction, the outside gases are blowing into the engines cylinder. When timed like this, the gas contraction can also reduce the pressure upon the working face of the engines piston which in turn could create a partial power stroke or phase(s) during some of the engines piston travel to Top Dead Center (TDC). Instead of pumping losses like in conventional engines, an engine utilized with said gas contraction could reduce strokes or phases with conventional pumping losses, reduce the pumping losses themselves, and/or turn them into gains. Some examples of which said intake could occur may be seen in the diagrammatic drawings disclosed after BDC during or at some duration of the stroke to TDC and labeled sometimes as INPA in FIG. 4, FIG. 6 to FIG. 41, FIG. 47, FIG. 48, FIG. 67 to FIG. 72, FIG. 89, FIG. 90, FIG. 117 to FIG. 138, FIG. 143 to FIG. 145, FIG. 147 to FIG. 149, FIG. 151, FIG. 152, FIG. 162, FIG. 163, FIG. 166 to FIG. 168, FIG. 171 to FIG. 182, FIG. 185, FIG. 186, FIG. 188, FIG. 190, FIG. 192, FIG. 193, FIG. 196, FIG. 197, FIG. 201 to FIG. 205, FIG. 208.

Another example of utilizing a gas contraction in an aspect of the present invention timed with the mechanical piston stroke of an engine would be to time the gas contraction to reduce the pressure upon the working face of the engines piston to produce a power stroke or phase(s) with the displacement of the engines piston during the pistons travel to TDC. Instead of a power-taking compression or exhaust stroke to TDC like in conventional engines, an engine utilizing this contraction could have power-producing stroke(s) or phase(s) to TDC. Some examples of which said power stroke or phase could occur may be seen in the diagrammatic drawings disclosed after BDC during or at some duration of the stroke to TDC and labeled sometimes as PA in FIG. 8, FIG. 10, FIG. 16, FIG. 17, FIG. 20 to FIG. 23, FIG. 26 to FIG. 29, FIG. 32 to FIG. 35, FIG. 38 to FIG. 41, FIG. 49 to FIG. 51, FIG. 54, FIG. 55, FIG. 64 to FIG. 67, FIG. 73 to FIG. 78, FIG. 82 to FIG. 85, FIG. 90, FIG. 125 FIG. 126, FIG. 131, FIG. 132, FIG. 137, FIG. 138, FIG. 144, FIG. 145, FIG. 148, FIG. 149, FIG. 152, FIG. 176 to FIG. 178, FIG. 194, FIG. 199.

Another example of utilizing a gas contraction in an aspect of the present invention timed with the mechanical piston stroke of an engine would be to time the gas contraction so it reduces compression during a stroke or phase and/or delays or completely cancels out the point of compression of the engine during the engines piston travel to TDC. When utilized like this, the gas contraction can be timed and manipulated to produce neutral or minimal force on the engines piston or the gas contraction can be timed and manipulated to produce a partial power stroke or phase(s) or the gas contraction can be timed and manipulated to create a full (dedicated) power stroke or phase(s) during the engines piston travel to TDC, some examples of which could occur may be seen in the diagrammatic drawings disclosed labeled sometimes as IN, INPA, PA, N, EX, and/or EXBL in FIG. 4, FIG. 6 to FIG. 11, FIG. 13 to FIG. 18, FIG. 20, FIG. 22, FIG. 24, FIG. 26, FIG. 28, FIG. 31, FIG. 33, FIG. 35, FIG. 36, FIG. 38, FIG. 40, FIG. 47 to FIG. 49, FIG. 67 to FIG. 78, FIG. 89, FIG. 90, FIG. 145, FIG. 149, FIG. 162, FIG. 163, FIG. 166, FIG. 177 to FIG. 179, FIG. 182, FIG. 188, FIG. 194, FIG. 199, FIG. 203, FIG. 205, FIG. 208.

An example of utilizing a gas expansion in an aspect of the present invention of an injected substance(s) would be to utilize the gas expansion to produce at least some exhaust of the engines gases by utilizing the gas expansion to displace at least some of the gases out of the engine, some examples of which could occur may be seen in the diagrammatic drawings disclosed labeled sometimes as EX and/or EXBL in FIG. 4, FIG. 6 to FIG. 41, FIG. 50, FIG. 51, FIG. 54, FIG. 55, FIG. 64 to FIG. 78, FIG. 82 to FIG. 85, FIG. 89, FIG. 90, FIG. 106 to FIG. 110, FIG. 117 to FIG. 138, FIG. 152, FIG. 168, FIG. 208.

Another example of utilizing a gas expansion in an aspect of the present invention of an injected substance(s) would be to utilize the expansion to displace or take the place of at least some of the intake of the engine, some examples of which could occur may be seen in the diagrammatic drawings disclosed labeled sometimes as IN, N, EX and/or EXBL in FIG. 6 to FIG. 41, FIG. 47 to FIG. 49, FIG. 54, FIG. 55, FIG. 67 to FIG. 72, FIG. 75 to FIG. 78, FIG. 103 to FIG. 110, FIG. 117 to FIG. 138, FIG. 139 to FIG. 152, FIG. 162 to FIG. 168, FIG. 170 to FIG. 205, FIG. 206, FIG. 208.

Another example of utilizing an expansion in an aspect of the present invention of an injected substance(s) would be to utilize the expansion to increase or sustain the pressure of expansion stroke(s) or phase(s), some examples of which could occur may be seen in the diagrammatic drawings disclosed labeled sometimes as PE, N, EX and/or EXBL in FIG. 4, FIG. 6 to FIG. 41, FIG. 50, FIG. 51, FIG. 54, FIG. 55, FIG. 64 to FIG. 66, FIG. 89, FIG. 90, FIG. 107 to FIG. 110, FIG. 117 to FIG. 138, FIG. 142 to FIG. 152, FIG. 162 to FIG. 163, FIG. 166 to FIG. 168, FIG. 171 to FIG. 186, FIG. 188 to FIG. 194, FIG. 196, FIG. 197, FIG. 199, FIG. 201 to FIG. 205, FIG. 207, FIG. 208.

Another example of utilizing an expansion in an aspect of the present invention of an injected substance(s) would be to utilize the expansion to blast charge scavenge an engine. When utilized like this, the expansion can be timed and manipulated to produce an increase in intake pressure and displace gases in the engine and/or to displace at least some of the gases out of the engine and in some cases the increased intake flow may increase the pressure in the engine before or during the engines piston displaced compression stroke(s) or phase(s), some examples of which could occur may be seen in the diagrammatic drawings disclosed labeled sometimes as INBCS, PE, N, EX and/or EXBL in FIGS. 103 to 110.

An example of utilizing a gas contraction in an aspect of the present invention of an injected substance(s) would be to utilize the gas contraction to produce at least some intake into an engines cylinder, some examples of which could occur may be seen in the diagrammatic drawings disclosed labeled sometimes as IN and/or INPA in FIG. 4, FIG. 6 to FIG. 41, FIG. 47 to FIG. 49, FIG. 54, FIG. 55, FIG. 67 to FIG. 72, FIG. 75, FIG. 76, FIG. 78, FIG. 82 to FIG. 85, FIG. 89, FIG. 90, FIG. 117 to FIG. 138, FIG. 139 to FIG. 152, FIG. 162 to FIG. 168, FIG. 170 to FIG. 193, FIG. 195 to FIG. 198, FIG. 200 to FIG. 206, FIG. 208.

An example of utilizing a gas contraction in an aspect of the present invention of an injected substance(s) would be to utilize the gas contraction to produce at least some intake into a BCS chamber and/or valves or lines, some examples of which could occur may be seen in the diagrammatic drawings disclosed labeled sometimes as INBCS and/or IWS in FIG. 103 to FIG. 110.

Any of the features or attributes of the above described embodiments and variations can be used in combination with any of the other features and attributes of the above described embodiments and variations as desired.

The invention claimed is:
1. A method of operating an internal combustion engine that is capable of carrying out new complete thermodynamic engine cycles, the method comprising the steps of:
providing an internal combustion engine that includes:
a piston;
a cylinder into which intake air for combustion is admitted;
a cylinder valve;
a gas flow-controlling device configured to restrict gas flow in the internal combustion engine to a single direction during intake or exhaust of the internal combustion engine, the gas flow-controlling device configured to operate at changing times from cycle to cycle of the piston;

an engine timing device configured to time gas flow in the internal combustion engine so that the piston has a longer effective expansion stroke movement than effective compression stroke movement during a functioning thermodynamic cycle of the piston, the engine timing device further configured to time gas flow in the internal combustion engine so that the piston has a power producing force from gas pressure acting on the piston and with the piston during movement of the piston;

wherein the power producing force is from expanding or contracting of gases in the internal combustion engine;

wherein the power producing force is not the force of expanding combustion gases, the power producing force is not the force from directing gas flow inertia, the power producing force is not the rebound force from expanding gases that were previously compressed mechanically by the internal combustion engine, and the power producing force is not the rebound force from compressing gases that were previously expanded mechanically by the internal combustion engine, and wherein the power producing force occurs during a steady-state functioning thermodynamic cycle of the piston;

starting a first stroke of the piston during a cycle, the piston leaving a top dead center (TDC) position of the piston and traveling in the cylinder toward a bottom dead center (BDC) position of the piston during which time combustion and expansion gases are expanding in the cylinder, and in which the combustion and expansion gases are being contained under pressure in the cylinder;

during the first stroke of the cycle, and after the piston has traveled about halfway toward the BDC position, exhaust gases begin to blow out of the cylinder;

during the first stroke of the cycle, as the piston is traveling towards the BDC position, cylinder pressure drops and the exhaust gases cease blowing out of the cylinder;

during the first stroke of the cycle, while the piston is traveling towards the BDC position, a greater amount of surface area of the cylinder is being exposed to hot gases in the cylinder and heat from the hot gases in the cylinder is being transferred to the surface area of the cylinder that is cooler than the hot gases;

during the first stroke of the cycle, while the piston is traveling toward the BDC position, gases in the cylinder cool and contract and decrease the gas pressure in the cylinder, thus causing intake flow into the cylinder;

during the cycle, when the piston reaches the BDC position, the piston reverses and starts to move toward the TDC position during a second stroke of the cycle;

during the second stroke of the cycle, when the piston is traveling toward the TDC position, the piston is decreasing the volume in the cylinder while intake gases are still capable of flowing into the cylinder from intake flow caused by cooling and contracting gases in the cylinder;

during the second stroke of the cycle, and after the piston has traveled about halfway toward the TDC position, intake flow into the cylinder ceases when a compression stroke displacement of the piston begins; and during the second stroke of the cycle, when returning to TDC position in the cylinder, the piston finishes compressing gases in the cylinder.

2. The method according to claim 1, wherein the engine timing device is a computerized controller, microprocessor, or other circuitry; and wherein the gas flow-controlling device is an additional engine valve, the cylinder valve and the additional engine valve both having independent variable valve timing controlled by the computerized controller, microprocessor or other circuitry that is able to adapt the cylinder valve and the additional engine valve to changes in the internal combustion engine within a period of the cycle.

3. The method according to claim 1, wherein the gas flow-controlling device is disposed in series flow with the cylinder valve, the cylinder valve being disposed between the cylinder and the gas flow-controlling device in a path of gas flow to or from the internal combustion engine; and wherein the flow-controlling device is a reed valve or a rigid gas flow-controlling device.

4. The method according to claim 1, wherein, during the cycle of the internal combustion engine, the total intake flow into the cylinder, which is caused by cooling and contracting gases in the cylinder from heat transferring from the gases to the cool surface of the cylinder, has an intake volume equaling at least one-fifth of the volume displaced by the piston during a stroke of the piston in the cylinder.

5. The method according to claim 1, wherein the cycle of the internal combustion engine is able to function with a cylinder intake of non-pressurized gases in which the gases are at atmospheric pressure and able to flow at atmospheric pressure into the cylinder during the intake of the cylinder.

6. The method according to claim 1, wherein the cycle of the internal combustion engine is able to function without relying upon aid from additional charging or scavenging devices selected from the group consisting of auxiliary compressors, compression or charging cylinders, crank case pumping, superchargers, fans, blowers, external condensers, intake or exhaust charge velocity systems from ballistic speed wave-energy of the gases, tuned pipes, intake or exhaust overlap scavenging, and intake or exhaust gas inertia flow.

7. The method according to claim 1, wherein the internal combustion engine is timed to provide fuel flow into the cylinder of the internal combustion engine within the cycle of the internal combustion engine so that the fuel flow into the cylinder occurs at a time during the cycle of the internal combustion engine that restricts the fuel flow from escaping out of the exhaust of the internal combustion engine.

8. A method of operating an internal combustion engine, the method comprising the steps of:

providing an internal combustion engine that includes:
a piston;
a cylinder into which intake air for combustion is admitted;
a cylinder valve;
an injector nozzle with a surface area protruding into combustion gases;
an engine timing device configured to time gas flow in the internal combustion engine so that the piston has a longer effective expansion stroke movement than effective compression stroke movement during a functioning thermodynamic cycle of the piston, the engine timing device further configured to time gas flow in the internal combustion engine so that the piston has a power producing force from gas pressure acting on the piston and with the piston during movement of the piston;

wherein the power producing force is from expanding or contracting of gases in the internal combustion engine;

wherein the power producing force is not the force of expanding combustion gases, the power producing force is not the force from directing gas flow inertia, the power producing force is not the rebound force from expanding gases that were previously compressed mechanically by the internal combustion engine, and the power producing force is not the rebound force from compressing gases that were previously expanded mechanically by the internal combustion engine, and wherein the power producing force occurs during a steady-state functioning thermodynamic cycle of the piston;

starting a first stroke during a cycle, the piston being at a top dead center (TDC) position of the piston in the cylinder, and the piston confining gases in an open-sided dome-shaped dead volume cavity wherein the gases are igniting and combusting, and being contained under pressure in the cylinder;

during the cycle, a surface defining the open-sided dome-shaped dead volume cavity is directing heat from combusting gases towards a surface area of the injector nozzle in which the surface area is protruding into the combusting gases;

during the cycle, the piston is leaving the TDC position and the piston is traveling in the cylinder toward a bottom dead center (BDC) position during which time combustion and expansion gases are expanding in the cylinder in which the combustion and expansion gases are being contained under pressure in the cylinder;

during the cycle, as the piston has traveled about halfway in its stroke toward the BDC position, combustion and expansion gases are expanded in the cylinder, thereby lowering the pressure of the combustion and expansion gases;

during the cycle, the injector nozzle with the surface area protruding into the combusting gases begins injecting a controlled amount of superheated water in which was being heated and held under pressure in the injector nozzle in which the injector nozzle is receiving heat from the combustion gases;

during the cycle, heat is transferring from the surface area of the injector nozzle into the injected superheated water which is flashing into steam;

during the cycle, when superheated water and steam are leaving the injector nozzle, the superheated water and the steam are receiving heat from combustion gases in the cylinder;

during the cycle, after the piston has traveled about halfway in its stroke toward the BDC position, exhaust gases begin to blow out of the cylinder;

during the cycle, the flashing steam of the injected superheated water is used to blow exhaust gases out of the cylinder in order to scavenge the cylinder of the exhaust gases; and during the cycle, when the piston is around the BDC position, cylinder pressure drops and so the exhaust gases cease blowing out of the cylinder.

9. The method according to claim 8, wherein the internal combustion engine is timed to provide fuel flow into the cylinder of the internal combustion engine within the cycle of the internal combustion engine so that the fuel flow into the cylinder occurs at a time during the cycle of the internal combustion engine that restricts the fuel flow from escaping out of the exhaust of the internal combustion engine.

10. The method according to claim 8, wherein, after the exhaust blowing out of the cylinder stops, an intake flow into the cylinder begins due to hot gases in the cylinder transferring heat to the cool surface area of the cylinder and the hot gases in the cylinder cooling, contracting, and decreasing pressure in the cylinder, thereby causing the intake flow into the cylinder when the piston is around the BDC position of the piston.

11. The method according to claim 8, wherein, after the exhaust blowing out of the cylinder stops, a vacuum is formed in the cylinder due to hot gases in the cylinder transferring heat to the cool surface area of the cylinder and the hot gases in the cylinder cooling, contracting, and decreasing pressure in the cylinder, thereby causing the vacuum to form in the cylinder when the piston is around the BDC position of the piston.

12. The method according to claim 11, wherein the vacuum in the cylinder is used to provide a power stroke with the piston during a travel of the piston towards the TDC position.

13. The method according to claim 11, wherein the vacuum in the cylinder is used to provide an intake flow into the cylinder during a travel of the piston towards the TDC position.

14. The method according to claim 8, wherein the surface area of the injector nozzle protruding into the combustion gases is made from a material or materials having a higher average heat transfer coefficient than the average heat transfer coefficient of the surface area of the open-sided dome-shaped dead volume cavity that is directing heat from the combusting gases towards the surface area of the injector nozzle protruding into the combusting gases.

15. The method according to claim 8, wherein the controlled amount of superheated water being injected is in relation to the operating conditions of the cycle of the internal combustion engine, and the amount of heat output of the combustion gases that is available during that time, and the controlled amount of superheated water being injected is related to the maximum allowed temperature of the surface area of the injector nozzle that is protruding into the combustion gases.

16. The method according to claim 8, wherein the superheated water being injected is being monitored by a first sensor that indicates or relates to the temperature of the superheated water being injected, the first sensor being operatively coupled to a computerized controller, microprocessor, or other circuitry that is able to control and regulate controlled amounts of the superheated water being injected and in which the computerized controller, microprocessor, or other circuitry is also able to control and regulate timing durations of the superheated water being injected, and wherein the computerized controller, microprocessor, or other circuitry is linked so as to communicate with the circuitry of a second sensor indicating or relating to pressure changes in the internal combustion engine within a period of the cycle of the piston.

17. The method according to claim 8, wherein the controlled amount of superheated water is injected after the piston has traveled at least half of a piston stroke towards the BDC position.

18. The method according to claim 8, wherein the engine has an effective compressive stroke in the cylinder of the internal combustion engine corresponding to no less than 150 psig, and wherein the cycle of the engine has at least 35% thermal efficiency.

19. A method of operating an internal combustion engine, the method comprising the steps of:
   providing an internal combustion engine that includes:
      a piston;
      a cylinder into which intake air for combustion is admitted;
      a cylinder valve;
      a gas flow-controlling device configured to restrict gas flow in the internal combustion engine to a single direction during intake or exhaust of the internal combustion engine, the gas flow-controlling device configured to operate at changing times from cycle to cycle of the piston;
      a fuel timing device configured to time fuel flow into the cylinder of the internal combustion engine with the operating cycle of the engine so that the fuel flow into the cylinder occurs at a time during the operating cycle of the engine that restricts the fuel flow from escaping out of the exhaust of the engine;
      a gas timing device configured to time gas flow in the internal combustion engine so that the piston has a longer effective expansion stroke movement than effective compression stroke movement during a functioning thermodynamic cycle of the piston;
   starting a first stroke of the piston during a cycle, the piston leaving a top dead center (TDC) position and traveling in the cylinder toward a bottom dead center (BDC) position during which time the combustion and expansion gases are expanding in the cylinder, and in which the combustion and expansion gases are being contained under pressure in the cylinder;
   during the stroke of the piston toward the BDC position, exhaust gases begin to blow out of the cylinder;
   during the cycle, while the piston is traveling toward the BDC position, more surface area of the cylinder is being exposed to hot gases in the cylinder, and heat from the hot gases in the cylinder is transferred to the surface area of the cylinder that is cooler than the hot gases;
   during the cycle, during the movement of the piston, cylinder pressure drops and the exhaust gases cease blowing out of the cylinder, and gases in the cylinder cool and contract and decrease pressure in the cylinder;
   during the movement of the piston, gases in the cylinder are still cooling and contracting and intake gases are able to flow into the cylinder;
   during the cycle, when the piston is traveling toward the TDC position, the piston is decreasing the volume in the cylinder while intake gases are still able to flow into the cylinder from intake flow caused by cooling and contracting gases in the cylinder;
   during the cycle, when the piston is traveling toward the TDC position, intake flow into the cylinder ceases when a compression stroke displacement of the piston begins;
   during a second stroke of the cycle, when returning to TDC position in the cylinder, the as piston finishes compressing gases in the cylinder.

20. The method according to claim 19, wherein, during the cycle of the internal combustion engine, the total intake flow into the cylinder, which is caused by cooling and contracting gases in the cylinder from heat transferring from the gases to the cool surface of the cylinder, has an intake volume equaling at least one-fifth of the volume displaced by the piston during a stroke of the piston in the cylinder.

* * * * *